(12) United States Patent
Hotelling et al.

(10) Patent No.: US 9,606,668 B2
(45) Date of Patent: Mar. 28, 2017

(54) MODE-BASED GRAPHICAL USER INTERFACES FOR TOUCH SENSITIVE INPUT DEVICES

(75) Inventors: Steve Hotelling, Los Gatos, CA (US); Brian Q. Huppi, San Francisco, CA (US); Joshua A. Strickon, Miami, FL (US); Duncan Robert Kerr, San Francisco, CA (US); Bas Ording, San Francisco, CA (US); Imran Chaudhri, San Francisco, CA (US); Greg Christie, San Jose, CA (US); Jonathan P. Ive, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1083 days.

(21) Appl. No.: 13/564,491

(22) Filed: Aug. 1, 2012

(65) Prior Publication Data
US 2012/0293440 A1 Nov. 22, 2012

Related U.S. Application Data

(60) Division of application No. 11/038,590, filed on Jan. 18, 2005, now Pat. No. 8,239,784, which is a continuation-in-part of application No. 10/903,964, filed on Jul. 30, 2004, now Pat. No. 8,479,122.

(51) Int. Cl.
*G06F 3/041* (2006.01)
*G06F 3/0488* (2013.01)
*G06F 3/0484* (2013.01)
*G06F 3/0482* (2013.01)

(52) U.S. Cl.
CPC .......... *G06F 3/0418* (2013.01); *G06F 3/0488* (2013.01); *G06F 3/04883* (2013.01); *G06F 3/0482* (2013.01); *G06F 3/04842* (2013.01); *G06F 3/04886* (2013.01); *G06F 2203/04805* (2013.01); *G06F 2203/04808* (2013.01)

(58) Field of Classification Search
CPC ...................................................... G06F 3/0418
See application file for complete search history.

(56) References Cited

U.S. PATENT DOCUMENTS

| 3,333,160 A | 7/1967 | Gorski |
| 3,541,541 A | 11/1970 | Englebart |
| 3,609,695 A | 9/1971 | Pirkle |
| 3,662,105 A | 5/1972 | Hurst et al. |
| 3,748,751 A | 7/1973 | Breglia et al. |

(Continued)

FOREIGN PATENT DOCUMENTS

| CA | 1243096 | 10/1988 |
| CN | 1326564 A | 12/2001 |

(Continued)

OTHER PUBLICATIONS

Bing search q=mode+based+interface&src=IE-Search Jan. 11, 2016.*

(Continued)

*Primary Examiner* — Jeffrey A Gaffin
*Assistant Examiner* — John M Heffington
(74) *Attorney, Agent, or Firm* — Morrison & Foerster LLP

(57) ABSTRACT

A user interface method is disclosed. The method includes detecting a touch and then determining a user interface mode when a touch is detected. The method further includes activating one or more GUI elements based on the user interface mode and in response to the detected touch.

24 Claims, 52 Drawing Sheets

(56) References Cited

U.S. PATENT DOCUMENTS

| | | |
|---|---|---|
| 3,757,322 A | 9/1973 | Barkan et al. |
| 3,798,370 A | 3/1974 | Hurst |
| 3,825,730 A | 7/1974 | Worthington, Jr. et al. |
| 3,846,826 A | 11/1974 | Mueller |
| 4,014,000 A | 3/1977 | Uno et al. |
| 4,017,848 A | 4/1977 | Tannas, Jr. |
| 4,146,924 A | 3/1979 | Birk et al. |
| 4,202,041 A | 5/1980 | Kaplow et al. |
| 4,219,847 A | 8/1980 | Pinkney et al. |
| 4,246,452 A | 1/1981 | Chandler |
| 4,303,856 A | 12/1981 | Serras-Paulet |
| 4,305,071 A | 12/1981 | Bell et al. |
| 4,305,131 A | 12/1981 | Best |
| 4,346,376 A | 8/1982 | Mallos |
| 4,375,674 A | 3/1983 | Thornton |
| 4,396,945 A | 8/1983 | DiMatteo et al. |
| 4,435,835 A | 3/1984 | Sakow et al. |
| 4,475,122 A | 10/1984 | Green |
| 4,484,179 A | 11/1984 | Kasday |
| 4,511,973 A | 4/1985 | Miura et al. |
| 4,542,375 A | 9/1985 | Alles et al. |
| 4,550,221 A | 10/1985 | Mabusth |
| 4,561,017 A | 12/1985 | Greene |
| 4,586,035 A * | 4/1986 | Baker ................ G06F 3/04812 178/18.01 |
| 4,613,942 A | 9/1986 | Chen |
| 4,629,319 A | 12/1986 | Clarke et al. |
| 4,631,525 A | 12/1986 | Serravalle, Jr. |
| 4,631,676 A | 12/1986 | Pugh |
| 4,644,100 A | 2/1987 | Brenner et al. |
| 4,644,326 A | 2/1987 | Villalobos et al. |
| 4,654,872 A | 3/1987 | Hisano et al. |
| 4,672,364 A | 6/1987 | Lucas |
| 4,672,558 A | 6/1987 | Beckes et al. |
| 4,686,374 A | 8/1987 | Liptay-Wagner et al. |
| 4,692,809 A | 9/1987 | Beining et al. |
| 4,695,827 A | 9/1987 | Beining et al. |
| 4,703,306 A | 10/1987 | Barritt |
| 4,710,760 A | 12/1987 | Kasday |
| 4,733,222 A | 3/1988 | Evans |
| 4,734,685 A | 3/1988 | Watanabe |
| 4,746,770 A | 5/1988 | McAvinney |
| 4,763,356 A | 8/1988 | Day, Jr. et al. |
| 4,771,276 A | 9/1988 | Parks |
| 4,772,028 A | 9/1988 | Rockhold et al. |
| 4,787,040 A | 11/1988 | Ames et al. |
| 4,788,384 A | 11/1988 | Bruere-Dawson et al. |
| 4,806,846 A | 2/1989 | Kerber |
| 4,814,759 A | 3/1989 | Gombrich et al. |
| 4,853,888 A | 8/1989 | Lata et al. |
| 4,898,555 A | 2/1990 | Sampson |
| 4,914,624 A | 4/1990 | Dunthorn |
| 4,948,371 A | 8/1990 | Hall |
| 4,968,877 A | 11/1990 | McAvinney et al. |
| 4,988,981 A | 1/1991 | Zimmerman et al. |
| 4,993,806 A | 2/1991 | Clausen et al. |
| 5,003,519 A | 3/1991 | Noirjean |
| 5,017,030 A | 5/1991 | Crews |
| 5,038,401 A | 8/1991 | Inotsume |
| 5,045,843 A | 9/1991 | Hansen |
| 5,045,846 A | 9/1991 | Gay et al. |
| 5,060,135 A | 10/1991 | Levine et al. |
| 5,072,294 A | 12/1991 | Engle |
| 5,119,079 A | 6/1992 | Hube et al. |
| 5,148,155 A | 9/1992 | Martin et al. |
| 5,153,829 A | 10/1992 | Furuya et al. |
| 5,168,531 A | 12/1992 | Sigel |
| 5,178,477 A | 1/1993 | Gambaro |
| 5,189,403 A | 2/1993 | Franz et al. |
| 5,194,862 A | 3/1993 | Edwards |
| 5,212,555 A | 5/1993 | Stoltz |
| 5,224,861 A | 7/1993 | Glass et al. |
| 5,227,985 A | 7/1993 | DeMenthon |
| 5,241,308 A | 8/1993 | Young |
| 5,252,951 A | 10/1993 | Tannenbaum et al. |
| 5,260,697 A | 11/1993 | Barrett et al. |
| 5,281,966 A | 1/1994 | Walsh |
| 5,297,041 A | 3/1994 | Kushler et al. |
| 5,305,017 A | 4/1994 | Gerpheide |
| 5,319,386 A | 6/1994 | Gunn et al. |
| 5,328,190 A | 7/1994 | Dart et al. |
| 5,345,543 A | 9/1994 | Capps et al. |
| 5,347,295 A | 9/1994 | Agulnick et al. |
| 5,347,629 A | 9/1994 | Barrett et al. |
| 5,363,051 A | 11/1994 | Jenstrom et al. |
| 5,367,453 A | 11/1994 | Capps et al. |
| 5,376,948 A | 12/1994 | Roberts |
| 5,379,057 A | 1/1995 | Clough et al. |
| 5,398,310 A | 3/1995 | Tchao et al. |
| 5,412,189 A | 5/1995 | Cragun |
| 5,418,760 A | 5/1995 | Kawashima et al. |
| 5,422,656 A | 6/1995 | Allard et al. |
| 5,442,742 A | 8/1995 | Greyson et al. |
| 5,459,793 A | 10/1995 | Naoi et al. |
| 5,463,388 A | 10/1995 | Boie et al. |
| 5,463,696 A | 10/1995 | Beernink et al. |
| 5,463,725 A | 10/1995 | Henckel et al. |
| 5,471,578 A | 11/1995 | Moran et al. |
| 5,479,528 A | 12/1995 | Speeter |
| 5,483,261 A | 1/1996 | Yasutake |
| 5,488,204 A | 1/1996 | Mead et al. |
| 5,495,077 A | 2/1996 | Miller et al. |
| 5,495,269 A | 2/1996 | Elrod et al. |
| 5,495,576 A | 2/1996 | Ritchey |
| 5,502,514 A | 3/1996 | Vogeley et al. |
| 5,510,806 A | 4/1996 | Busch |
| 5,511,148 A | 4/1996 | Wellner |
| 5,513,309 A | 4/1996 | Meier et al. |
| 5,515,079 A | 5/1996 | Hauck |
| 5,523,775 A | 6/1996 | Capps |
| 5,530,455 A | 6/1996 | Gillick et al. |
| 5,530,456 A | 6/1996 | Kokubo |
| 5,543,588 A | 8/1996 | Bisset et al. |
| 5,543,590 A | 8/1996 | Gillespie et al. |
| 5,543,591 A | 8/1996 | Gillespie et al. |
| 5,548,667 A | 8/1996 | Tu |
| 5,559,301 A | 9/1996 | Bryan, Jr. et al. |
| 5,563,632 A | 10/1996 | Roberts |
| 5,563,996 A | 10/1996 | Tchao |
| 5,565,658 A | 10/1996 | Gerpheide et al. |
| 5,568,604 A | 10/1996 | Hansen |
| 5,570,113 A | 10/1996 | Zetts |
| 5,571,997 A | 11/1996 | Gray et al. |
| 5,572,239 A | 11/1996 | Jaeger |
| 5,572,647 A | 11/1996 | Blades |
| 5,579,036 A | 11/1996 | Yates, IV |
| 5,581,243 A | 12/1996 | Ouellette et al. |
| 5,581,681 A | 12/1996 | Tchao et al. |
| 5,583,946 A | 12/1996 | Gourdol |
| 5,589,856 A | 12/1996 | Stein et al. |
| 5,590,219 A | 12/1996 | Gourdol |
| 5,592,566 A | 1/1997 | Pagallo et al. |
| 5,594,469 A | 1/1997 | Freeman et al. |
| 5,594,810 A | 1/1997 | Gourdol |
| 5,596,694 A | 1/1997 | Capps |
| 5,612,719 A | 3/1997 | Beernink et al. |
| 5,613,913 A | 3/1997 | Ikematsu et al. |
| 5,625,715 A | 4/1997 | Trew et al. |
| 5,631,805 A | 5/1997 | Bonsall |
| 5,633,955 A | 5/1997 | Bozinovic et al. |
| 5,634,102 A | 5/1997 | Capps |
| 5,636,101 A | 6/1997 | Bonsall et al. |
| 5,642,108 A | 6/1997 | Gopher et al. |
| 5,644,657 A | 7/1997 | Capps et al. |
| 5,649,706 A | 7/1997 | Treat, Jr. et al. |
| 5,666,113 A | 9/1997 | Logan |
| 5,666,502 A | 9/1997 | Capps |
| 5,666,552 A | 9/1997 | Greyson et al. |
| 5,675,361 A | 10/1997 | Santilli |
| 5,675,362 A | 10/1997 | Clough et al. |
| 5,677,710 A | 10/1997 | Thompson-Rohrlich |
| 5,689,253 A | 11/1997 | Hargreaves et al. |
| 5,689,667 A | 11/1997 | Kurtenbach |
| 5,709,219 A | 1/1998 | Chen et al. |

(56) References Cited

U.S. PATENT DOCUMENTS

| | | |
|---|---|---|
| 5,710,844 A | 1/1998 | Capps et al. |
| 5,711,624 A | 1/1998 | Klauber |
| 5,712,661 A | 1/1998 | Jaeger |
| 5,726,685 A | 3/1998 | Kuth et al. |
| 5,729,249 A | 3/1998 | Yasutake |
| 5,729,250 A | 3/1998 | Bishop et al. |
| 5,730,165 A | 3/1998 | Philipp |
| 5,736,974 A | 4/1998 | Selker |
| 5,736,975 A | 4/1998 | Lunetta |
| 5,736,976 A | 4/1998 | Cheung |
| 5,741,990 A | 4/1998 | Davies |
| 5,745,116 A | 4/1998 | Pisutha-Arnond |
| 5,745,716 A | 4/1998 | Tchao et al. |
| 5,745,719 A | 4/1998 | Falcon |
| 5,746,818 A | 5/1998 | Yatake |
| 5,748,184 A | 5/1998 | Shieh |
| 5,748,269 A | 5/1998 | Harris et al. |
| 5,748,512 A | 5/1998 | Vargas |
| 5,764,222 A | 6/1998 | Shieh |
| 5,764,818 A | 6/1998 | Capps et al. |
| 5,767,457 A | 6/1998 | Gerpheide et al. |
| 5,767,842 A | 6/1998 | Korth |
| 5,777,603 A | 7/1998 | Jaeger |
| 5,790,104 A | 8/1998 | Shieh |
| 5,790,107 A | 8/1998 | Kasser et al. |
| 5,798,760 A | 8/1998 | Vayda et al. |
| 5,801,941 A | 9/1998 | Bertram |
| 5,802,516 A | 9/1998 | Shwarts et al. |
| 5,805,145 A | 9/1998 | Jaeger |
| 5,805,146 A | 9/1998 | Jaeger et al. |
| 5,805,167 A | 9/1998 | Van Cruyningen |
| 5,808,567 A | 9/1998 | McCloud |
| 5,808,605 A | 9/1998 | Shieh |
| 5,809,267 A | 9/1998 | Moran et al. |
| 5,818,451 A | 10/1998 | Bertram et al. |
| 5,821,690 A | 10/1998 | Martens et al. |
| 5,821,930 A | 10/1998 | Hansen |
| 5,823,782 A | 10/1998 | Marcus et al. |
| 5,825,232 A | 10/1998 | Kimura |
| 5,825,308 A | 10/1998 | Rosenberg |
| 5,825,351 A | 10/1998 | Tam |
| 5,825,352 A | 10/1998 | Bisset et al. |
| 5,831,601 A | 11/1998 | Vogeley et al. |
| 5,835,079 A | 11/1998 | Shieh |
| 5,841,428 A | 11/1998 | Jaeger et al. |
| 5,844,506 A | 12/1998 | Binstead |
| 5,844,547 A | 12/1998 | Minakuchi et al. |
| 5,850,218 A | 12/1998 | LaJoie et al. |
| 5,854,625 A | 12/1998 | Frisch et al. |
| 5,859,631 A | 1/1999 | Bergman et al. |
| 5,867,149 A | 2/1999 | Jaeger |
| 5,870,091 A | 2/1999 | Lazarony et al. |
| 5,871,251 A | 2/1999 | Welling et al. |
| 5,874,948 A | 2/1999 | Shieh |
| 5,877,751 A | 3/1999 | Kanemitsu et al. |
| 5,880,411 A | 3/1999 | Gillespie et al. |
| 5,883,619 A | 3/1999 | Ho et al. |
| 5,886,697 A | 3/1999 | Naughton et al. |
| 5,898,434 A | 4/1999 | Small et al. |
| 5,900,876 A | 5/1999 | Yagita et al. |
| 5,910,800 A | 6/1999 | Shields et al. |
| 5,920,309 A | 7/1999 | Bisset et al. |
| 5,923,319 A | 7/1999 | Bishop et al. |
| 5,933,134 A | 8/1999 | Shieh |
| 5,933,141 A | 8/1999 | Smith |
| 5,936,613 A | 8/1999 | Jaeger et al. |
| 5,943,043 A | 8/1999 | Furuhata et al. |
| 5,943,044 A | 8/1999 | Martinelli et al. |
| 5,943,052 A | 8/1999 | Allen et al. |
| 5,943,053 A | 8/1999 | Ludolph et al. |
| 5,949,345 A | 9/1999 | Beckert et al. |
| 5,956,291 A | 9/1999 | Nehemiah et al. |
| 5,956,822 A | 9/1999 | Brieden et al. |
| 5,963,671 A | 10/1999 | Comerford et al. |
| 5,974,541 A | 10/1999 | Hall et al. |
| 5,977,867 A | 11/1999 | Blouin |
| 5,982,302 A | 11/1999 | Ure |
| 5,982,352 A | 11/1999 | Pryor |
| 5,982,353 A | 11/1999 | Gallery et al. |
| 5,982,355 A | 11/1999 | Jaeger et al. |
| 5,995,101 A | 11/1999 | Clark et al. |
| 5,995,104 A | 11/1999 | Kataoka et al. |
| 5,995,106 A | 11/1999 | Naughton et al. |
| 5,999,895 A | 12/1999 | Forest |
| 6,002,389 A | 12/1999 | Kasser |
| 6,002,808 A | 12/1999 | Freeman |
| 6,005,549 A | 12/1999 | Forest |
| 6,005,555 A | 12/1999 | Katsurahira et al. |
| 6,008,800 A | 12/1999 | Pryor |
| 6,013,956 A | 1/2000 | Anderson, Jr. |
| 6,020,881 A | 2/2000 | Naughton et al. |
| 6,028,271 A | 2/2000 | Gillespie et al. |
| 6,031,469 A | 2/2000 | Dodd |
| 6,031,524 A | 2/2000 | Kunert |
| 6,034,685 A | 3/2000 | Kuriyama et al. |
| 6,037,882 A | 3/2000 | Levy |
| 6,037,937 A * | 3/2000 | Beaton ............... G06F 3/0485 715/764 |
| 6,040,824 A | 3/2000 | Maekawa et al. |
| 6,049,326 A | 4/2000 | Beyda et al. |
| 6,049,328 A | 4/2000 | Vanderheiden |
| 6,050,825 A | 4/2000 | Nichol et al. |
| 6,052,339 A | 4/2000 | Frenkel et al. |
| 6,054,984 A | 4/2000 | Alexander |
| 6,054,990 A | 4/2000 | Tran |
| 6,057,540 A | 5/2000 | Gordon et al. |
| 6,057,844 A * | 5/2000 | Strauss ............... G06F 3/0486 715/769 |
| 6,057,845 A | 5/2000 | Dupouy |
| 6,061,177 A | 5/2000 | Fujimoto |
| 6,066,075 A | 5/2000 | Poulton |
| 6,072,494 A | 6/2000 | Nguyen |
| 6,073,036 A | 6/2000 | Heikkinen et al. |
| 6,075,531 A | 6/2000 | DeStefano |
| 6,084,576 A | 7/2000 | Leu et al. |
| 6,094,197 A | 7/2000 | Buxton et al. |
| 6,104,384 A | 8/2000 | Moon et al. |
| 6,105,419 A | 8/2000 | Michels et al. |
| 6,107,997 A | 8/2000 | Ure |
| 6,128,003 A | 10/2000 | Smith et al. |
| 6,130,665 A | 10/2000 | Ericsson |
| 6,131,299 A | 10/2000 | Raab et al. |
| 6,135,958 A | 10/2000 | Mikula-Curtis et al. |
| 6,144,380 A | 11/2000 | Shwarts et al. |
| 6,151,596 A | 11/2000 | Hosomi |
| 6,154,194 A | 11/2000 | Singh |
| 6,154,201 A | 11/2000 | Levin et al. |
| 6,154,209 A | 11/2000 | Naughton et al. |
| 6,160,551 A | 12/2000 | Naughton et al. |
| 6,169,538 B1 | 1/2001 | Nowlan et al. |
| 6,175,610 B1 | 1/2001 | Peter |
| 6,188,391 B1 | 2/2001 | Seely et al. |
| 6,198,515 B1 | 3/2001 | Cole |
| 6,208,329 B1 | 3/2001 | Ballare |
| 6,219,035 B1 | 4/2001 | Skog |
| 6,222,465 B1 | 4/2001 | Kumar et al. |
| 6,222,531 B1 | 4/2001 | Smith |
| 6,229,502 B1 | 5/2001 | Schwab |
| 6,239,790 B1 | 5/2001 | Martinelli et al. |
| 6,243,071 B1 | 6/2001 | Shwarts et al. |
| 6,246,862 B1 | 6/2001 | Grivas et al. |
| 6,249,606 B1 | 6/2001 | Kiraly et al. |
| 6,255,604 B1 | 7/2001 | Tokioka et al. |
| 6,256,020 B1 | 7/2001 | Pabon et al. |
| 6,259,436 B1 | 7/2001 | Moon et al. |
| 6,271,835 B1 | 8/2001 | Hoeksma |
| 6,278,441 B1 | 8/2001 | Gouzman et al. |
| 6,278,443 B1 | 8/2001 | Amro et al. |
| 6,288,707 B1 | 9/2001 | Philipp |
| 6,289,326 B1 | 9/2001 | LaFleur |
| 6,292,178 B1 | 9/2001 | Bernstein et al. |
| 6,292,179 B1 | 9/2001 | Lee |
| 6,295,049 B1 | 9/2001 | Minner |
| 6,295,052 B1 | 9/2001 | Kato et al. |

(56) References Cited

U.S. PATENT DOCUMENTS

| | | | |
|---|---|---|---|
| 6,308,144 B1 | 10/2001 | Bronfield et al. |
| 6,310,610 B1 | 10/2001 | Beaton et al. |
| 6,313,853 B1 | 11/2001 | Lamontagne et al. |
| 6,323,846 B1 | 11/2001 | Westerman et al. |
| 6,326,956 B1 | 12/2001 | Jaeger et al. |
| 6,333,753 B1 | 12/2001 | Hinckley |
| 6,337,678 B1 | 1/2002 | Fish |
| 6,339,748 B1 | 1/2002 | Hiramatsu |
| 6,344,861 B1 | 2/2002 | Naughton et al. |
| 6,347,290 B1 | 2/2002 | Bartlett |
| 6,359,572 B1 | 3/2002 | Vale |
| 6,359,632 B1 | 3/2002 | Eastty et al. |
| 6,377,009 B1 | 4/2002 | Philipp |
| 6,380,931 B1 | 4/2002 | Gillespie et al. |
| 6,400,379 B1 | 6/2002 | Johnson et al. |
| 6,411,287 B1 | 6/2002 | Scharff et al. |
| 6,414,671 B1 | 7/2002 | Gillespie et al. |
| 6,414,672 B2 | 7/2002 | Rekimoto et al. |
| 6,414,674 B1 | 7/2002 | Kamper et al. |
| 6,421,042 B1 | 7/2002 | Omura et al. |
| 6,421,046 B1 | 7/2002 | Edgren |
| 6,421,234 B1 | 7/2002 | Ricks et al. |
| 6,424,338 B1 | 7/2002 | Anderson |
| 6,429,846 B2 | 8/2002 | Rosenberg et al. |
| 6,433,801 B1 | 8/2002 | Moon et al. |
| 6,441,806 B1 | 8/2002 | Jaeger |
| 6,441,807 B1 | 8/2002 | Yamaguchi |
| 6,442,440 B1 | 8/2002 | Miller |
| 6,452,514 B1 | 9/2002 | Philipp |
| 6,456,952 B1 | 9/2002 | Nathan |
| 6,457,355 B1 | 10/2002 | Philipp |
| 6,457,834 B1 | 10/2002 | Cotton et al. |
| 6,466,036 B1 | 10/2002 | Philipp |
| 6,469,722 B1 | 10/2002 | Kinoe et al. |
| 6,473,069 B1 | 10/2002 | Gerpheide |
| 6,473,102 B1 | 10/2002 | Rodden et al. |
| 6,478,432 B1 | 11/2002 | Dyner |
| 6,480,188 B1 | 11/2002 | Horsley |
| 6,481,851 B1 | 11/2002 | McNelley et al. |
| 6,489,978 B1 | 12/2002 | Gong et al. |
| 6,501,464 B1 | 12/2002 | Cobbley et al. |
| 6,501,515 B1 | 12/2002 | Iwamura |
| 6,515,669 B1 | 2/2003 | Mohri |
| 6,525,711 B1 | 2/2003 | Shaw et al. |
| 6,525,749 B1 | 2/2003 | Moran et al. |
| 6,535,200 B2 | 3/2003 | Philipp |
| 6,543,684 B1 | 4/2003 | White et al. |
| 6,543,947 B2 | 4/2003 | Lee |
| 6,545,670 B1 | 4/2003 | Pryor |
| 6,563,492 B1 | 5/2003 | Furuya |
| 6,570,557 B1 | 5/2003 | Westerman et al. |
| 6,570,584 B1 | 5/2003 | Cok et al. |
| 6,573,844 B1 | 6/2003 | Venolia et al. |
| 6,583,676 B2 | 6/2003 | Krah et al. |
| 6,593,916 B1 | 7/2003 | Aroyan |
| 6,597,345 B2 | 7/2003 | Hirshberg |
| 6,610,936 B2 | 8/2003 | Gillespie et al. |
| 6,611,252 B1 | 8/2003 | DuFaux |
| 6,624,833 B1 | 9/2003 | Kumar et al. |
| 6,639,577 B2 | 10/2003 | Eberhard |
| 6,639,584 B1 | 10/2003 | Li |
| 6,650,319 B1 | 11/2003 | Hurst et al. |
| 6,654,733 B1 | 11/2003 | Goodman et al. |
| 6,658,994 B1 | 12/2003 | McMillan |
| 6,661,920 B1 | 12/2003 | Skinner |
| 6,664,989 B1 | 12/2003 | Snyder et al. |
| 6,670,894 B2 | 12/2003 | Mehring |
| 6,677,932 B1 | 1/2004 | Westerman |
| 6,677,933 B1 | 1/2004 | Yogaratnam |
| 6,677,934 B1 | 1/2004 | Blanchard |
| 6,680,677 B1 | 1/2004 | Tiphane |
| 6,690,275 B2 | 2/2004 | Long et al. |
| 6,690,387 B2 | 2/2004 | Zimmerman et al. |
| 6,697,721 B2 | 2/2004 | Arlinsky |
| 6,703,999 B1 | 3/2004 | Iwanami et al. |
| 6,710,771 B1 | 3/2004 | Yamaguchi et al. |
| 6,721,784 B1 | 4/2004 | Leonard et al. |
| 6,724,366 B2 | 4/2004 | Crawford |
| 6,757,002 B1 | 6/2004 | Oross et al. |
| 6,760,020 B1 | 7/2004 | Uchiyama et al. |
| 6,791,467 B1 | 9/2004 | Ben-Ze'ev |
| 6,795,059 B2 | 9/2004 | Endo |
| 6,798,768 B1 | 9/2004 | Gallick et al. |
| 6,803,905 B1 | 10/2004 | Capps et al. |
| 6,803,906 B1 | 10/2004 | Morrison et al. |
| 6,806,869 B2 | 10/2004 | Yamakado |
| 6,819,312 B2 | 11/2004 | Fish |
| 6,834,388 B1* | 12/2004 | Elsbree ............. G05B 19/0426 719/315 |
| 6,842,672 B1 | 1/2005 | Straub et al. |
| 6,856,259 B1 | 2/2005 | Sharp |
| 6,857,800 B2 | 2/2005 | Zhang et al. |
| 6,874,129 B2 | 3/2005 | Smith |
| 6,882,641 B1 | 4/2005 | Gallick et al. |
| 6,888,536 B2 | 5/2005 | Westerman et al. |
| 6,896,375 B2 | 5/2005 | Peterson et al. |
| 6,900,795 B1 | 5/2005 | Knight, III et al. |
| 6,903,730 B2 | 6/2005 | Mathews et al. |
| 6,920,619 B1 | 7/2005 | Milevic |
| 6,926,609 B2 | 8/2005 | Martin |
| 6,927,761 B2 | 8/2005 | Badaye et al. |
| 6,930,661 B2 | 8/2005 | Uchida et al. |
| 6,942,571 B1 | 9/2005 | McAllister et al. |
| 6,944,591 B1 | 9/2005 | Raghunandan |
| 6,952,203 B2 | 10/2005 | Banerjee et al. |
| 6,954,583 B2 | 10/2005 | Nagasaka et al. |
| 6,958,749 B1 | 10/2005 | Matsushita et al. |
| 6,961,912 B2 | 11/2005 | Aoki et al. |
| 6,965,375 B1 | 11/2005 | Gettemy et al. |
| 6,970,749 B1 | 11/2005 | Chinn et al. |
| 6,972,401 B2 | 12/2005 | Akitt et al. |
| 6,972,749 B2 | 12/2005 | Hinckley et al. |
| 6,975,304 B1 | 12/2005 | Hawkins et al. |
| 6,977,666 B1 | 12/2005 | Hedrick |
| 6,985,801 B1 | 1/2006 | Straub et al. |
| 6,992,659 B2 | 1/2006 | Gettemy |
| 7,002,749 B2 | 2/2006 | Kremen |
| 7,015,894 B2 | 3/2006 | Morohoshi |
| 7,022,075 B2 | 4/2006 | Grunwald et al. |
| 7,030,861 B1 | 4/2006 | Westerman et al. |
| 7,030,863 B2 | 4/2006 | Longe et al. |
| 7,031,228 B2 | 4/2006 | Born et al. |
| 7,038,659 B2 | 5/2006 | Rajkowski |
| 7,057,607 B2 | 6/2006 | Mayoraz et al. |
| 7,058,902 B2 | 6/2006 | Iwema et al. |
| 7,075,512 B1 | 7/2006 | Fabre et al. |
| 7,079,114 B1 | 7/2006 | Smith et al. |
| 7,080,324 B1* | 7/2006 | Nelson ............. G06F 3/04847 715/771 |
| 7,084,859 B1 | 8/2006 | Pryor |
| 7,091,410 B2 | 8/2006 | Ito et al. |
| 7,098,891 B1 | 8/2006 | Pryor |
| 7,098,896 B2 | 8/2006 | Kushler et al. |
| 7,100,105 B1 | 8/2006 | Nishimura et al. |
| 7,124,372 B2* | 10/2006 | Brin ............. H04L 12/1822 715/751 |
| 7,128,578 B2* | 10/2006 | Lampotang ............. G09B 23/30 128/204.23 |
| 7,129,416 B1 | 10/2006 | Steinfeld et al. |
| 7,137,077 B2* | 11/2006 | Iwema ............. G06F 3/0481 345/179 |
| 7,143,355 B2 | 11/2006 | Yamaguchi et al. |
| 7,149,981 B1 | 12/2006 | Lundy et al. |
| 7,151,528 B2 | 12/2006 | Taylor et al. |
| 7,158,123 B2 | 1/2007 | Myers et al. |
| 7,180,502 B2 | 2/2007 | Marvit et al. |
| 7,184,064 B2 | 2/2007 | Zimmerman et al. |
| 7,194,699 B2 | 3/2007 | Thomson et al. |
| 7,233,316 B2 | 6/2007 | Smith et al. |
| 7,233,319 B2 | 6/2007 | Johnson et al. |
| 7,240,289 B2 | 7/2007 | Naughton et al. |
| 7,242,311 B2 | 7/2007 | Hoff et al. |
| 7,260,422 B2 | 8/2007 | Knoedgen |
| 7,310,781 B2 | 12/2007 | Chen et al. |

(56) References Cited

U.S. PATENT DOCUMENTS

| | | | |
|---|---|---|---|
| 7,319,454 B2 | 1/2008 | Thacker et al. | |
| 7,320,112 B2 | 1/2008 | Yamaguchi et al. | |
| RE40,153 E | 3/2008 | Westerman et al. | |
| 7,339,580 B2 | 3/2008 | Westerman et al. | |
| 7,340,077 B2 | 3/2008 | Gokturk et al. | |
| 7,340,685 B2 | 3/2008 | Chen et al. | |
| 7,346,853 B2 | 3/2008 | Chen et al. | |
| 7,417,681 B2 | 8/2008 | Lieberman et al. | |
| 7,434,171 B2 * | 10/2008 | Clapper | G06F 1/181 345/184 |
| 7,443,316 B2 | 10/2008 | Lim | |
| 7,466,843 B2 | 12/2008 | Pryor | |
| 7,474,772 B2 | 1/2009 | Russo et al. | |
| 7,475,390 B2 | 1/2009 | Berstis et al. | |
| 7,477,240 B2 | 1/2009 | Yanagisawa | |
| 7,478,336 B2 | 1/2009 | Chen et al. | |
| 7,489,303 B1 | 2/2009 | Pryor | |
| 7,509,113 B2 | 3/2009 | Knoedgen | |
| 7,515,810 B2 | 4/2009 | Nagasaka et al. | |
| 7,519,223 B2 | 4/2009 | Dehlin et al. | |
| 7,526,738 B2 | 4/2009 | Ording et al. | |
| RE40,867 E | 8/2009 | Binstead | |
| 7,593,552 B2 | 9/2009 | Higaki | |
| 7,614,008 B2 | 11/2009 | Ording | |
| 7,653,883 B2 | 1/2010 | Hotelling et al. | |
| 7,663,607 B2 | 2/2010 | Hotelling et al. | |
| 7,664,748 B2 | 2/2010 | Harrity | |
| 7,694,231 B2 | 4/2010 | Kocienda et al. | |
| 7,706,616 B2 | 4/2010 | Kristensson et al. | |
| 7,714,849 B2 | 5/2010 | Pryor | |
| 7,746,325 B2 | 6/2010 | Roberts | |
| 7,827,526 B2 * | 11/2010 | Huin | G06F 8/34 715/763 |
| 7,831,932 B2 | 11/2010 | Josephsoon et al. | |
| 7,856,472 B2 | 12/2010 | Arav | |
| 7,861,188 B2 | 12/2010 | Josephsoon et al. | |
| 7,877,705 B2 | 1/2011 | Chambers et al. | |
| 7,898,529 B2 | 3/2011 | Fitzmaurice et al. | |
| 8,228,305 B2 | 7/2012 | Pryor | |
| 8,239,784 B2 | 8/2012 | Hotelling et al. | |
| 8,314,775 B2 | 11/2012 | Westerman et al. | |
| 8,330,727 B2 | 12/2012 | Westerman et al. | |
| 8,334,846 B2 | 12/2012 | Westerman et al. | |
| 8,381,135 B2 | 2/2013 | Hotelling et al. | |
| 8,384,675 B2 | 2/2013 | Westerman et al. | |
| 8,427,449 B2 | 4/2013 | Pryor | |
| 8,441,453 B2 | 5/2013 | Westerman et al. | |
| 8,466,880 B2 | 6/2013 | Westerman et al. | |
| 8,466,881 B2 | 6/2013 | Westerman et al. | |
| 8,479,122 B2 | 7/2013 | Hotelling et al. | |
| 8,482,533 B2 | 7/2013 | Westerman et al. | |
| 8,482,535 B2 | 7/2013 | Pryor | |
| 8,514,183 B2 | 8/2013 | Westerman et al. | |
| 8,576,177 B2 | 11/2013 | Westerman et al. | |
| 8,593,426 B2 | 11/2013 | Westerman et al. | |
| 8,612,856 B2 | 12/2013 | Hotelling et al. | |
| 8,629,840 B2 | 1/2014 | Westerman et al. | |
| 8,633,898 B2 | 1/2014 | Westerman et al. | |
| 8,665,240 B2 | 3/2014 | Westerman | |
| 8,674,943 B2 | 3/2014 | Westerman et al. | |
| 8,698,755 B2 | 4/2014 | Westerman et al. | |
| 8,730,177 B2 | 5/2014 | Westerman et al. | |
| 8,730,192 B2 | 5/2014 | Westerman et al. | |
| 8,736,555 B2 | 5/2014 | Westerman et al. | |
| 8,850,345 B1 * | 9/2014 | Smith | G06F 3/0484 715/740 |
| 8,866,752 B2 | 10/2014 | Westerman et al. | |
| 8,902,175 B2 | 12/2014 | Westerman et al. | |
| 9,001,068 B2 | 4/2015 | Westerman et al. | |
| 9,098,142 B2 | 8/2015 | Westerman et al. | |
| 9,239,673 B2 | 1/2016 | Shaffer et al. | |
| 9,292,111 B2 | 3/2016 | Westerman et al. | |
| 9,298,310 B2 | 3/2016 | Westerman et al. | |
| 9,329,717 B2 | 5/2016 | Westerman et al. | |
| 9,342,180 B2 | 5/2016 | Westerman et al. | |
| 9,348,452 B2 | 5/2016 | Westerman et al. | |
| 9,348,458 B2 | 5/2016 | Hotelling et al. | |
| 9,383,855 B2 | 7/2016 | Westerman et al. | |
| 9,448,658 B2 | 9/2016 | Westerman et al. | |
| 2001/0012001 A1 | 8/2001 | Rekimoto et al. | |
| 2001/0012022 A1 | 8/2001 | Smith | |
| 2001/0012769 A1 | 8/2001 | Sirola et al. | |
| 2001/0015718 A1 | 8/2001 | Hinckley et al. | |
| 2001/0026678 A1 | 10/2001 | Nagasaka et al. | |
| 2001/0033267 A1 | 10/2001 | Kim et al. | |
| 2001/0040554 A1 | 11/2001 | Nakagawa | |
| 2001/0055038 A1 | 12/2001 | Kim | |
| 2002/0015024 A1 | 2/2002 | Westerman et al. | |
| 2002/0018051 A1 | 2/2002 | Singh | |
| 2002/0044132 A1 | 4/2002 | Fish | |
| 2002/0044161 A1 | 4/2002 | Sugai | |
| 2002/0051018 A1 | 5/2002 | Yeh | |
| 2002/0054175 A1 | 5/2002 | Miettinen et al. | |
| 2002/0057260 A1 | 5/2002 | Mathews et al. | |
| 2002/0075317 A1 | 6/2002 | Dardick | |
| 2002/0080123 A1 | 6/2002 | Kennedy et al. | |
| 2002/0085037 A1 | 7/2002 | Leavitt et al. | |
| 2002/0113778 A1 | 8/2002 | Rekimoto et al. | |
| 2002/0118848 A1 | 8/2002 | Karpenstein | |
| 2002/0120543 A1 | 8/2002 | Brittingham et al. | |
| 2002/0130839 A1 | 9/2002 | Wallace et al. | |
| 2002/0133522 A1 | 9/2002 | Greetham et al. | |
| 2002/0135615 A1 | 9/2002 | Lang | |
| 2002/0140633 A1 | 10/2002 | Rafii et al. | |
| 2002/0140668 A1 | 10/2002 | Crawford | |
| 2002/0140679 A1 | 10/2002 | Wen | |
| 2002/0140680 A1 | 10/2002 | Lu | |
| 2002/0141643 A1 * | 10/2002 | Jaeger | G06F 3/0481 382/181 |
| 2002/0167545 A1 | 11/2002 | Kang et al. | |
| 2002/0180763 A1 | 12/2002 | Kung et al. | |
| 2002/0191029 A1 | 12/2002 | Gillespie et al. | |
| 2002/0196227 A1 | 12/2002 | Surloff et al. | |
| 2002/0196238 A1 | 12/2002 | Tsukada et al. | |
| 2002/0196274 A1 | 12/2002 | Comfort et al. | |
| 2003/0001899 A1 | 1/2003 | Partanen et al. | |
| 2003/0005454 A1 | 1/2003 | Rodriguez et al. | |
| 2003/0006974 A1 | 1/2003 | Clough et al. | |
| 2003/0016253 A1 | 1/2003 | Aoki et al. | |
| 2003/0030664 A1 | 2/2003 | Parry | |
| 2003/0063073 A1 | 4/2003 | Geaghan et al. | |
| 2003/0071850 A1 | 4/2003 | Geidl | |
| 2003/0071858 A1 | 4/2003 | Morohoshi | |
| 2003/0072077 A1 | 4/2003 | Peterson et al. | |
| 2003/0073461 A1 | 4/2003 | Sinclair | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0076363 A1 | 4/2003 | Murphy | |
| 2003/0095095 A1 | 5/2003 | Pihlaja | |
| 2003/0095096 A1 | 5/2003 | Robbin et al. | |
| 2003/0095135 A1 | 5/2003 | Kaasila et al. | |
| 2003/0098858 A1 | 5/2003 | Perski et al. | |
| 2003/0128188 A1 | 7/2003 | Wilbrink et al. | |
| 2003/0128195 A1 | 7/2003 | Banerjee et al. | |
| 2003/0132922 A1 | 7/2003 | Philipp | |
| 2003/0132950 A1 | 7/2003 | Surucu et al. | |
| 2003/0152241 A1 | 8/2003 | Eastty et al. | |
| 2003/0160808 A1 | 8/2003 | Foote et al. | |
| 2003/0164820 A1 | 9/2003 | Kent | |
| 2003/0169303 A1 | 9/2003 | Islam et al. | |
| 2003/0179201 A1 | 9/2003 | Thacker | |
| 2003/0193481 A1 | 10/2003 | Sokolsky | |
| 2003/0197736 A1 | 10/2003 | Murphy | |
| 2003/0201972 A1 | 10/2003 | Usuda | |
| 2003/0206202 A1 | 11/2003 | Moriya | |
| 2003/0210260 A1 | 11/2003 | Palmer et al. | |
| 2003/0210286 A1 | 11/2003 | Gerpheide et al. | |
| 2003/0214534 A1 | 11/2003 | Uemura et al. | |
| 2003/0222977 A1 | 12/2003 | Yoshino | |
| 2003/0234768 A1 | 12/2003 | Rekimoto et al. | |
| 2003/0237043 A1 | 12/2003 | Novak et al. | |
| 2004/0001048 A1 | 1/2004 | Kraus et al. | |
| 2004/0009788 A1 | 1/2004 | Mantyjarvi et al. | |

(56) References Cited

U.S. PATENT DOCUMENTS

| | | |
|---|---|---|
| 2004/0017499 A1 | 1/2004 | Ambiru |
| 2004/0019505 A1 | 1/2004 | Bowman et al. |
| 2004/0021643 A1 | 2/2004 | Hoshino et al. |
| 2004/0021644 A1 | 2/2004 | Enomoto |
| 2004/0021696 A1 | 2/2004 | Molgaard |
| 2004/0021701 A1* | 2/2004 | Iwema ............... G06F 3/0481 715/863 |
| 2004/0036622 A1 | 2/2004 | Dukach et al. |
| 2004/0046887 A1 | 3/2004 | Ikehata et al. |
| 2004/0053661 A1 | 3/2004 | Jones et al. |
| 2004/0056837 A1 | 3/2004 | Koga et al. |
| 2004/0056839 A1 | 3/2004 | Yoshihara |
| 2004/0056849 A1 | 3/2004 | Lohbihler et al. |
| 2004/0064473 A1 | 4/2004 | Thomas et al. |
| 2004/0080529 A1 | 4/2004 | Wojcik |
| 2004/0100479 A1 | 5/2004 | Nakano et al. |
| 2004/0119750 A1 | 6/2004 | Harrison |
| 2004/0125081 A1 | 7/2004 | Hayakawa |
| 2004/0134238 A1 | 7/2004 | Buckroyd et al. |
| 2004/0135774 A1 | 7/2004 | La Monica |
| 2004/0135818 A1 | 7/2004 | Thomson et al. |
| 2004/0136564 A1 | 7/2004 | Roeber et al. |
| 2004/0140956 A1 | 7/2004 | Kushler et al. |
| 2004/0141010 A1* | 7/2004 | Fitzmaurice ......... G06F 3/0488 715/810 |
| 2004/0141157 A1 | 7/2004 | Ramachandran et al. |
| 2004/0145601 A1 | 7/2004 | Brielmann et al. |
| 2004/0146688 A1 | 7/2004 | Treat |
| 2004/0150668 A1 | 8/2004 | Myers et al. |
| 2004/0150669 A1 | 8/2004 | Sabiers et al. |
| 2004/0155888 A1 | 8/2004 | Padgitt et al. |
| 2004/0160419 A1 | 8/2004 | Padgitt |
| 2004/0165924 A1 | 8/2004 | Griffin |
| 2004/0178994 A1 | 9/2004 | Kairls, Jr. |
| 2004/0181749 A1 | 9/2004 | Chellapilla et al. |
| 2004/0183833 A1 | 9/2004 | Chua |
| 2004/0189720 A1 | 9/2004 | Wilson et al. |
| 2004/0198463 A1 | 10/2004 | Knoedgen |
| 2004/0218963 A1 | 11/2004 | Van Diepen et al. |
| 2004/0227739 A1 | 11/2004 | Tani et al. |
| 2004/0227830 A1 | 11/2004 | Kobayashi et al. |
| 2004/0230912 A1 | 11/2004 | Clow et al. |
| 2004/0237052 A1 | 11/2004 | Allport |
| 2004/0245352 A1 | 12/2004 | Smith |
| 2004/0262387 A1 | 12/2004 | Hart |
| 2004/0263484 A1 | 12/2004 | Mantysalo et al. |
| 2005/0005241 A1 | 1/2005 | Hunleth et al. |
| 2005/0012723 A1 | 1/2005 | Pallakoff |
| 2005/0015731 A1 | 1/2005 | Mak et al. |
| 2005/0016366 A1 | 1/2005 | Ito et al. |
| 2005/0024341 A1 | 2/2005 | Gillespie et al. |
| 2005/0052425 A1 | 3/2005 | Zadesky et al. |
| 2005/0052427 A1 | 3/2005 | Wu et al. |
| 2005/0057524 A1 | 3/2005 | Hill et al. |
| 2005/0064936 A1 | 3/2005 | Pryor |
| 2005/0066270 A1 | 3/2005 | Ali et al. |
| 2005/0071771 A1 | 3/2005 | Nagasawa et al. |
| 2005/0078087 A1 | 4/2005 | Gates et al. |
| 2005/0091577 A1 | 4/2005 | Torres et al. |
| 2005/0104867 A1 | 5/2005 | Westerman et al. |
| 2005/0110768 A1 | 5/2005 | Marriott et al. |
| 2005/0116941 A1 | 6/2005 | Wallington |
| 2005/0120312 A1 | 6/2005 | Nguyen |
| 2005/0132072 A1 | 6/2005 | Pennell et al. |
| 2005/0134578 A1 | 6/2005 | Chambers et al. |
| 2005/0162402 A1 | 7/2005 | Watanachote |
| 2005/0169503 A1 | 8/2005 | Howell et al. |
| 2005/0169527 A1 | 8/2005 | Longe et al. |
| 2005/0171783 A1 | 8/2005 | Suominen |
| 2005/0174975 A1 | 8/2005 | Mgrdechian et al. |
| 2005/0190970 A1 | 9/2005 | Griffin |
| 2005/0204008 A1 | 9/2005 | Shinbrood |
| 2005/0204889 A1 | 9/2005 | Swingle et al. |
| 2005/0211766 A1 | 9/2005 | Robertson et al. |
| 2005/0223308 A1 | 10/2005 | Gunn et al. |
| 2005/0253816 A1 | 11/2005 | Himberg et al. |
| 2005/0253818 A1 | 11/2005 | Nettamo |
| 2005/0259087 A1 | 11/2005 | Hoshino et al. |
| 2006/0001650 A1 | 1/2006 | Robbins et al. |
| 2006/0007174 A1 | 1/2006 | Shen |
| 2006/0010374 A1 | 1/2006 | Corrington et al. |
| 2006/0010400 A1 | 1/2006 | Dehlin et al. |
| 2006/0012577 A1 | 1/2006 | Kyrola |
| 2006/0022955 A1 | 2/2006 | Kennedy |
| 2006/0022956 A1 | 2/2006 | Lengeling et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031752 A1 | 2/2006 | Surloff et al. |
| 2006/0032680 A1 | 2/2006 | Elias et al. |
| 2006/0033724 A1 | 2/2006 | Chaudhri et al. |
| 2006/0035681 A1 | 2/2006 | Oh |
| 2006/0044259 A1 | 3/2006 | Hotelling et al. |
| 2006/0052885 A1 | 3/2006 | Kong |
| 2006/0053387 A1 | 3/2006 | Ording |
| 2006/0066582 A1 | 3/2006 | Lyon et al. |
| 2006/0066590 A1 | 3/2006 | Ozawa et al. |
| 2006/0071915 A1 | 4/2006 | Rehm |
| 2006/0085757 A1 | 4/2006 | Andre et al. |
| 2006/0085767 A1 | 4/2006 | Hinckley et al. |
| 2006/0125803 A1 | 6/2006 | Westerman et al. |
| 2006/0150120 A1 | 7/2006 | Dresti et al. |
| 2006/0161846 A1 | 7/2006 | Van Leeuwen |
| 2006/0161870 A1 | 7/2006 | Hotelling et al. |
| 2006/0161871 A1 | 7/2006 | Hotelling et al. |
| 2006/0167993 A1 | 7/2006 | Aaron et al. |
| 2006/0181517 A1 | 8/2006 | Zadesky et al. |
| 2006/0181519 A1 | 8/2006 | Vernier et al. |
| 2006/0197750 A1 | 9/2006 | Hotelling et al. |
| 2006/0197753 A1 | 9/2006 | Hotelling |
| 2006/0232567 A1 | 10/2006 | Westerman et al. |
| 2006/0238517 A1 | 10/2006 | King et al. |
| 2006/0238518 A1 | 10/2006 | Westerman et al. |
| 2006/0238519 A1 | 10/2006 | Westerman et al. |
| 2006/0238520 A1 | 10/2006 | Westerman et al. |
| 2006/0238521 A1 | 10/2006 | Westerman et al. |
| 2006/0238522 A1 | 10/2006 | Westerman et al. |
| 2006/0242587 A1 | 10/2006 | Eagle et al. |
| 2006/0242607 A1 | 10/2006 | Hudson |
| 2006/0244735 A1 | 11/2006 | Wilson |
| 2006/0253793 A1 | 11/2006 | Zhai et al. |
| 2006/0265668 A1 | 11/2006 | Rainisto |
| 2006/0274051 A1 | 12/2006 | Longe et al. |
| 2006/0290921 A1 | 12/2006 | Hotelling et al. |
| 2007/0011603 A1 | 1/2007 | Makela |
| 2007/0033269 A1 | 2/2007 | Atkinson et al. |
| 2007/0061754 A1 | 3/2007 | Ardhanari et al. |
| 2007/0070050 A1 | 3/2007 | Westerman et al. |
| 2007/0070051 A1 | 3/2007 | Westerman et al. |
| 2007/0070052 A1 | 3/2007 | Westerman et al. |
| 2007/0078919 A1 | 4/2007 | Westerman et al. |
| 2007/0081726 A1 | 4/2007 | Westerman et al. |
| 2007/0083823 A1 | 4/2007 | Jaeger |
| 2007/0087766 A1 | 4/2007 | Hardy et al. |
| 2007/0088787 A1 | 4/2007 | Hardy et al. |
| 2007/0139395 A1 | 6/2007 | Westerman et al. |
| 2007/0150830 A1 | 6/2007 | Ording |
| 2007/0159453 A1 | 7/2007 | Inoue |
| 2007/0171210 A1 | 7/2007 | Chaudhri et al. |
| 2007/0176906 A1 | 8/2007 | Warren |
| 2007/0177803 A1 | 8/2007 | Elias et al. |
| 2007/0177804 A1 | 8/2007 | Elias et al. |
| 2007/0180360 A1 | 8/2007 | Neil |
| 2007/0222768 A1 | 9/2007 | Geurts et al. |
| 2007/0229464 A1 | 10/2007 | Hotelling et al. |
| 2007/0236466 A1 | 10/2007 | Hotelling |
| 2007/0247429 A1 | 10/2007 | Westerman |
| 2007/0257890 A1 | 11/2007 | Hotelling et al. |
| 2007/0268273 A1 | 11/2007 | Westerman et al. |
| 2007/0268274 A1 | 11/2007 | Westerman et al. |
| 2007/0268275 A1 | 11/2007 | Westerman et al. |
| 2007/0276875 A1 | 11/2007 | Brunswig et al. |
| 2008/0016468 A1 | 1/2008 | Chambers et al. |
| 2008/0024463 A1 | 1/2008 | Pryor |

(56) References Cited

U.S. PATENT DOCUMENTS

| | | |
|---|---|---|
| 2008/0036743 A1 | 2/2008 | Westerman et al. |
| 2008/0040692 A1 | 2/2008 | Sunday |
| 2008/0041639 A1 | 2/2008 | Westerman et al. |
| 2008/0042986 A1 | 2/2008 | Westerman et al. |
| 2008/0042987 A1 | 2/2008 | Westerman et al. |
| 2008/0042988 A1 | 2/2008 | Westerman et al. |
| 2008/0042989 A1 | 2/2008 | Westerman et al. |
| 2008/0088587 A1 | 4/2008 | Pryor |
| 2008/0128182 A1 | 6/2008 | Westerman et al. |
| 2008/0129707 A1 | 6/2008 | Pryor |
| 2008/0139297 A1 | 6/2008 | Beaulieu et al. |
| 2008/0174553 A1 | 7/2008 | Trust |
| 2008/0189622 A1 | 8/2008 | Sanchez et al. |
| 2008/0211775 A1 | 9/2008 | Hotelling et al. |
| 2008/0211779 A1 | 9/2008 | Pryor |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0229236 A1 | 9/2008 | Carrer et al. |
| 2008/0231610 A1 | 9/2008 | Hotelling et al. |
| 2008/0297476 A1 | 12/2008 | Hotelling et al. |
| 2008/0309626 A1 | 12/2008 | Westerman |
| 2008/0316183 A1 | 12/2008 | Westerman et al. |
| 2009/0021489 A1 | 1/2009 | Westerman et al. |
| 2009/0064006 A1 | 3/2009 | Naick et al. |
| 2009/0160816 A1 | 6/2009 | Westerman et al. |
| 2009/0244031 A1 | 10/2009 | Westerman et al. |
| 2009/0244032 A1 | 10/2009 | Westerman et al. |
| 2009/0244033 A1 | 10/2009 | Westerman et al. |
| 2009/0249236 A1 | 10/2009 | Westerman et al. |
| 2009/0251435 A1 | 10/2009 | Westerman et al. |
| 2009/0251438 A1 | 10/2009 | Westerman et al. |
| 2009/0251439 A1 | 10/2009 | Westerman et al. |
| 2009/0267921 A1 | 10/2009 | Pryor |
| 2009/0273563 A1 | 11/2009 | Pryor |
| 2009/0273574 A1 | 11/2009 | Pryor |
| 2009/0273575 A1 | 11/2009 | Pryor |
| 2009/0300531 A1 | 12/2009 | Pryor |
| 2009/0322499 A1 | 12/2009 | Pryor |
| 2010/0149092 A1 | 6/2010 | Westerman et al. |
| 2010/0149134 A1 | 6/2010 | Westerman et al. |
| 2010/0231506 A1 | 9/2010 | Pryor |
| 2011/0037725 A1 | 2/2011 | Pryor |
| 2012/0223894 A1 | 9/2012 | Zhao |
| 2012/0293442 A1 | 11/2012 | Westerman et al. |
| 2013/0009900 A1 | 1/2013 | Pryor |
| 2013/0147761 A1 | 6/2013 | Westerman et al. |
| 2013/0154982 A1 | 6/2013 | Hotelling et al. |
| 2013/0241823 A1 | 9/2013 | Pryor |
| 2013/0241847 A1 | 9/2013 | Hotelling et al. |
| 2013/0265263 A1 | 10/2013 | Westerman et al. |
| 2014/0074426 A1 | 3/2014 | Hotelling |
| 2014/0160068 A1 | 6/2014 | Westerman et al. |
| 2014/0176499 A1 | 6/2014 | Westerman et al. |
| 2015/0029152 A1 | 1/2015 | Westerman et al. |
| 2016/0246441 A1 | 8/2016 | Westerman et al. |

FOREIGN PATENT DOCUMENTS

| | | |
|---|---|---|
| DE | 100 15 903 A1 * | 3/2000 |
| DE | 100 42 300 A1 | 3/2002 |
| DE | 100 59 906 A1 | 6/2002 |
| DE | 101 40 874 A1 | 3/2003 |
| DE | 102 51 296 A1 | 5/2004 |
| EP | 0 394 614 A2 | 10/1990 |
| EP | 0 422 577 A2 | 4/1991 |
| EP | 0 422 577 A3 | 4/1991 |
| EP | 0 462 759 A2 | 12/1991 |
| EP | 0 462 759 A3 | 12/1991 |
| EP | 0 462 759 B1 | 12/1991 |
| EP | 0 464 908 | 1/1992 |
| EP | 0 288 692 | 7/1993 |
| EP | 0 588 210 A1 | 3/1994 |
| EP | 0 588 210 B1 | 3/1994 |
| EP | 0 622 722 A2 | 11/1994 |
| EP | 0 622 722 A3 | 11/1994 |
| EP | 0 622 722 B1 | 11/1994 |
| EP | 0 664 504 | 7/1995 |
| EP | 0 817 000 A1 | 1/1998 |
| EP | 0 817 000 B1 | 1/1998 |
| EP | 0 880 090 A2 | 11/1998 |
| EP | 0 880 090 A3 | 11/1998 |
| EP | 0 926 588 A2 | 6/1999 |
| EP | 1 014 295 | 1/2002 |
| EP | 1 233 330 A2 | 8/2002 |
| EP | 1 271 295 A2 | 1/2003 |
| EP | 1 271 295 A3 | 1/2003 |
| EP | 1 517 228 A2 | 3/2005 |
| EP | 1 569 079 A1 | 8/2005 |
| EP | 1 505 484 A1 | 9/2005 |
| EP | 1 674 976 A2 | 6/2006 |
| EP | 1 674 976 A3 | 6/2006 |
| EP | 2 390 774 A2 | 11/2011 |
| GB | 2330670 A | 4/1999 |
| GB | 2 332 293 A | 6/1999 |
| GB | 2 337 349 A1 | 11/1999 |
| GB | 2344894 A | 6/2000 |
| GB | 2 351 639 A | 1/2001 |
| GB | 2 380 583 A | 4/2003 |
| JP | 60-198586 A | 10/1985 |
| JP | 63-167923 A | 7/1988 |
| JP | 04-048318 A | 2/1992 |
| JP | 04-054523 A | 2/1992 |
| JP | 04-198795 A | 7/1992 |
| JP | 05-297979 A | 11/1993 |
| JP | 06-019663 A | 1/1994 |
| JP | 06-161661 A | 6/1994 |
| JP | 7-129312 A | 5/1995 |
| JP | 7-230352 A | 8/1995 |
| JP | 09-033278 A | 2/1997 |
| JP | 9-330175 A | 12/1997 |
| JP | 10-039748 A | 2/1998 |
| JP | 10-171600 A | 6/1998 |
| JP | 11-053093 A | 2/1999 |
| JP | 11-073271 A | 3/1999 |
| JP | 11-085380 A | 3/1999 |
| JP | 11-119911 A | 4/1999 |
| JP | 11-133816 A | 5/1999 |
| JP | 11-175258 A | 7/1999 |
| JP | 11-194863 A | 7/1999 |
| JP | 2000-010705 A | 1/2000 |
| JP | 2000-163031 A | 6/2000 |
| JP | 2000-163193 A | 6/2000 |
| JP | 2000-163444 A | 6/2000 |
| JP | 2000-231670 A | 8/2000 |
| JP | 2001-134382 A | 5/2001 |
| JP | 2001-147918 A | 5/2001 |
| JP | 2001-230992 A | 8/2001 |
| JP | 2001-356870 A | 12/2001 |
| JP | 2002-034023 A | 1/2002 |
| JP | 2002-501271 A | 1/2002 |
| JP | 2002-342033 A | 11/2002 |
| JP | 2003-173237 A | 6/2003 |
| JP | 2004-110388 A | 4/2004 |
| JP | 2005063305 A * | 3/2005 |
| JP | 2005196476 A * | 7/2005 |
| KR | 10-2001-0040410 A | 5/2001 |
| KR | 4057131 A | 7/2004 |
| WO | WO-92/02000 A | 2/1992 |
| WO | WO-94/29788 A1 | 12/1994 |
| WO | WO-97/18547 | 5/1997 |
| WO | WO-97/23738 | 7/1997 |
| WO | WO-97/36225 A1 | 10/1997 |
| WO | WO-97/40744 A1 | 11/1997 |
| WO | WO-98/14863 | 4/1998 |
| WO | WO-98/33111 A1 | 7/1998 |
| WO | WO-99/28813 A1 | 6/1999 |
| WO | WO-99/38149 A1 | 7/1999 |
| WO | WO-99/54807 A1 | 10/1999 |
| WO | WO-00/38042 A1 | 6/2000 |
| WO | WO-01/02949 A1 | 1/2001 |
| WO | WO-02/01482 A1 | 1/2002 |
| WO | WO-02/39245 A2 | 5/2002 |
| WO | WO-02/39245 A3 | 5/2002 |

(56) References Cited

FOREIGN PATENT DOCUMENTS

| WO | WO-02/39245 C2 | 5/2002 |
|----|----|----|
| WO | WO-03/027822 A2 | 4/2003 |
| WO | WO-03/027822 A3 | 4/2003 |
| WO | WO-03/036457 A2 | 5/2003 |
| WO | WO-03/036457 A3 | 5/2003 |
| WO | WO-03/062978 A2 | 7/2003 |
| WO | WO-03/062978 A3 | 7/2003 |
| WO | WO-03/088176 | 10/2003 |
| WO | WO-03/098417 A2 | 11/2003 |
| WO | WO-03/098417 A3 | 11/2003 |
| WO | WO-03/098421 A1 | 11/2003 |
| WO | WO-2004/029789 A2 | 4/2004 |
| WO | WO-2004/029789 A3 | 4/2004 |
| WO | WO-2004/047069 A1 | 6/2004 |
| WO | WO-2004/051392 A2 | 6/2004 |
| WO | WO-2004/051392 A3 | 6/2004 |
| WO | WO-2004/091956 A2 | 10/2004 |
| WO | WO-2004/091956 A3 | 10/2004 |
| WO | WO-2005/064442 A1 | 7/2005 |
| WO | WO-2005/114369 A2 | 12/2005 |
| WO | WO-2006/003590 A2 | 1/2006 |
| WO | WO-2006/003590 A3 | 1/2006 |
| WO | WO-2006/020304 A2 | 2/2006 |
| WO | WO-2006/020304 A3 | 2/2006 |
| WO | WO-2006/020305 A2 | 2/2006 |
| WO | WO-2006/020305 A3 | 2/2006 |
| WO | WO-2006/023569 | 3/2006 |
| WO | WO-2006/026012 A2 | 3/2006 |
| WO | WO-2007/037808 A1 | 4/2007 |
| WO | WO-2007/037809 A1 | 4/2007 |
| WO | WO-2007/089766 A2 | 8/2007 |
| WO | WO-2007/089766 A3 | 8/2007 |
| WO | WO-2008/094791 A2 | 7/2008 |
| WO | WO-2008/094791 A3 | 7/2008 |
| WO | WO-2010/135478 A2 | 11/2010 |
| WO | WO-2014/043275 A1 | 3/2014 |

OTHER PUBLICATIONS

Non-Final Office Action mailed Nov. 8, 2012, for U.S. Appl. No. 12/479,678, filed Jun. 5, 2009, five pages.
Non-Final Office Action mailed Nov. 16, 2012, for U.S. Appl. No. 13/569,065, filed Aug. 7, 2012, eight pages.
Non-Final Office Action mailed Nov. 29, 2012, for U.S. Appl. No. 11/559,833, filed Nov. 14, 2006, 10 pages.
Final Office Action mailed Dec. 12, 2012, for U.S. Appl. No. 12/500,984, filed Jul. 10, 2009, 10 pages.
Final Office Action mailed Jan. 4, 2013, for U.S. Appl. No. 12/118,659, filed May 9, 2008, six pages.
Non-Final Office Action mailed Oct. 26, 2012, for U.S. Appl. No. 12/468,401, filed May 19, 2009, 22 pages.
Non-Final Office Action mailed Dec. 18, 2012, for U.S. Appl. No. 11/878,024, filed Jul. 20, 2007, eight pages.
Non-Final Office Action mailed Dec. 19, 2012, for U.S. Appl. No. 11/048,264, filed Jan. 31, 2005, nine pages.
Non-Final Office Action mailed Jan. 4, 2013, for U.S. Appl. No. 12/139,411, filed Jun. 13, 2008, six pages.
Notice of Allowance mailed Dec. 6, 2012, for U.S. Appl. No. 10/903,964, filed Jul. 30, 2004, six pages.
Notice of Allowance mailed Jan. 15, 2013, for U.S. Appl. No. 12/479,617, filed Jun. 5, 2009, 10 pages.
Final Office Action mailed Jan. 29, 2013, for U.S. Appl. No. 11/830,766, filed Jul. 30, 2007, 16 pages.
Final Office Action mailed Jan. 29, 2013, for U.S. Appl. No. 11/830,774, filed Jul. 30, 2007, 19 pages.
Final Office Action mailed Feb. 15, 2013, for U.S. Appl. No. 12/422,205, filed Apr. 10, 2009, 16 pages.
Non-Final Office Action mailed Feb. 14, 2013, for U.S. Appl. No. 11/228,758, filed Sep. 16, 2005, 14 pages.
Non-Final Office Action mailed Feb. 21, 2013, for U.S. Appl. No. 12/422,197, filed Apr. 10, 2009, 12 pages.
Notice of Allowance mailed Dec. 24, 2012, for U.S. Appl. No. 13/556,019, filed Jul. 23, 2012, five pages.
Notice of Allowance mailed Feb. 8, 2013, for U.S. Appl. No. 11/830,801, filed Jul. 30, 2007, seven pages.
Notice of Allowance mailed Feb. 15, 2013, for U.S. Appl. No. 11/559,799, filed Nov. 14, 2006, 13 pages.
Notice of Allowance mailed Feb. 19, 2013, for U.S. Appl. No. 12/422,212, filed Apr. 10, 2009, nine pages.
Notice of Allowance mailed Feb. 21, 2013, for U.S. Appl. No. 12/342,027, filed Dec. 22, 2008, 10 pages.
Notice of Allowance mailed Feb. 22, 2013, for U.S. Appl. No. 12/500,978, filed Jul. 10, 2009, five pages.
Notice of Allowance mailed Mar. 5, 2013, for U.S. Appl. No. 12/434,439, filed May 1, 2009, nine pages.
Notice of Allowance mailed Mar. 6, 2013, for U.S. Appl. No. 10/903,964, filed Jul. 30, 2004, seven pages.
European Search Report mailed Feb. 25, 2013, for EP Application No. 13150499.5, five pages.
Final Office Action mailed Mar. 21, 2013, for U.S. Appl. No. 11/830,788, filed Jul. 30, 2007, 12 pages.
Final Office Action mailed Apr. 12, 2013, for U.S. Appl. No. 11/830,793, filed Jul. 30, 2007, 15 pages.
Final Office Action mailed Apr. 30, 2013, for U.S. Appl. No. 11/559,833, filed Nov. 14, 2006, 10 pages.
Final Office Action mailed May 9, 2013, for U.S. Appl. No. 11/832,134, filed Aug. 1, 2007, 29 pages.
Final Office Action mailed May 9, 2013, for U.S. Appl. No. 13/569,065, filed Aug. 7, 2012, nine pages.
Non-Final Office Action mailed Mar. 18, 2013, for U.S. Appl. No. 12/422,222, filed Apr. 10, 2009, 15 pages.
Non-Final Office Action mailed Mar. 19, 2013, for U.S. Appl. No. 12/468,401, filed May 19, 2009, 21 pages.
Non-Final Office Action mailed Mar. 26, 2013, for U.S. Appl. No. 13/757,726, filed Feb. 1, 2013, eight pages.
Non-Final Office Action mailed May 9, 2013, for U.S. Appl. No. 11/980,721, filed Oct. 31, 2007, 14 pages.
Non-Final Office Action mailed May 15, 2013, for U.S. Appl. No. 11/980,722, filed Oct. 31, 2007, 11 pages.
Notice of Allowance mailed Apr. 2, 2013, for U.S. Appl. No. 12/479,678, filed Jun. 5, 2009, 11 pages.
Final Office Action mailed Jul. 9, 2013, for U.S. Appl. No. 11/048,264, filed Jan. 31, 2005, 10 pages.
Final Office Action mailed Jul. 11, 2013, for U.S. Appl. No. 13/757,726, filed Feb. 1, 2013, nine pages.
Non-Final Office Action mailed Jun. 21, 2013, for U.S. Appl. No. 11/830,774, filed Jul. 30, 2007, 18 pages.
Non-Final Office Action mailed Jul. 18, 2013, for U.S. Appl. No. 11/830,766, filed Jul. 30, 2007, 15 pages.
Notice of Allowance mailed May 31, 2013, for U.S. Appl. No. 11/878,024, filed Jul. 20, 2007, nine pages.
Notice of Allowance mailed Jul. 8, 2013, for U.S. Appl. No. 12/500,984, filed Jul. 10, 2009, 6 pages.
Non-Final Office Action mailed Aug. 16, 2013, for U.S. Appl. No. 11/830,793, filed Jul. 30, 2007, 16 pages.
Notice of Allowance mailed Aug. 21, 2013, for U.S. Appl. No. 13/757,726, filed Feb. 1, 2013, six pages.
Notice of Allowance mailed Aug. 27, 2013, for U.S. Appl. No. 13/766,570, filed Feb. 13, 2013, nine pages.
Final Office Action mailed Oct. 11, 2013, for U.S. Appl. No. 12/422,222, filed Apr. 10, 2009, 16 pages.
Non-Final Office Action mailed Oct. 11, 2013, for U.S. Appl. No. 12/422,197, filed Apr. 10, 2009, 12 pages.
Notice of Allowance mailed Oct. 8, 2013, for U.S. Appl. No. 11/830,774, filed Jul. 30, 2007, 11 pages.
Notice of Allowance mailed Oct. 17, 2013, for U.S. Appl. No. 11/559,833, filed Nov. 14, 2006, 12 pages.
Notice of Allowance mailed Nov. 1, 2013, for U.S. Appl. No. 13/895,221, filed May 15, 2013, 12 pages.
International Search Report mailed Dec. 4, 2013, for PCT Application No. PCT/US2013/059314, filed Sep. 11, 2013, six pages.
Notice of Allowance mailed Jan. 2, 2014, for U.S. Appl. No. 11/830,766, filed Jul. 30, 2007, 10 pages.

(56) References Cited

OTHER PUBLICATIONS

Notice of Allowance mailed Jan. 6, 2014, for U.S. Appl. No. 11/830,788, filed Jul. 30, 2007, 13 pages.
Notice of Allowance mailed Jan. 6, 2014, for U.S. Appl. No. 11/830,793, filed Jul. 30, 2007, 12 pages.
Notice of Allowance mailed Jan. 10, 2014, for U.S. Appl. No. 13/569,065, filed Aug. 7, 2012, eight pages.
Final Office Action mailed Feb. 21, 2014, for U.S. Appl. No. 12/422,197, filed Apr. 10, 2009, 14 pages.
Non-Final Office Action mailed Feb. 13, 2014, for U.S. Appl. No. 12/139,411, filed Jun. 13, 2008, seven pages.
Non-Final Office Action mailed Apr. 10, 2014, for U.S. Appl. No. 12/422,205, filed Apr. 10, 2009, 21 pages.
Notice of Allowance mailed Jun. 9, 2014, for U.S. Appl. No. 14/163,929, filed Jan. 24, 2014, seven pages.
Non-Final Office Action mailed Jun. 12, 2014, for U.S. Appl. No. 14/089,240, filed Nov. 25, 2013, 11 pages.
Notice of Allowance mailed Aug. 4, 2014, for U.S. Appl. No. 12/422,197, filed Apr. 10, 2009, 10 pages.
Final Office Action mailed Sep. 19, 2014, for U.S. Appl. No. 12/139,411, filed Jun. 13, 2008, eight pages.
Final Office Action mailed Sep. 24, 2014, for U.S. Appl. No. 12/422,205, filed Apr. 10, 2009, 17 pages.
Non-Final Office Action mailed Sep. 2, 2014, for U.S. Appl. No. 11/048,264, filed Jan. 31, 2005, 9 pages.
Final Office Action mailed Dec. 3, 2014, for U.S. Appl. No. 14/089,240, filed Nov. 25, 2013, 12 pages.
Non-Final Office Action mailed Dec. 4, 2014, for U.S. Appl. No. 12/422,205, filed Apr. 10, 2009, 16 pages.
Non-Final Office Action mailed Feb. 24, 2015, for U.S. Appl. No. 13/620,299, filed Sep. 14, 2012, six pages.
Non-Final Office Action mailed Apr. 3, 2015, for U.S. Appl. No. 14/476,545, filed Sep. 3, 2014, 11 pages.
Non-Final Office Action mailed Apr. 24, 2015, for U.S. Appl. No. 11/048,264, filed Jan. 31, 2005, nine pages.
Non-Final Office Action mailed Jun. 2, 2015, for U.S. Appl. No. 11/428,522, filed Jul. 3, 2006, six pages.
Non-Final Office Action mailed Sep. 17, 2015, for U.S. Appl. No. 12/422,205, filed Apr. 10, 2009, 16 pages.
Notice of Allowance mailed Sep. 14, 2015, for U.S. Appl. No. 13/610,672, filed Sep. 11, 2012, nine pages.
Non-Final Office Action mailed Oct. 8, 2015, for U.S. Appl. No. 12/139,411, filed Jun. 13, 2008, seven pages.
Chinese Search Report mailed Sep. 21, 2015, for Chinese Patent Application No. 2013101786229, filed Jul. 19, 2005, two pages.
Final Office Action mailed Jul. 9, 2015, for U.S. Appl. No. 13/620,299, filed Sep. 14, 2012, eight pages.
Notice of Allowance mailed Nov. 5, 2015, for U.S. Appl. No. 14/476,545, filed Sep. 3, 2014, eight pages.
Notice of Allowance mailed Nov. 16, 2015, for U.S. Appl. No. 11/700,636, filed Jan. 30, 2007, eight pages.
Westerman, W. (1999). "Hand Tracking, Finger Identification, and Chordic Manipulation on a Multi-Touch Surface," Excerpts, *ProQuest Dissertations and Theses Global*, 22 pages.
Non-Final Office Action mailed Dec. 2, 2015, for U.S. Appl. No. 12/118,639, filed May 9, 2008, six pages.
Non-Final Office Action mailed Dec. 3, 2015, for U.S. Appl. No. 11/830,781, filed Jul. 30, 2007, 18 pages.
Notice of Allowance mailed Dec. 23, 2015, for U.S. Appl. No. 11/830,808, filed Jul. 30, 2007, ten pages.
Rekimoto, J. et al. (Nov. 2, 2003). "PreSense: Interaction Techniques for Finger Sensing Input Devices," *Proceedings of the 16th Annual ACM Symposium on User Interface Software and Technology*, UIST '03, New York, NY, CHI Letters 5(2): 203-212.
Final Office Action mailed Oct. 12, 2012, for U.S. Appl. No. 12/118,648, filed May 9, 2008, eight pages.
Final Office Action mailed Oct. 25, 2012, for U.S. Appl. No. 11/832,134, filed Aug. 1, 2007, 27 pages.
Non-Final Office Action mailed Oct. 12, 2012, for U.S. Appl. No. 12/422,212, filed Apr. 10, 2009, five pages.

Anonymous. (Sep. 2003). "P900 User Guide," Second Edition, *SONY Ericsson Mobile Communications AB*: located at http://www.sonyericsson.com/downloads/P900_UG_R1b_EN.pdf, pp. 8, 16, 17, 20, 24-26, 42-45, 137 (98 pages total).
Anonymous. (2004). "Devices," *Technology Loan Catalog*, located at http://www.tsbvi.edu/outreach/techloan/catalog.html last visited Jun. 6, 2008, nine pages.
Anonymous. (2004). "Fastap™ Keypads Redefine Mobile Phones," *DIGITWireless*, located at http://www/digitwireless.com, last visited Nov. 18, 2005, nine pages.
Anonymous. (Jan. 21, 2004). "Compare Keyboards with the Keyboard Compatibility Chart, Learn More About Alternative Keyboards," *Solutions for Humans*, located at http://www.keyalt.com/kkeybrdp.html, last visited Dec. 8, 2005, five pages.
Anonymous. (2005). "Fastap™," *DIGITWireless*, located at http://www.digitwireless.com/about/faq.html, last visited Dec. 6, 2005, five pages.
Anonymous. (2005). "Four-Button Keyboard," *WikiPodLinux* located at http://ipodlinux.org/Four-Button_Keyboard, last visited Dec. 5, 2005, two pages.
Anonymous. (2005). "Introducing the Ultimate Smartphone Keypad," DELTA II™ Keypads, *Chicago Logic, Inc.*, located at http://www.chicagologic.com, last visited Nov. 18, 2005, two pages.
Anonymous. (2005). "T9® Text Input for Keypad Devices," *Tegic Communications™* located at http://www.tegic.com, last visited Nov. 18, 2005, one page.
Anonymous. (2005). "Text Input (Legacy)," *WikiPodLinux* located at http://ipodlinux.org/Text_Input_%28legacy%29, last visited Dec. 5, 2005, eight pages.
Anonymous. (2005). "Text Input Concepts," *WikiPodLinux* located at http://web.archive.org/web/20051211165254/http://ipodlinux.org/Text_Input_Concepts last visited Dec. 5, 2005, three pages.
Anonymous. (2005). "Text Input Methods," *WikiPodLinux* located at http://ipodlinux.org/Text_Input_Methods, last visited Dec. 5, 2005, five pages.
Anonymous. (2005). "You Heard of Touch Screens Now Check Out Touch Keys," *Phoneyworld*, located at http://www.phoneyworld.com/newspage.aspx?n=1413, last visited Nov. 18, 2005, two pages.
Anonymous. (Apr. 6, 2005). "Microsoft's New-Smart Phone Interface: Your Thumb," textually.org located at http://www.textually.org/textually/archives/2005/04/007819.html last visited Nov. 18, 2005, two pages.
Anonymous. (Jun. 22, 2005). "LG Develops New Touch Pad Cell Phones," textually.org located at http://textually.org/textually/archives/2005/06/009903.html, last visited Nov. 18, 2005, one page.
Anonymous. (Nov. 3, 2005). "Samsung Releases Keyboard Phone in US," textually.org located at http://www.textually.org/textually/archives/2005/11/010482.html last visited Nov. 18, 2005, one page.
Anonymous. (2006). CENTROID, located at http://faculty.evansville.edu/ck6/tcenter/class/centroid.html, last visited Apr. 28, 2006, 1 page.
Anonymous. (2006). CENTROID, located at http://www.pballew.net/centroid.html, last visited Apr. 28, 2006, three pages.
Casario, M. (Oct. 5, 2005). "Hands on Macromedia World: Touch Screen Keypad for Mobile Phone by DoCoMo," located at http://casario.blogs.com/mmworl/2005/10/touch_screen_ke.html, last visited Nov. 18, 2005, 1 page.
Day, B. (Jan. 6, 2004). "Will Cell Phones Render iPods Obsolete?" Java.net, located at http://weblogs.javanet/pub/wig/883, last visited Dec. 12, 2005, three pages.
Final Office Action mailed May 12, 2009, for U.S. Appl. No. 11/228,700, filed Sep. 16, 2005, 13 pages.
Final Office Action mailed Dec. 8, 2009, for U.S. Appl. No. 11/459,615, filed Jul. 24, 2006, 11 pages.
Final Office Action mailed Nov. 18, 2010, for U.S. Appl. No. 11/961,663, filed Dec. 20, 2007, 14 pages.
Final Office Action mailed Jul. 27, 2012, for U.S. Appl. No. 11/696,701, filed Apr. 4, 2007, 13 pages.
Final Office Action mailed Sep. 18, 2012, for U.S. Appl. No. 11/852,690, filed Sep. 10, 2007, 13 pages.
International Search Report mailed Apr. 11, 2008, for PCT Application No. PCT/US2007/060119, nine pages.

(56) References Cited

OTHER PUBLICATIONS

International Search Report mailed Sep. 15, 2008, for PCT Application No. PCT/US2007/088904, nine pages.
Non-Final Office Action mailed Sep. 17, 2008, for U.S. Appl. No. 11/228,700, filed Sep. 16, 2005, 18 pages.
Non-Final Office Action mailed May 22, 2009, for U.S. Appl. No. 11/459,615, filed Jul. 24, 2006, nine pages.
Non-Final Office Action mailed May 28, 2009, for U.S. Appl. No. 11/459,606, filed Jul. 24, 2006, 17 pages.
Non-Final Office Action mailed Apr. 13, 2010, for U.S. Appl. No. 11/459,615, filed Jul. 24, 2006, nine pages.
Non-Final Office Action mailed Sep. 25, 2012, for U.S. Appl. No. 11/428,515, filed Jul. 3, 2006, 15 pages.
Notice of Allowance mailed Sep. 6, 2012, for U.S. Appl. No. 13/556,019, filed Jul. 23, 2012, seven pages.
O'Neal, W. (2005). "Smart Phones with Hidden Keyboards," located at http://msn.com.com/4250-6452_16-6229969-1.html, last visited Nov. 18, 2005, three pages.
Sears, A. et al. (2005). "Data Entry for Mobile Devices using Soft Keyboards: Understanding the Effects of Keyboard Size and User Tasks," Abstract, *Int'l Journal of Human-Computer Interaction*, vol. 16, No. 2, one page.
Non-Final Office Action mailed Aug. 30, 2012, for U.S. Appl. No. 11/830,801, filed Jul. 30, 2007, 15 pages.
Non-Final Office Action mailed Sep. 4, 2012, for U.S. Appl. No. 11/830,788, filed Jul. 30, 2007, 13 pages.
Non-Final Office Action mailed Sep. 6, 2012, for U.S. Appl. No. 11/830,793, filed Jul. 30, 2007, 14 pages.
Non-Final Office Action mailed Sep. 13, 2012, for U.S. Appl. No. 12/422,205, filed Apr. 10, 2009, 16 pages.
Final Office Action mailed Jul. 6, 2012, for U.S. Appl. No. 11/696,693, filed Apr. 4, 2007, 24 pages.
Final Office Action mailed Jul. 6, 2012, for U.S. Appl. No. 11/830,815, filed Jul. 30, 2007, 15 pages.
Final Office Action mailed Aug. 3, 2012, for U.S. Appl. No. 11/830,808, filed Jul. 30, 2007, seven pages.
Non-Final Office Action mailed Jul. 27, 2012, for U.S. Appl. No. 12/118,659, filed May 9, 2008, five pages.
Non-Final Office Action mailed Jul. 31, 2012, for U.S. Appl. No. 11/228,758, filed Sep. 16, 2005, 14 pages.
Non-Final Office Action mailed Aug. 21, 2012, for U.S. Appl. No. 12/434,439, filed May 1, 2009, 12 pages.
Notice of Allowance mailed Jul. 26, 2012, for U.S. Appl. No. 11/428,503, filed Jul. 3, 2006, nine pages.
Notice of Allowance mailed Aug. 22, 2012, for U.S. Appl. No. 11/559,763, filed Nov. 14, 2006, 10 pages.
Annex to Form PCT/ISA/206 Communication Relating to the Results of the Partial International Search Received in Corresponding PCT Application No. PCT/US2005/025641 dated Feb. 19, 2007.
Anonymous. "Touch Technologies Overview" 2001, 3M Touch Systems, Massachusetts.
Anonymous. (2005). "Gesture Recognition," located at <http://www.fingerworks.com/gesture_recognition.html>, last visited Aug. 30, 2005.
Anonymous. (2005). "iGesture Products for Everyone (Learn in Minutes)," *FingerWorks*, downloaded Aug. 30, 2005.
Anonymous. (2005). "Touch Technologies: Touch is Everywhere," located at http://www.3m.com/3MTouchSystems/downloads/PDFs/TouchTechOV.pdf., last visited Aug. 30, 2005.
Anonymous. "4-Wire Resistive Touchscreens" obtained from http://www.touchscreens.com/intro-touchtypes-4resistive.html generated Aug. 5, 2005.
Anonymous. "5-Wire Resistive Touchscreens" obtained from http://www.touchscreens.com/intro-touchtypes-resistive.html generated Aug. 5, 2005.
Anonymous. "A Brief Overview of Gesture Recognition" obtained from http://www. Dai. Ed. Ac.uk/Cvonline/LOCAL_COPIES/COHEN/gesture_overview. Html, generated Apr. 20, 2004.
Anonymous. "Ai Squared Products—XoomText Magnifier," http://www/aisquared.com/Products/zoomtexturemag/index.cfm, downloaded Oct. 26, 2005.
Anonymous. "Ai Squared Products," http://www.aisquared.com/Products/index.cfm, downloaded Oct. 25, 2005.
Anonymous. "Capacitive Position Sensing" obtained from http://www.synaptics.com/technology/cps.cfin generated Aug. 5, 2005.
Anonymous. "Capacitive Touchscreens" obtained from http://www.touchscreens.com/intro-touchtypes-capacitive.html generated Aug. 5, 2005.
Anonymous. "Comparing Touch Technologies" obtained from http://www.touchscreens.com/intro-touchtypes.html generated Oct. 10, 2004.
Anonymous. "FingerWorks—Gesture Guide—Application Switching," obtained from http://www.fingerworks.com/gesture_guide_apps.html, generated on Aug. 27, 2004, 1-pg.
Anonymous. "FingerWorks—Gesture Guide—Editing," obtained from http://www.fingerworks.com/gesure_guide_editing.html, generated on Aug. 27, 2004, 1-pg.
Anonymous. "FingerWorks—Gesture Guide—File Operations," obtained from http://www.fingerworks.com/gesture_guide_files.html, generated on Aug. 27, 2004, 1-pg.
Anonymous. "FingerWorks—Gesture Guide—Text Manipulation," obtained from http://www.fingerworks.com/gesture_guide_text_manip. html, generated on Aug. 27, 2004, 2-pg.
Anonymous. "FingerWorks—Gesture Guide—Tips and Tricks," obtained from http://www.fingerworks.com/gesture_guide_tips.html, generated Aug. 27, 2004, 2-pgs.
Anonymous. "FingerWorks—Gesture Guide—Web," obtained from http://www.fingerworks.com/gesture_guide_web.html, generated on Aug. 27, 2004, 1-pg.
Anonymous. "FingerWorks—Guide to Hand Gestures for USB Touchpads," obtained from http://www.fingerworks.com/igesture_userguide.html, generated Aug. 27, 2004, 1-pg.
Anonymous. "FingerWorks—iGesture—Technical Details," obtained from http://www.fingerworks.com/igesture_tech.html, generated Aug. 27, 2004, 1-pg.
Anonymous. "FingerWorks—The Only Touchpads with Ergonomic Full-Hand Resting and Relaxation!" obtained from http://www.fingerworks.com/resting.html, Copyright 2001, 1-pg.
Anonymous. "FingerWorks—Tips for Typing on the Mini," obtained from http://www.fingerworks.com/mini_typing.html, generated on Aug. 27, 2004, 2-pgs.
Anonymous. "GlidePoint®" obtained from http://www.cirque.com/technology/technology_gp.html generated Aug. 5, 2005.
Anonymous. "Gesture Recognition" http://www.fingerworks.com/gesture_recognition.html>, Jul. 2, 2006.
Anonymous. "How do touchscreen monitors know where you're touching?" obtained from http://www.electronics.howstuffworks.com/question716.html generated Aug. 5, 2005.
Anonymous. "How does a touchscreen work?" obtained from http://www.touchscreens.com/intro-anatomy.html generated Aug. 5, 2005.
Anonymous. "iGesture Pad—the MultiFinger USB Touch Pad with Whole-Hand Gestures,"obtained from http://www.fingerworks.com/igesture.html, generated Aug. 27, 2004, 2-pgs.
Anonymous. "iGesture Products for Everyone (learn in minutes) Product Overview" FingerWorks.com downloaded Aug. 30, 2005.
Anonymous. "Infrared Touchscreens" obtained from http://www.touchscreens.com/intro-touchtypes-infrared.html generated Aug. 5, 2005.
Anonymous. "Lunar Screen Magnifier and Lunar Plus Enhanced Screen Magnifier," www.dolphincomputeraccess.com/products/lunar.htm, downloaded Oct. 25, 2005.
Anonymous. "Mouse Emulation" FingerWorks obtained from http://www.fingerworks.com/gesture_guide_mouse.html generated Aug. 30, 2005.
Anonymous. "Mouse Gestures in Opera" obtained from http://www.opera.com/products/desktop/mouse/index.dml generated Aug. 30, 2005.
Anonymous. "Mouse Gestures," Optim oz, May 21, 2004.

(56) References Cited

OTHER PUBLICATIONS

Anonymous. "MultiTouch Overview" FingerWorks obtained from http://www.fingerworks.com/multoverview.html generated Aug. 30, 2005.
Anonymous. "Near Field Imaging Touchscreens" obtained from http://www.touchscreens.com/intro-touchtypes-nfi.html generated Aug. 5, 2005.
Anonymous. "PenTouch Capacitive Touchscreens" obtained from http://www.touchscreens.com/intro-touchtypes-pentouch.html generated Aug. 5, 2005.
Anonymous. "Surface Acoustic Wave Touchscreens" obtained from http://www.touchscreens.com/intro-touchtypes-saw.html generated Aug. 5, 2005.
Anonymous. "Symbol Commander" obtained from http://www.sensiva.com/symbolcommander/, generated Aug. 30, 2005.
Anonymous. "Tips for Typing" FingerWorks http://www.fingerworks.com/mini_typing.html generated Aug. 30, 2005.
Anonymous. "Touchscreen Technology Choices," http://www.elotouch.com/products/detech2.asp, downloaded Aug. 5, 2005.
Anonymous. "Visual Disabilities," http://depts.stcc.edu/ods/ACCESS/bpvisual.htm, downloaded Oct. 25, 2005.
Anonymous. "Wacom Components—Technology" obtained from http://www.wacom-components.com/english/tech.asp generated on Oct. 10, 2004.
Anonymous. "Watershed Algorithm" http://rsb.info.nih.gov/ij/plugins/watershed.html generated Aug. 5, 2005.
Anonymous. (2011). "Jog Dial" located at http://www.ask.com/wiki/Jog_dial, last visited Feb. 27, 2011, two pages.
Anonymous. (Apr. 1, 1994). "Jog Shuttle Graphical," *IBM Technical Disclosure Bulletin*, 37(4A):47-48.
Anonymous. (2011). "(graphical or virtual) (jog dial) or (jog wheel) or (scroll wheel)," Ask Search located at http://www.ask.com/web?q=%28graphical+or+virtual%29++%28jog+job+dial%29+or+%28jo . . ., last visited Feb. 27, 2011, two pages.
Anonymous. (2011). "What Is a Jog Wheel?" Ask Search located at http://www.ask.com/web?q=what+is+a+jog+wheel&search=&qsrc=0&o=0&l=dirlast visited on Feb. 27, 2011, two pages.
Anonymous. (2012). "Emulating Mouse Scroll Wheel?" Ask Search located at http://www.ask.com/web?q=emulate+scroll+wheel&qsrc=1&o=0&l=dir&qid=A23E49EA, last visited Mar. 23, 2012, one page.
Anonymous. (2012). "Virtual Scroll Wheel," Ask Search located at http://www.ask.com/web?q=virtual+scroll+wheel&qsrc=0&o=0&l=dir&oo=0, last visited Mar. 23, 2012, two pages.
Bales, J. W. et al. (Apr. 1981). "Marking Parts to Aid Robot Vision," NASA Technical Paper 1819, 37 pages.
Bier et al., "Toolglass and Magic Lenses: The see-through interface" In James Kijiya, editor, Computer Graphics (SIGGRAPH '93 Proceedings), vol. 27, pp. 73-80, Aug. 1993.
Buxton, W. et al. (Jul. 22, 1985). "Issues and Techniques in Touch-Sensitive Tablet Input," *Proceedings ACM Siggraph*, pp. 215-224.
Chang, C-C. et al. (Aug. 1, 1993). "A Hashing-Oriented Nearest Neighbor Searching Scheme," *Pattern Recognition Letters*, 14(8):625-630.
Chen et al. "Flowfield and Beyond: Applying Pressure-Sensitive Multi-Point Touchpad Interaction," *Multimedia and Expo, 2003, ICME '03, Proceedings*, Jul. 9, 2003, pp. 1-49, 152.
Crowley, J.L. (Mar. 1, 1997). "Vision for Man-Machine Interaction," *Robotics and Autonomous Systems*, 19(3-4):347-358.
Davis, J. et al. (May 2, 1994). "Recognizing Hand Gestures," *European Conference on Computer Vision*, Berlin, DE, 1:331-340.
Davis, J. et al. (Oct. 31, 1994). "Determining 3-D Hand Motion," *Signals, Systems and Computers, 1994 Conference Record of the 28th Asilomar Conference on Pacific Grove*, CA, Oct. 31-Nov. 2, 1994, Los Alamitos, CA, pp. 1262-1266.
Douglas et al., *The Ergonomics of Computer Pointing Devices* (1997).
European examination report for European Patent Application No. 06016830.9, mailed Aug. 6, 2008.
European examination report for European Patent Application No. 06016856.4, mailed Sep. 16, 2008.
European examination report for European patent Application No. 99904228.6, mailed Apr. 20, 2006.
European examination report for European Patent Application No. 99904228.6, mailed Mar. 23, 2007.
European search report for European Patent Application No. 06016830.9, mailed Dec. 3, 2007.
European Search Report mailed Dec. 12, 2008, for EP Application No. 06016855.6 filed Jan. 25, 1999, six pages.
European Search Report mailed Dec. 13, 2007, for EP Application No. 05772892.5, filed Jul. 19, 2005, three pages.
European Search Report mailed Dec. 15, 2008, for EP Application No. 08016449.4, filed Jul. 19, 2005, six pages.
European Search Report mailed Dec. 15, 2008, for EP Application No. 08016450.2, filed Jul. 19, 2005, six pages.
European Search Report mailed Dec. 23, 2008, for EP Application No. 06016831.7 filed Jan. 25, 1999, seven pages.
European Search Report mailed Jan. 9, 2009, for EP Application No. 06016832.5 filed Jan. 25, 1999, four pages.
European Search Report mailed Jun. 8, 2012, for EP Application No. 12166818.0, filed Jan. 30, 2007, seven pages.
European Search Report mailed Jun. 14, 2012, for EP Application No. 12166820.6, filed Jan. 30, 2007, six pages.
European Search Report received in EP 1 621 989 (@ *Beyer Weaver & Thomas, LLP*) dated Mar. 27, 2006.
European supplementary search report for European Patent Application No. 99904228.6, mailed Feb. 16, 2005.
EVB Elektronik "TSOP6238 IR Receiver Modules for Infrared Remote Control Systems" dated Jan. 2004 1-pg.
Extended European search report for European Patent Application No. 06016858.0, mailed Dec. 21, 2007.
Extended European search report for European Patent Application No. 06016856.4, mailed Mar. 14, 2008.
Final Office Action mailed Dec. 20, 2007, for U.S. Appl. No. 10/927,925, filed Aug. 26, 2004, 25 pages.
Final Office Action mailed May 21, 2008, for U.S. Appl. No. 11/048,264, filed Jan. 31, 2005, 11 pages.
Final Office Action mailed Oct. 16, 2008, for U.S. Appl. No. 11/038,590, filed Jan. 18, 2005, 35 pages.
Final Office Action mailed Nov. 10, 2008, for U.S. Appl. No. 10/927,925, filed Aug. 26, 2004, 22 pages.
Final Office Action mailed Dec. 23, 2008, for U.S. Appl. No. 10/903,964, filed Jul. 30, 2004, 12 pages.
Final Office Action mailed Dec. 24, 2008, for U.S. Appl. No. 11/240,788, filed Sep. 30, 2005, 12 pages.
Final Office Action mailed Mar. 5, 2009, for U.S. Appl. No. 11/228,758, filed Sep. 16, 2005, 15 pages.
Final Office Action mailed Mar. 17, 2009, for U.S. Appl. No. 11/241,839, filed Sep. 30, 2005, 16 pages.
Final Office Action mailed Mar. 19, 2009, for U.S. Appl. No. 11/428,506, filed Jul. 3, 2006, seven pages.
Final Office Action mailed Jul. 7, 2009, for U.S. Appl. No. 11/048,264, filed Jan. 31, 2005, 14 pages.
Final Office Action mailed Nov. 12, 2009, for U.S. Appl. No. 11/349,350, filed Feb. 8, 2006, nine pages.
Final Office Action mailed Nov. 19, 2009, for U.S. Appl. No. 11/428,515, filed Jul. 3, 2006, 14 pages.
Final Office Action mailed Dec. 31, 2009, for U.S. Appl. No. 11/038,590, filed Jan. 18, 2005, 36 pages.
Final Office Action mailed Apr. 14, 2010, for U.S. Appl. No. 11/559,736, filed Nov. 14, 2006, 11 pages.
Final Office Action mailed May 12, 2010, for U.S. Appl. No. 11/428,503, filed Jul. 3, 2006, 12 pages.
Final Office Action mailed Jun. 4, 2010, for U.S. Appl. No. 10/903,964, filed Jul. 30, 2004, 22 pages.
Final Office Action mailed Jun. 11, 2010, for U.S. Appl. No. 11/559,833, filed Nov. 14, 2006, eight pages.
Final Office Action mailed Jul. 6, 2010, for U.S. Appl. No. 11/048,264, filed Jan. 31, 2005, 12 pages.
Final Office Action mailed Jul. 19, 2010, for U.S. Appl. No. 11/428,522, filed Jul. 3, 2006, six pages.

(56) References Cited

OTHER PUBLICATIONS

Final Office Action mailed Jul. 20, 2010, for U.S. Appl. No. 11/228,758, filed Sep. 16, 2005, 19 pages.
Final Office Action mailed Aug. 17, 2010, for U.S. Appl. No. 11/240,788, filed Sep. 30, 2005, nine pages.
Final Office Action mailed Sep. 2, 2010, for U.S. Appl. No. 11/272,868, filed Nov. 15, 2005, nine pages.
Final Office Action mailed Oct. 19, 2010, for U.S. Appl. No. 11/559,799, filed Nov. 14, 2006, eight pages.
Final Office Action mailed Oct. 29, 2010, for U.S. Appl. No. 11/559,763, filed Nov. 14, 2006, 15 pages.
Final Office Action mailed Nov. 23, 2010, for U.S. Appl. No. 11/696,693, filed Apr. 4, 2007, 24 pages.
Final Office Action mailed Nov. 23, 2010, for U.S. Appl. No. 11/830,801, filed Jul. 30, 2007, 13 pages.
Final Office Action mailed Nov. 26, 2010, for U.S. Appl. No. 11/830,793, filed Jul. 30, 2007, nine pages.
Final Office Action mailed Dec. 2, 2010, for U.S. Appl. No. 11/830,815, filed Jul. 30, 2007, nine pages.
Final Office Action mailed Dec. 3, 2010, for U.S. Appl. No. 11/830,788, filed Jul. 30, 2007, 15 pages.
Final Office Action mailed Jan. 19, 2011, for U.S. Appl. No. 11/980,721, filed Oct. 31, 2007, nine pages.
Final Office Action mailed Mar. 9, 2011, for U.S. Appl. No. 11/980,722, filed Oct. 31, 2007, 11 pages.
Final Office Action mailed Mar. 21, 2011, for U.S. Appl. No. 11/832,134, filed Aug. 1, 2007, 33 pages.
Final Office Action mailed Apr. 21, 2011, for U.S. Appl. No. 11/830,808, filed Jul. 30, 2007, 10 pages.
Final Office Action mailed May 11, 2011, for U.S. Appl. No. 11/048,264, filed Jan. 31, 2005, 12 pages.
Final Office Action mailed May 27, 2011, for U.S. Appl. No. 11/700,636, filed Jan. 30, 2007, nine pages.
Final Office Action mailed Aug. 10, 2011, for U.S. Appl. No. 11/240,788, filed Sep. 30, 2005, seven pages.
Final Office Action mailed Sep. 27, 2011, for U.S. Appl. No. 11/830,774, filed Jul. 30, 2007, 15 pages.
Final Office Action mailed Sep. 28, 2011, for U.S. Appl. No. 12/479,678, filed Jun. 5, 2009, 13 pages.
Final Office Action mailed Oct. 14, 2011, for U.S. Appl. No. 11/830,801, filed Jul. 30, 2007, 16 pages.
Final Office Action mailed Oct. 19, 2011, for U.S. Appl. No. 12/479,573, filed Jun. 5, 2009, 13 pages.
Final Office Action mailed Nov. 10, 2011, for U.S. Appl. No. 11/272,868, filed Nov. 15, 2005, nine pages.
Final Office Action mailed Nov. 17, 2011, for U.S. Appl. No. 11/830,781, filed Jul. 30, 2007, 16 pages.
Final Office Action mailed Nov. 17, 2011, for U.S. Appl. No. 12/479,617, filed Jun. 5, 2009, 18 pages.
Final Office Action mailed Nov. 18, 2011, for U.S. Appl. No. 11/878,024, filed Jul. 20, 2007, 18 pages.
Final Office Action mailed Nov. 28, 2011, for U.S. Appl. No. 11/038,590, filed Jan. 18, 2005, 43 pages.
Final Office Action mailed Dec. 16, 2011, for U.S. Appl. No. 12/422,212, filed Apr. 10, 2009, 20 pages.
Final Office Action mailed Feb. 3, 2012, for U.S. Appl. No. 12/422,205, filed Apr. 10, 2009, 16 pages.
Final Office Action mailed Feb. 17, 2012, for U.S. Appl. No. 11/830,801, filed Jul. 30, 2007, 14 pages.
Final Office Action mailed Mar. 1, 2012, for U.S. Appl. No. 11/048,264, filed Jan. 31, 2005, 13 pages.
Final Office Action mailed Mar. 1, 2012, for U.S. Appl. No. 11/830,793, filed Jul. 30, 2007, 14 pages.
Final Office Action mailed Mar. 9, 2012, for U.S. Appl. No. 11/700,636, filed Jan. 30, 2007, nine pages.
Final Office Action mailed on Mar. 22, 2012, for U.S. Appl. No. 10/903,964, filed Jul. 30, 2004, 17 pages.
Final Office Action mailed Mar. 26, 2012, for U.S. Appl. No. 12/118,639, filed May 9, 2008, seven pages.
Final Office Action mailed Apr. 13, 2012, for U.S. Appl. No. 12/468,401, filed May 19, 2009, 21 pages.
Final Office Action mailed Apr. 16, 2012, for U.S. Appl. No. 12/422,222, filed Apr. 10, 2009, 14 pages.
Final Office Action mailed Apr. 25, 2012, for U.S. Appl. No. 12/422,197, filed Apr. 10, 2009, 12 pages.
Final Office Action mailed Apr. 27, 2012, for U.S. Appl. No. 11/830,788, filed Jul. 30, 2007, 13 pages.
Final Office Action mailed May 1, 2012, for U.S. Appl. No. 12/434,439, filed May 1, 2009, 14 pages.
Final Office Action mailed May 8, 2012, for U.S. Appl. No. 12/139,411, filed Jun. 13, 2008, seven pages.
Final Office Action mailed May 9, 2012, for U.S. Appl. No. 11/980,722, filed Oct. 31, 2007, 14 pages.
Final Office Action mailed May 24, 2012, for U.S. Appl. No. 11/830,757, filed Jul. 30, 2007, 19 pages.
Final Office Action mailed May 29, 2012, for U.S. Appl. No. 12/500,978, filed Jul. 10, 2009, 10 pages.
Final Office Action mailed Jun. 7, 2012, for U.S. Appl. No. 11/228,758, filed Sep. 16, 2005, 16 pages.
Final Office Action mailed Jun. 8, 2012, for U.S. Appl. No. 12/422,225, filed Apr. 10, 2009, 12 pages.
Fisher et al., "Repetitive Motion Disorders: The Design of Optimal Rate—Rest Profiles," Human Factors, 35(2):283-304 (Jun. 1993).
Fukumoto and Yoshinobu Tonomura, "Body Coupled Fingering: Wireless Wearable Keyboard," *CHI97*, pp. 147-154 (Mar. 1997).
Fukumoto et al., "ActiveClick: Tactile Feedback for Touch Panels," In CHI 2001 Summary, pp. 121-122, 2001.
Hardy, "Fingerworks" Mar. 7, 2002; BBC World on Line.
Hardy, I. (Mar. 7, 2002). "Fingerworks."
Heap, T. et al. (Oct. 14, 1996). "Towards 3D Hand Tracking Using a Deformable Model," *Proceedings of the 2$^{nd}$ International Conference*, Killington, VT, USA, Oct. 14-16, 1996, *Automatic Face and Gesture Recognition, IEEE Comput. Soc.*, pp. 140-145.
Hillier and Gerald J. Lieberman, *Introduction to Operations Research* (1986).
International Search Report dated Mar. 3, 2006 (PCT/US 05/03325; 119-0052WO).
International search report for PCT/US99/01454, mailed May 14, 1999.
International Search Report received in corresponding PCT application No. PCT/US2006/008349 dated Oct. 6, 2006.
International Search Report mailed Apr. 24, 2007, for PCT Application No. PCT/US2005/025641 filed Jul. 19, 2005, five pages.
International Search Report mailed Aug. 28, 2007, for PCT Application No. PCT/US2004/009701, filed Mar. 31, 2004, one page.
International Search Report mailed Aug. 11, 2008, for PCT Application No. PCT/US2007/002512 filed Jan. 30, 2007, three pages.
International Search Report mailed Oct. 8, 2008, for PCT Application No. PCT/US2008/051727, filed Jan. 22, 2008, six pages.
Jacob et al., "Integrality and Separability of Input Devices," *ACM Transactions on Computer-Human Interaction*, 1:3-26 (Mar. 1994).
Japanese Office Action mailed Oct. 27, 2008, for JP Patent Application No. 2007-523644, one page.
Jones, R. (2001). "MTC Express Multi-Touch Controller," *Computer Music Journal* 25(1):97-99.
Kahney, L. (Mar. 8, 2004). "Pocket PCs Masquerade as IPods," available at: http://www.wired.com/gadgets/mac/news/2004/03/62543, last visited on Apr. 28, 2008, two pages.
Kinkley et al., "Touch-Sensing Input Devices," in CHI '99 Proceedings, pp. 223-230, 1999.
Kionx "KXP84 Series Summary Data Sheet" copyright 2005,dated Oct. 21, 2005, 4-pgs.
Korean Office Action mailed May 17, 2008, for KR Application No. 10-2007-7005010, with English Translation, 15 pages.
Lee, "A Fast Multiple-Touch-Sensitive Input Device," Master's Thesis, University of Toronto (1984).
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(56) References Cited

OTHER PUBLICATIONS

Lee, S.K. et al., "A Multi-Touch Three Dimensional Touch-Sensitive Tablet," in CHI '85 Proceedings, pp. 121-128, 2000 [(Apr. 1985). Conference Proceedings: Human Factors in Computing Systems, pp. 21-25.].

Malik, S. et al. (2004). "Visual Touchpad: A Two-Handed Gestural Input Device," *Proceedings of the 6th International Conference on Multimodal Interfaces*, State College, PA, Oct. 13-15, 2004, *ICMI '04, ACM* pp. 289-296.

Matsushita et al., "HoloWall: Designing a Finger, Hand, Body and Object Sensitive Wall," In Proceedings of UIST '97, Oct. 1997.

Mohri, K. (Nov. 25, 2000). "Wearable Human Interface Based on Hand/Finger Gesture Recognition," *Human Interface Association Magazine* 2(4):9-18. (Only Abstract in English.).

Nirei, K. et al. (Aug. 5, 1996). "Human Hand Tracking from Binocular Image Sequences," *Proceedings of the 1996 IEEE IECON 22nd International Conference*, Taipei, Taiwan, Aug. 5-10, 1996, *Industrial Electronics, Control, and Instrumentation* 1(5):297-302.

Non-Final Office Action mailed Jul. 24, 2007, for U.S. Appl. No. 10/927,925, filed on Aug. 26, 2004, 20 pages.

Non-Final Office Action mailed Sep. 21, 2007, for U.S. Appl. No. 11/428,515, filed Jul. 3, 2006, seven pages.

Non-Final Office Action mailed Sep. 24, 2007, for U.S. Appl. No. 11/428,506, filed Jul. 3, 2006, six pages.

Non-Final Office Action mailed Sep. 24, 2007, for U.S. Appl. No. 11/428,521, filed Jul. 3, 2006, six pages.

Non-Final Office Action mailed Sep. 28, 2007, for U.S. Appl. No. 11/048,264, filed Jan. 31, 2005, 11 pages.

Non-Final Office Action mailed Nov. 1, 2007, for U.S. Appl. No. 11/240,788, filed Sep. 30, 2005, 20 pages.

Non-Final Office Action mailed Dec. 31, 2007, for U.S. Appl. No. 11/038,590, filed Jan. 18, 2005, 32 pages.

Non-Final Office Action mailed Jan. 28, 2008, for U.S. Appl. No. 11/428,522, filed Jul. 3, 2006, seven pages.

Non-Final Office Action mailed Feb. 4, 2008, for U.S. Appl. No. 11/428,515, filed Jul. 3, 2006, six pages.

Non-Final Office Action mailed Mar. 17, 2008, for U.S. Appl. No. 10/903,964, filed Jul. 30, 2004, 34 pages.

Non-Final Office Action mailed Apr. 30, 2008, for U.S. Appl. No. 11/240,788, filed Sep. 30, 2005, 12 pages.

Non-Final Office Action mailed May 5, 2008, for U.S. Appl. No. 10/927,925, filed Aug. 26, 2004, 22 pages.

Non-Final Office Action mailed Jul. 9, 2008, for U.S. Appl. No. 11/428,521, filed Jul. 3, 2006, 11 pages.

Non-Final Office Action mailed Sep. 2, 2008, for U.S. Appl. No. 11/428,522, filed Jul. 3, 2006, six pages.

Non-Final Office Action mailed Sep. 15, 2008, for U.S. Appl. No. 11/428,506, filed Jul. 3, 2006, eight pages.

Non-Final Office Action mailed Sep. 17, 2008, for U.S. Appl. No. 11/214,839, filed Sep. 30, 2005, 18 pages.

Non-Final Office Action mailed Oct. 3, 2008, for U.S. Appl. No. 11/228,758, filed Sep. 16, 2005, 16 pages.

Non-Final Office Action mailed Oct. 31, 2008, for U.S. Appl. No. 11/428,515, filed Jul. 3, 2006, seven pages.

Non-Final Office Action mailed Dec. 11, 2008, for U.S. Appl. No. 11/048,264, filed Jan. 31, 2005, 11 pages.

Non-Final Office Action mailed Jan. 6, 2009, for U.S. Appl. No. 11/349,350, filed Feb. 8, 2006, 10 pages.

Non-Final Office Action mailed Feb. 17, 2009, for U.S. Appl. No. 11/428,522, filed Jul. 3, 2006, six pages.

Non-Final Office Action mailed Mar. 5, 2009, for U.S. Appl. No. 11/272,868, filed Nov. 15, 2005, 15 pages.

Non-Final Office Action mailed Mar. 18, 2009, for U.S. Appl. No. 11/428,515, filed Jul. 3, 2006, 12 pages.

Non-Final Office Action mailed Apr. 2, 2009, for U.S. Appl. No. 11/428,501, filed Jul. 3, 2006, 11 pages.

Non-Final Office Action mailed Apr. 2, 2009, for U.S. Appl. No. 11/428,503, filed Jul. 3, 2006, 12 pages.

Non-Final Office Action mailed Apr. 2, 2009, for U.S. Appl. No. 11/038,590, filed Jan. 18, 2005, 41 pages.

Non-Final Office Action mailed Jun. 10, 2009, for U.S. Appl. No. 10/903,964, filed Jul. 30, 2004, 15 pages.

Non-Final Office Action mailed Jun. 10, 2009, for U.S. Appl. No. 11/240,788, filed Sep. 30, 2005, 13 pages.

Non-Final Office Action mailed Aug. 18, 2009, for U.S. Appl. No. 11/228,758, filed Sep. 16, 2005, 15 pages.

Non-Final Office Action mailed Aug. 25, 2009, for U.S. Appl. No. 11/428,522, filed Jul. 3, 2006, six pages.

Non-Final Office Action mailed Sep. 2, 2009, for U.S. Appl. No. 11/559,736, filed Nov. 14, 2006, 12 pages.

Non-Final Office Action mailed Oct. 5, 2009, for U.S. Appl. No. 11/559,799, filed Nov. 14, 2006, 14 pages.

Non-Final Office Action mailed Oct. 6, 2009, for U.S. Appl. No. 11/559,763, filed Nov. 14, 2006, 24 pages.

Non-Final Office Action mailed Oct. 14, 2009, for U.S. Appl. No. 11/428,501, filed Jul. 3, 2006, six pages.

Non-Final Office Action mailed Oct. 29, 2009, for U.S. Appl. No. 11/559,822, filed Nov. 14, 2006, 11 pages.

Non-Final Office Action mailed Oct. 30, 2009, for U.S. Appl. No. 11/428,503, filed Jul. 3, 2006, nine pages.

Non-Final Office Action mailed Dec. 7, 2009, for U.S. Appl. No. 11/272,868, filed Nov. 15, 2005, seven pages.

Non-Final Office Action mailed Dec. 18, 2009, for U.S. Appl. No. 11/048,264, filed Jan. 31, 2005, 11 pages.

Non-Final Office Action mailed Dec. 22, 2009, for U.S. Appl. No. 11/559,833, filed Nov. 14, 2006, six pages.

Non-Final Office Action mailed Dec. 24, 2009, for U.S. Appl. No. 11/677,958, filed Feb. 22, 2007, six pages.

Non-Final Office Action mailed Jan. 27, 2010, for U.S. Appl. No. 11/428,522, filed Jul. 3, 2006, five pages.

Non-Final Office Action mailed Feb. 3, 2010, for U.S. Appl. No. 11/228,758, filed Sep. 16, 2005, 20 pages.

Non-Final Office Action mailed Mar. 2, 2010, for U.S. Appl. No. 11/240,788, filed Sep. 30, 2005, 13 pages.

Non-Final Office Action mailed May 11, 2010, for U.S. Appl. No. 11/830,788, filed Jul. 30, 2007, eight pages.

Non-Final Office Action mailed Jun. 8, 2010, for U.S. Appl. No. 11/696,693, filed Apr. 4, 2007, 27 pages.

Non-Final Office Action mailed Jun. 8, 2010, for U.S. Appl. No. 11/830,808, filed Jul. 30, 2007, 13 pages.

Non-Final Office Action mailed Jun. 9, 2010, for U.S. Appl. No. 11/830,793, filed Jul. 30, 2007, eight pages.

Non-Final Office Action mailed Jun. 10, 2010, for U.S. Appl. No. 11/830,801, filed Jul. 30, 2007, 10 pages.

Non-Final Office Action mailed Jun. 22, 2010, for U.S. Appl. No. 11/830,815, filed Jul. 30, 2007, 12 pages.

Non-Final Office Action mailed Jul. 29, 2010, for U.S. Appl. No. 11/980,721, filed Oct. 31, 2007, nine pages.

Non-Final Office Action mailed Aug. 2, 2010, for U.S. Appl. No. 11/980,722, filed Oct. 31, 2007, five pages.

Non-Final Office Action mailed Sep. 17, 2010, for U.S. Appl. No. 11/832,134, filed Aug. 1, 2007, 26 pages.

Non-Final Office Action mailed Oct. 29, 2010, for U.S. Appl. No. 11/048,264, filed Jan. 31, 2005, 12 pages.

Non-Final Office Action mailed Nov. 18, 2010, for U.S. Appl. No. 11/700,636, filed Jan. 30, 2007, eight pages.

Non-Final Office Action mailed Nov. 23, 2010, for U.S. Appl. No. 11/830,808, filed Jul. 30, 2007, 11 pages.

Non-Final Office Action mailed Jan. 20, 2011, for U.S. Appl. No. 11/830,757, filed Jul. 30, 2007, 21 pages.

Non-Final Office Action mailed Feb. 9, 2011, for U.S. Appl. No. 11/240,788, filed Sep. 30, 2005, nine pages.

Non-Final Office Action mailed Feb. 17, 2011, for U.S. Appl. No. 11/852,690, filed Sep. 10, 2007, 10 pages.

Non-Final Office Action mailed Feb. 17, 2011, for U.S. Appl. No. 11/830,766, filed Jul. 30, 2007, 20 pages.

Non-Final Office Action mailed Mar. 18, 2011, for U.S. Appl. No. 11/830,774, filed Jul. 30, 2007, 18 pages.

Non-Final Office Action mailed Mar. 21, 2011, for U.S. Appl. No. 11/830,801, filed Jul. 30, 2007, 11 pages.

(56) References Cited

OTHER PUBLICATIONS

Non-Final Office Action mailed Mar. 31, 2011, for U.S. Appl. No. 12/479,573, filed Jun. 5, 2009, 17 pages.
Non-Final Office Action mailed Mar. 31, 2011, for U.S. Appl. No. 12/479,617, filed Jun. 5, 2009, 20 pages.
Non-Final Office Action mailed Mar. 31, 2011, for U.S. Appl. No. 12/479,678, filed Jun. 5, 2009, 18 pages.
Non-Final Office Action mailed Apr. 4, 2011, for U.S. Appl. No. 11/272,868, filed Nov. 15, 2005, nine pages.
Non-Final Office Action mailed Apr. 21, 2011, for U.S. Appl. No. 11/559,763, filed Nov. 14, 2006, seven pages.
Non-Final Office Action mailed Apr. 28, 2011, for U.S. Appl. No. 11/830,781, filed Jul. 30, 2007, 16 pages.
Non-Final Office Action mailed Apr. 29, 2011, for U.S. Appl. No. 11/980,721, filed Oct. 31, 2007, 10 pages.
Non-Final Office Action mailed May 4, 2011, for U.S. Appl. No. 11/038,590, filed Jan. 18, 2005, 40 pages.
Non-Final Office Action mailed May 4, 2011, for U.S. Appl. No. 12/118,639, filed May 9, 2008, seven pages.
Non-Final Office Action mailed Jun. 7, 2011, for U.S. Appl. No. 11/878,024, Jul. 20, 2007, 10 pages.
Non-Final Office Action mailed Jun. 28, 2011, for U.S. Appl. No. 12/422,197, filed Apr. 10, 2009, 18 pages.
Non-Final Office Action mailed Jun. 28, 2011, for U.S. Appl. No. 12/422,205, filed Apr. 10, 2009, 13 pages.
Non-Final Office Action mailed Jun. 28, 2011, for U.S. Appl. No. 12/422,212, filed Apr. 10, 2009, 16 pages.
Non-Final Office Action mailed Jun. 29, 2011, for U.S. Appl. No. 12/342,027, filed Dec. 22, 2008, 32 pages.
Non-Final Office Action mailed Jul. 19, 2011, for U.S. Appl. No. 11/980,722, filed Oct. 31, 2007, 12 pages.
Non-Final Office Action mailed Jul. 20, 2011, for U.S. Appl. No. 11/830,788, filed Jul. 30, 2007, 12 pages.
Non-Final Office Action mailed Aug. 4, 2011, for U.S. Appl. No. 11/830,793, filed Jul. 30, 2007, 13 pages.
Non-Final Office Action mailed Aug. 5, 2011, for U.S. Appl. No. 12/422,222, filed Apr. 10, 2009, 15 pages.
Non-Final Office Action mailed Aug. 5, 2011, for U.S. Appl. No. 12/422,225, filed Apr. 10, 2009, 17 pages.
Non-Final Office Action mailed Sep. 1, 2011, for U.S. Appl. No. 11/830,766, filed Jul. 30, 2007, 29 pages.
Non-Final Office Action mailed Sep. 16, 2011, for U.S. Appl. No. 11/830,757, filed Jul. 30, 2007, 26 pages.
Non-Final Office Action mailed Sep. 23, 2011, for U.S. Appl. No. 12/500,973, filed Jul. 10, 2009, 5 pages.
Non-Final Office Action mailed Sep. 27, 2011, for U.S. Appl. No. 11/700,636, filed Jan. 30, 2007, eight pages.
Non-Final Office Action mailed Sep. 29, 2011, for U.S. Appl. No. 10/903,964, filed Jul. 30, 2004, 17 pages.
Non-Final Office Action mailed Sep. 29, 2011, for U.S. Appl. No. 11/048,264, filed Jan. 31, 2005, 11 pages.
Non-Final Office Action mailed Sep. 30, 2011, for U.S. Appl. No. 12/468,401, filed May 19, 2009, 19 pages.
Non-Final Office Action mailed Oct. 14, 2011, for U.S. Appl. No. 12/434,439, filed May 1, 2009, nine pages.
Non-Final Office Action mailed Oct. 27, 2011, for U.S. Appl. No. 12/139,411, filed Jun. 13, 2008, six pages.
Non-Final Office Action mailed Nov. 8, 2011, for U.S. Appl. No. 12/118,639, filed May 9, 2008, five pages.
Non-Final Office Action mailed Nov. 10, 2011, for U.S. Appl. No. 11/830,815, filed Jul. 30, 2007, 15 pages.
Non-Final Office Action mailed Nov. 23, 2011, for U.S. Appl. No. 11/428,515, filed Jul. 3, 2006, eight pages.
Non-Final Office Action mailed Dec. 8, 2011, for U.S. Appl. No. 11/228,758, filed Sep. 16, 2005, 16 pages.
Non-Final Office Action mailed Dec. 8, 2011, for U.S. Appl. No. 12/500,925, filed Jul. 10, 2009, nine pages.
Non-Final Office Action mailed Dec. 9, 2011, for U.S. Appl. No. 12/500,984, filed Jul. 10, 2009, nine pages.
Non-Final Office Action mailed Dec. 12, 2011, for U.S. Appl. No. 12/500,951, filed Jul. 10, 2009, eight pages.
Non-Final Office Action mailed Dec. 16, 2011, for U.S. Appl. No. 12/500,978, filed Jul. 10, 2009, nine pages.
Non-Final Office Action mailed Dec. 22, 2011, for U.S. Appl. No. 11/696,693, filed Apr. 4, 2007, 29 pages.
Non-Final Office Action mailed Jan. 19, 2012, for U.S. Appl. No. 11/830,808, filed Jul. 30, 2007, eight pages.
Non-Final Office Action mailed Jan. 30, 2012, for U.S. Appl. No. 11/428,503, filed Jul. 3, 2006, 15 pages.
Non-Final Office Action mailed Mar. 2, 2012, for U.S. Appl. No. 11/852,690, filed Sep. 10, 2007, 12 pages.
Non-Final Office Action mailed Apr. 5, 2012, for U.S. Appl. No. 12/479,678, filed Jun. 5, 2009, 13 pages.
Non-Final Office Action mailed Apr. 16, 2012, 2011, for U.S. Appl. No. 12/422,212, filed Apr. 10, 2009, 20 pages.
Non-Final Office Action mailed May 2, 2012, for U.S. Appl. No. 11/832,134, filed Oct. 31, 2007, 25 pages.
Non-Final Office Action mailed May 7, 2012, for U.S. Appl. No. 12/118,645, filed May 9, 2008, five pages.
Non-Final Office Action mailed May 9, 2012, for U.S. Appl. No. 12/118,641, filed May 9, 2008, four pages.
Non-Final Office Action mailed May 17, 2012, for U.S. Appl. No. 12/118,648, filed May 9, 2008, four pages.
Non-Final Office Action mailed May 23, 2012, for U.S. Appl. No. 11/428,515, filed Jul. 3, 2006, 15 pages.
Non-Final Office Action mailed Jun. 7, 2012, for U.S. Appl. No. 11/830,766, filed Jul. 30, 2007, 14 pages.
Non-Final Office Action mailed Jun. 13, 2012, for U.S. Appl. No. 12/500,984, filed Jul. 10, 2009, eight pages.
Non-Final Office Action mailed Jun. 22, 2012, for U.S. Appl. No. 11/830,774, filed Jul. 30, 2007, 17 pages.
Non-Final Office Action mailed Jun. 25, 2012, for U.S. Appl. No. 11/830,781, filed Jul. 30, 2007, 19 pages.
Non-Final Office Action mailed Jun. 25, 2012, for U.S. Appl. No. 12/479,573, filed Jun. 5, 2009, 11 pages.
Notice of Allowability mailed Feb. 11, 2009, for U.S. Appl. No. 11/428,521, filed Jul. 3, 2006, five pages.
Notice of Allowability mailed Jul. 10, 2009, for U.S. Appl. No. 11/428,521, filed Jul. 3, 2006, five pages.
Notice of Allowability mailed Sep. 2, 2009, for U.S. Appl. No. 11/428,506, filed Jul. 3, 2006, five pages.
Notice of Allowability mailed Sep. 3, 2009, for U.S. Appl. No. 11/241,839, filed Sep. 30, 2005, 10 pages.
Notice of Allowability (Supplemental) mailed May 12, 2010, for U.S. Appl. No. 11/559,822, filed Nov. 14, 2006, two pages.
Notice of Allowance mailed Mar. 23, 2010, for U.S. Appl. No. 11/428,501, filed Jul. 3, 2006, eight pages.
Notice of Allowance mailed Apr. 26, 2010, for U.S. Appl. No. 11/559,822, filed Nov. 14, 2006, nine pages.
Notice of Allowance mailed Jun. 21, 2010, for U.S. Appl. No. 11/677,958, filed Feb. 22, 2007, eight pages.
Notice of Allowance mailed Aug. 16, 2011, for U.S. Appl. No. 11/559,763, filed Nov. 14, 2006, nine pages.
Notice of Allowance mailed Oct. 26, 2011, for U.S. Appl. No. 11/559,763, filed Nov. 14, 2006, nine pages.
Notice of Allowance mailed Mar. 9, 2012, for U.S. Appl. No. 11/240,788, filed Sep. 30, 2005, five pages.
Notice of Allowance mailed Mar. 26, 2012, for U.S. Appl. No. 12/500,973, filed Jul. 10, 2009, 12 pages.
Notice of Allowance mailed Apr. 2, 2012, for U.S. Appl. No. 11/038,590, filed Jan. 18, 2005, 11 pages.
Notice of Allowance mailed Apr. 13, 2012, for U.S. Appl. No. 12/342,027, filed Dec. 22, 2008, 10 pages.
Notice of Allowance mailed Jun. 27, 2012, for U.S. Appl. No. 11/559,736, filed Nov. 14, 2006, 11 pages.
Notification of Reason(s) for Refusal mailed Apr. 25, 2011, for JP Patent Application No. 2008-531106, with English Translation, five pages.
Pavlovic, V.I. et al. (Jul. 1997). "Visual Interpretation of Hand Gestures for Human-Computer Interaction: A Review," *IEEE Transactions on Pattern Analysis and Machine Intelligence* 19(7):677-695.

(56) References Cited

OTHER PUBLICATIONS

PCT International Search Report received in Corresponding PCT Application No. PCT/US2006/031526 dated Feb. 14, 2007.
PCT International Search Report received in Corresponding PCT Application No. PCT/US2005/025657 dated Feb. 26, 2007.
PCT International Search Report received in Corresponding PCT Application No. PCT/US2006/031523 dated Feb. 27, 2007.
PCT International Search Report received in Corresponding PCT Application No. PCT/US2006/031527 dated Feb. 27, 2007.
Quantum Research Group "QT510 / Qwheel™ Touch Slider IC" copyright 2004-2005, 14-pgs.
Quek, "Unencumbered Gestural Interaction," *IEEE Multimedia*, 3:36-47 (Winter 1996).
Radwin, "Activation Force and Travel Effects on Overexertion in Repetitive Key Tapping," *Human Factors*, 39(1):130-140 (Mar. 1997).
Rekimoto et al., "ToolStone: Effective Use of the Physical Manipulation Vocabularies of Input Devices," In Proc. of UIST 2000, 2000.
Rekimoto, J. (2002). "SmartSkin: An Infrastructure for Freehand Manipulation on Interactive Surfaces," *CHI 2002*, Apr. 20-25, 2002. [(Apr. 25, 2002). 4(1):113-120.].
Rubine et al., "Programmable Finger-Tracking Instrument Controllers," *Computer Music Journal*, vol. 14, No. 1 (Spring 1990).
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages. (core citation).
Rubine, D. (May 1992). "Combining Gestures and Direct Manipulation," CHI '92, pp. 659-660. (core citation).
Rutledge et al., "Force-To-Motion Functions for Pointing," Human-Computer Interaction—Interact (1990).
Schiphorst, T. et al. "Using a Gestural Interface Toolkit for Tactile Input to a Dynamic Virtual Space," *Conference on Human Factors in Computing Systems, Proceedings*, Apr. 25, 2002, pp. 754-755.
Smith, R. et al. (1996). "Relating Distortion to Performance in Distortion-Oriented Displays," *Proceedings of the 6th Australian Conference on Computer-Human Interaction* (OZCHI '96), pp. 6-11.
Subatai Ahmad, "A Usable Real-Time 3D Hand Tracker," Proceedings of the 28th Asilomar Conference on Signals, Systems and Computers—Part 2 (of2), vol. 2 (Oct. 1994).
Sun Microsystems. (1992). "The Star7 PDA Prototype," located at <http://www.youtube.com/watch?v=Ahg8OBYixL0, last visited Jan. 15, 2010, seven pages.
Texas Instruments "TSC2003 / I2C Touch Screen Controller" Data Sheet SBAS 162, dated Oct. 2001, 20-pgs.
The Gadgeteer. (Jun. 6, 2003). "Apple iPod (30GB)," available at http://the-gadgeteer.com/review/apple_ipod_30gb_review, last visited Apr. 28, 2008, 19 pages.
U.S. Appl. No. 10/789,676, filed Feb. 27, 2004 entitled "Shape Detecting Input Device". (copy not attached).
U.S. Appl. No. 11/272,868, filed Nov. 15, 2005, by Pryor. (copy not attached).
U.S. Appl. No. 11/332,861, filed Jan. 13, 2006 which is a Re. 6,677,932 listed above.
U.S. Appl. No. 11/349,350, filed Feb. 8, 2006, by Pryor. (copy not attached).
U.S. Appl. No. 11/878,024, filed Jul. 20, 2007, by Pryor. (copy not attached).
U.S. Appl. No. 90/010,571, filed Jun. 10, 2009, by Pryor. (copy not attached).
Wellner, "The Digital Desk Calculators: Tangible Manipulation on a Desk Top Display" In ACM UIST '91 Proceedings, pp. 27-34, Nov. 1991.
Westerman, W. (Jan. 1, 1999). "Hand Tracking, Finger Identification, and Chordic Manipulation on a Multi-Touch Surface," Dissertation, University of Delaware, pp. 1-333.
Westerman, Wayne, et al. (2001). "Multi-Touch: A New Tactile 2-D Gesture Interface for Human-Computer Interaction," *Proceedings of the Human Factors and Ergonomics Society* 45th Annual Meeting.
Williams, "Applications for a Switched-Capacitor Instrumentation Building Block" Linear Technology Application Note 3, Jul. 1985, pp. 1-16.
Yamada et al., "A Switched-Capacitor Interface for Capacitive Pressure Sensors" IEEE Transactions on Instrumentation and Measurement, vol. 41, No. 1, Feb. 1992, pp. 81-86.
Yeh et al., "Switched Capacitor Interface Circuit for Capacitive Transducers" 1985 IEEE.
Zhai et al., "Dual Stream Input for Pointing and Scrolling," *Proceedings of CHI '97 Extended Abstracts* (1997).
Zimmerman et al., "Applying Electric Field Sensing to Human-Computer Interfaces," In CHI '85 Proceedings, pp. 280-287, 1995.
Final Office Action mailed Mar. 21, 2014, for U.S. Appl. No. 11/428,522, filed Jul. 3, 2006, eight pages.
Notice of Allowance mailed Mar. 14, 2014, for U.S. Appl. No. 12/422,222, filed Apr. 10, 2009, nine pages.
Non-Final Office Action mailed Jan. 30, 2015, for U.S. Appl. No. 13/610,672, filed Sep. 11, 2012, nine pages.
Final Office Action mailed Sep. 8, 2016, for U.S. Appl. No. 11/830,781, filed Jul. 30, 2007, 20 pages.
Final Office Action mailed Sep. 10, 2013, for U.S. Appl. No. 12/468,401, filed May 19, 2009, 20 pages.
Final Office Action mailed Sep. 12, 2013, for U.S. Appl. No. 12/139,411, filed Jun. 13, 2008, seven pages.
Holt, J. (Jul. 2003, e-pub. Sep. 4, 2003). "Windows XP: A User Guide," The Robert Gordon University, IT Services Department, retrieved from the internet on Aug. 26, 2013, 27 pages.
Non-Final Office Action mailed Sep. 12, 2013, for U.S. Appl. No. 11/428,522, filed Jul. 3, 2006, six pages.
Non-Final Office Action mailed Sep. 13, 2013, for U.S. Appl. No. 12/422,205, filed Apr. 10, 2009, 17 pages.
Non-Final Office Action mailed Sep. 20, 2013, for U.S. Appl. No. 13/895,221, filed May 15, 2013, 15 pages.
Notice of Allowance mailed Sep. 17, 2013, for U.S. Appl. No. 11/830,757, filed Jul. 30, 2007, 10 pages.
Sears, A. et al. (Jun. 1990). "A New Era for Touchscreen Applications: High Precision, Dragging Icons, and Refined Feedback," University of Maryland, Human-Computer Interaction Laboratory, retrieved from the internet on Aug. 26, 2013, 39 pages.
Final Office Action mailed Mar. 24, 2015, for U.S. Appl. No. 12/422,205, filed Apr. 10, 2009, 16 pages.
Notice of Allowance mailed Mar. 27, 2015, for U.S. Appl. No. 14/089,240, filed Nov. 25, 2013, eight pages.
Non-Final Office Action mailed Mar. 10, 2016, for U.S. Appl. No. 13/620,299, filed Sep. 14, 2012, eight pages.
Non-Final Office Action mailed May 19, 2016, for U.S. Appl. No. 14/080,116, filed Nov. 14, 2013, eight pages.
Non-Final Office Action mailed Jun. 7, 2016, for U.S. Appl. No. 12/118,648, filed May 9, 2008, seven pages.
Non-Final Office Action mailed Jun. 23, 2016, for U.S. Appl. No. 12/118,639, filed May 9, 2008, six pages.
Non-Final Office Action mailed Jul. 1, 2016, for U.S. Appl. No. 15/094,979, filed Apr. 8, 2016, 13 pages.
Non-Final Office Action mailed Jul. 15, 2016, for U.S. Appl. No. 12/422,225, filed Apr. 10, 2009, 12 pages.
Non-Final Office Action mailed Jul. 29, 2016, for U.S. Appl. No. 12/118,659, filed May 9, 2008, nine pages.
Notice of Allowance mailed Mar. 25, 2016, for U.S. Appl. No. 12/139,411, filed Jun. 13, 2008, seven pages.
Notice of Allowance mailed May 6, 2016, for U.S. Appl. No. 11/830,815, filed Jul. 30, 2007, eight pages.
Notice of Allowance mailed Aug. 2, 2016, for U.S. Appl. No. 11/980,721, filed Oct. 31, 2007, seven pages.
Notice of Allowability mailed Aug. 23, 2016, for U.S. Appl. No. 11/830,815, filed Jul. 30, 2007, two pages.
Non-Final Office Action mailed Jan. 14, 2016, for U.S. Appl. No. 11/428,522, filed Jul. 3, 2006, six pages.
Notice of Allowance mailed Jan. 8, 2016, for U.S. Appl. No. 11/048,264, filed Jan. 31, 2005, seven pages.

(56) References Cited

OTHER PUBLICATIONS

Notice of Allowance mailed Jan. 14, 2016, for U.S. Appl. No. 12/422,205, filed Apr. 10, 2009, seven pages.
Notice of Allowance mailed Jan. 14, 2016, for U.S. Appl. No. 12/479,573, filed Jun. 5, 2009, nine pages.
Extended European search report mailed Nov. 29, 2016, for European Patent Application No. 16184609.2, nine pages.
Final Office Action mailed Oct. 7, 2016, for U.S. Appl. No. 11/428,522, filed Jul. 3, 2006, nine pages.

* cited by examiner

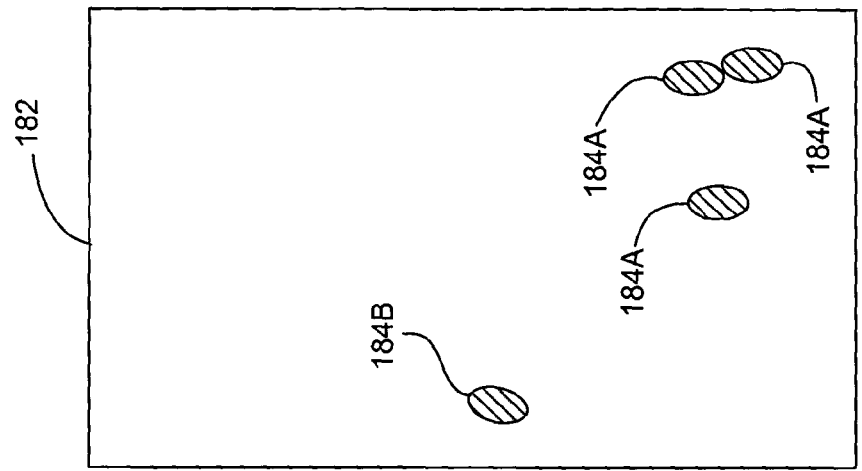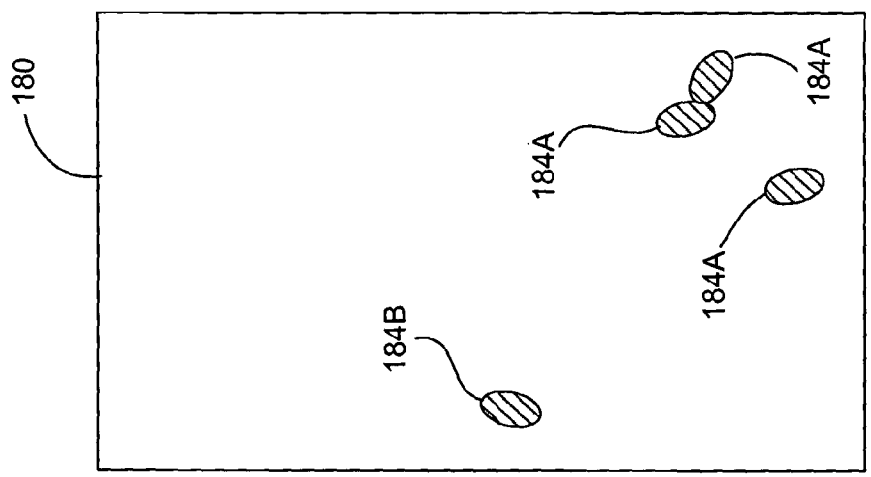
FIG. 6B

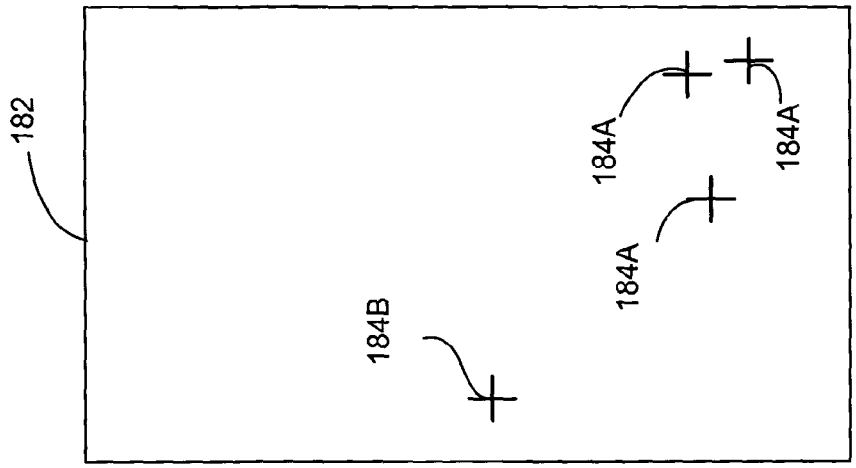
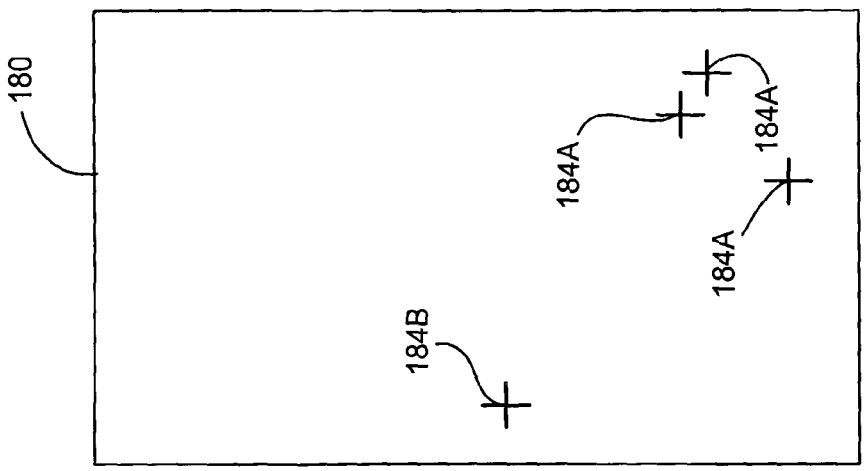
FIG. 6C

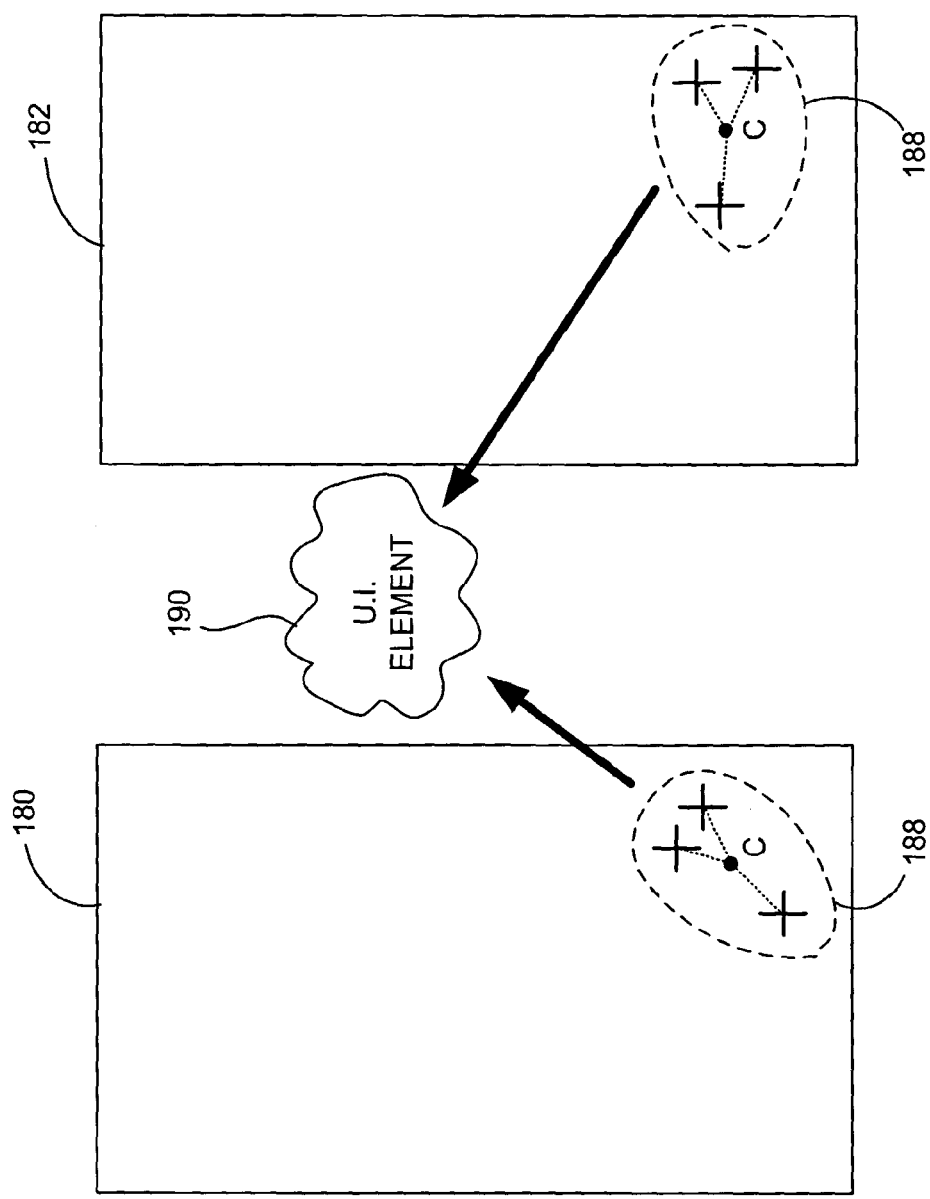

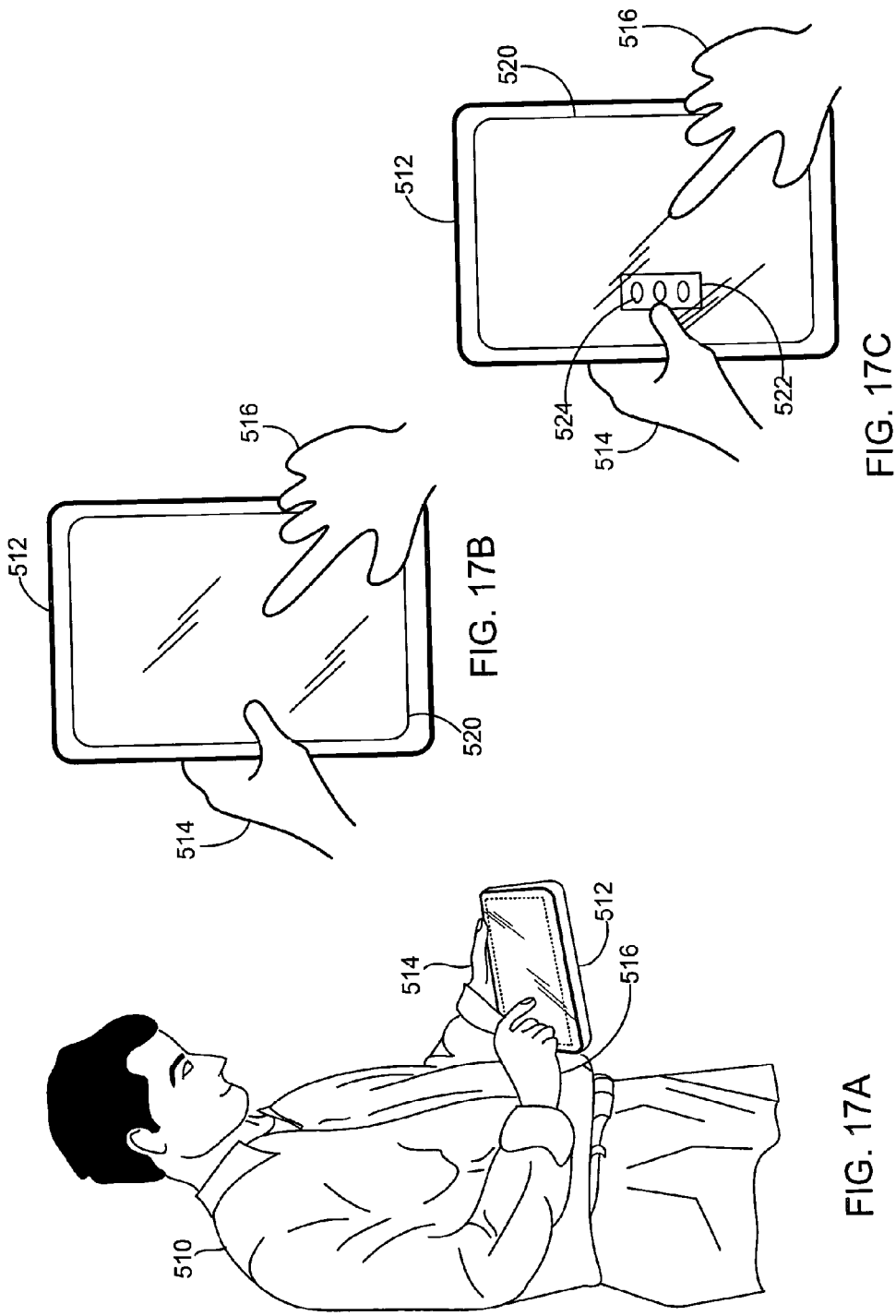

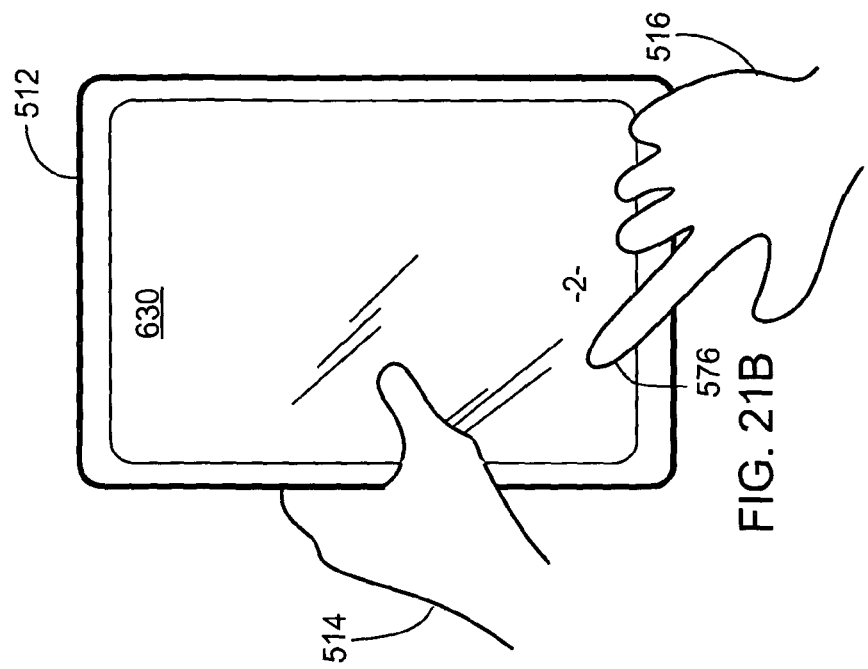
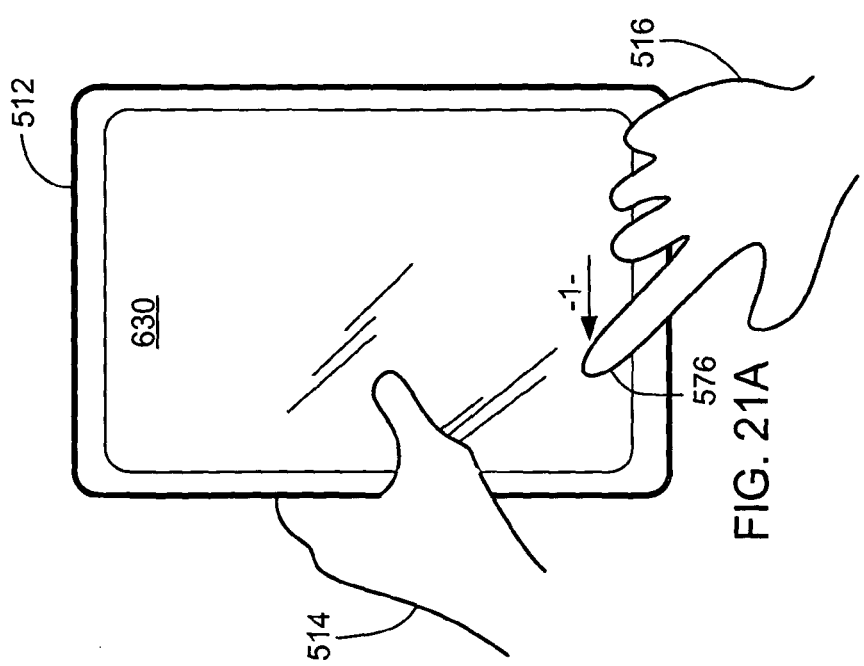

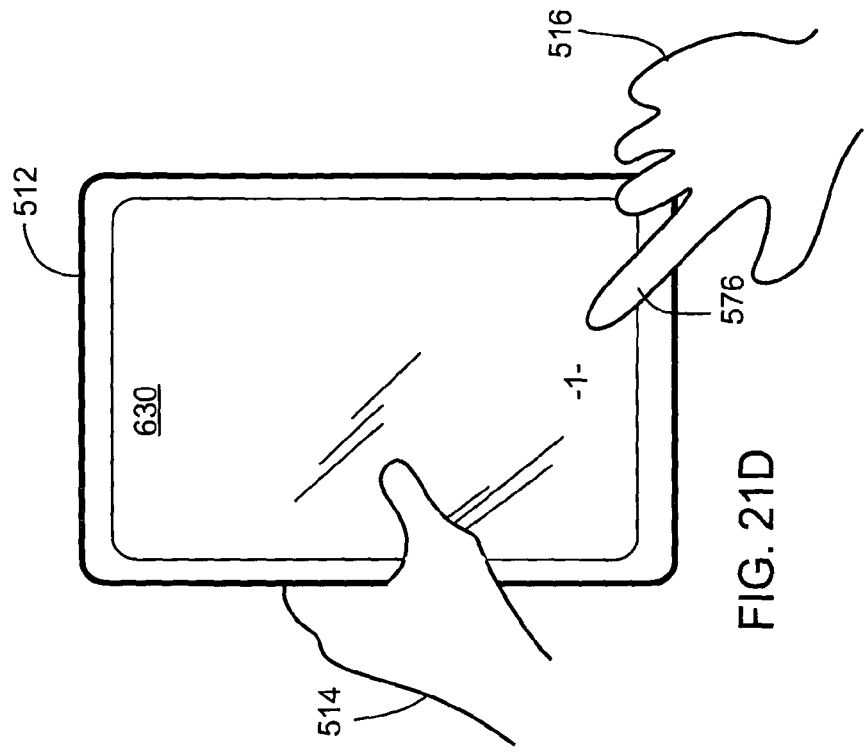
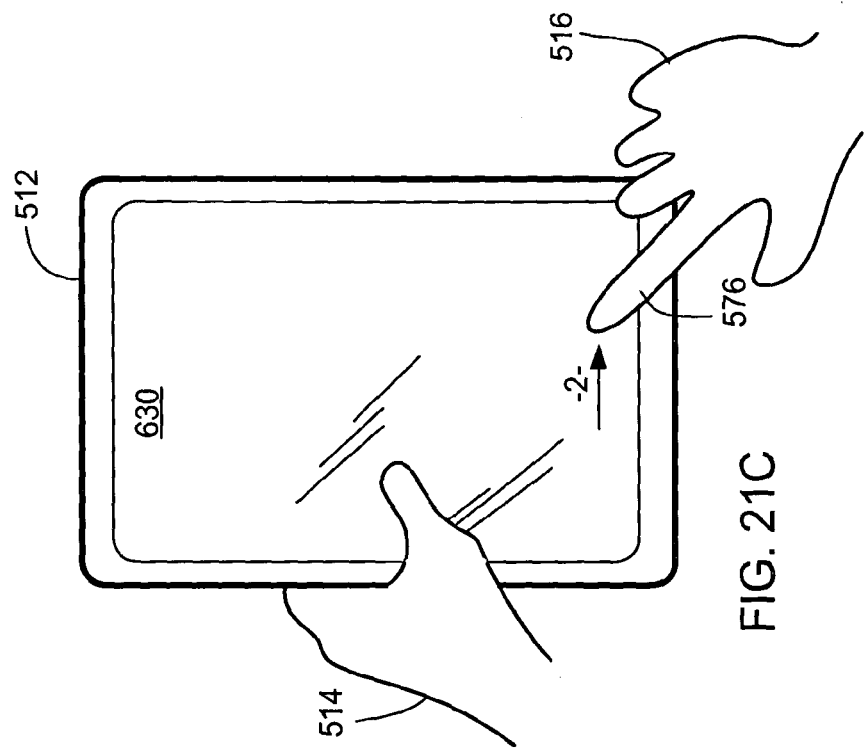

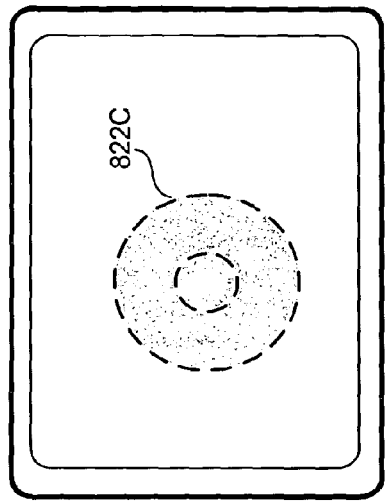
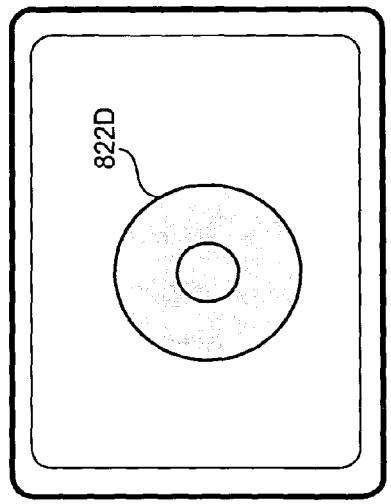
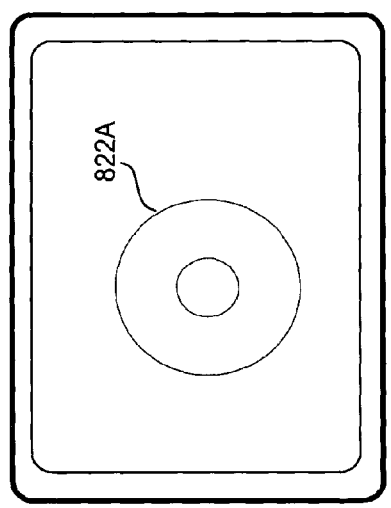
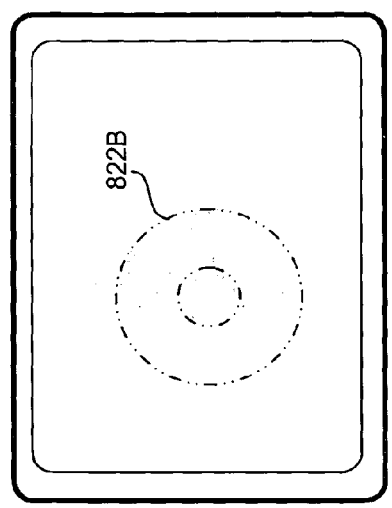
FIG. 30C
FIG. 30D
FIG. 30A
FIG. 30B

MODE-BASED GRAPHICAL USER INTERFACES FOR TOUCH SENSITIVE INPUT DEVICES

CROSS-REFERENCE TO RELATED APPLICATIONS

This application is a Divisional of U.S. patent application Ser. No. 11/038,590, filed on Jan. 18, 2005, entitled "MODE-BASED GRAPHICAL USER INTERFACES FOR TOUCH SENSITIVE INPUT DEVICES", which is a Continuation-in-Part of U.S. patent application Ser. No. 10/903,964, filed on Jul. 30, 2004, entitled "GESTURES FOR TOUCH SENSITIVE INPUT DEVICES," and which is herein incorporated by reference.

This application is also related to: (i) U.S. patent application Ser. No. 10/256,716, filed on Sep. 26, 2002 and entitled "METHOD AND APPARATUS FOR ACCELERATED SCROLLING", which was issued on Dec. 25, 2007 as U.S. Pat. No. 7,312,782; (ii) U.S. patent application Ser. No. 10/259,159, filed on Sep. 26, 2002 and entitled "METHOD AND APPARATUS FOR USE OF ROTATIONAL USER INPUT"; (iii) U.S. patent application Ser. No. 10/072,765, filed on Feb. 7, 2002 and entitled "MOUSE HAVING A ROTARY DIAL"; and (iv) U.S. patent application Ser. No. 10/840,862, filed on May 6, 2004 and entitled "MULTIPOINT TOUCH SCREEN". Each of these related application are hereby incorporated herein by reference.

BACKGROUND OF THE INVENTION

Field of the Invention

The present invention relates generally to gesturing associated with touch sensitive devices.

Description of the Related Art

There exist today many styles of input devices for performing operations in a computer system. The operations generally correspond to moving a cursor and making selections on a display screen. The operations may also include paging, scrolling, panning, zooming, etc. By way of example, the input devices may include buttons, switches, keyboards, mice, trackballs, touch pads, joy sticks, touch screens and the like. Each of these devices has advantages and disadvantages that are taken into account when designing the computer system.

Buttons and switches are generally mechanical in nature and provide limited control with regards to the movement of the cursor and making selections. For example, they are generally dedicated to moving the cursor in a specific direction (e.g., arrow keys) or to making specific selections (e.g., enter, delete, number, etc.).

In mice, the movement of the input pointer corresponds to the relative movements of the mouse as the user moves the mouse along a surface. In trackballs, the movement of the input pointer corresponds to the relative movements of a ball as the user moves the ball within a housing. Mice and trackballs also include one or more buttons for making selections. Mice may also include scroll wheels that allow a user to move through the GUI by simply rolling the wheel forward or backward.

With touch pads, the movement of the input pointer corresponds to the relative movements of the user's finger (or stylus) as the finger is moved along a surface of the touch pad. Touch screens, on the other hand, are a type of display screen that has a touch-sensitive transparent panel covering the screen. When using a touch screen, a user makes a selection on the display screen by pointing directly to GUI objects on the screen (usually with a stylus or finger).

In order to provide additionally functionality, gestures have been implemented with some of these input devices. By way of example, in touch pads, selections may be made when one or more taps are detected on the surface of the touch pad. In some cases, any portion of the touch pad may be tapped, and in other cases a dedicated portion of the touch pad may be tapped. In addition to selections, scrolling may be initiated by using finger motion at the edge of the touch pad.

U.S. Pat. Nos. 5,612,719 and 5,590,219, assigned to Apple Computer, Inc. describe some other uses of gesturing. U.S. Pat. No. 5,612,719 discloses an onscreen button that is responsive to at least two different button gestures made on the screen on or near the button. U.S. Pat. No. 5,590,219 discloses a method for recognizing an ellipse-type gesture input on a display screen of a computer system.

In recent times, more advanced gestures have been implemented. For example, scrolling may be initiated by placing four fingers on the touch pad so that the scrolling gesture is recognized and thereafter moving these fingers on the touch pad to perform scrolling events. The methods for implementing these advanced gestures, however, has several drawbacks. By way of example, once the gesture is set, it cannot be changed until the user resets the gesture state. In touch pads, for example, if four fingers equals scrolling, and the user puts a thumb down after the four fingers are recognized, any action associated with the new gesture including four fingers and the thumb will not be performed until the entire hand is lifted off the touch pad and put back down again (e.g., reset). Simply put, the user cannot change gesture states midstream. Along a similar vein, only one gesture may be performed at any given time. That is, multiple gestures cannot be performed simultaneously.

Based on the above, there is a need for improvements in the way gestures are performed on touch sensitive devices.

SUMMARY OF THE INVENTION

The invention pertains to gestures and methods of implementing gestures with touch sensitive devices. Examples of touch sensitive devices include touch screens and touch pads. The invention also pertains to user interfaces and methods of implementing user interfaces with displays.

The invention can be implemented in numerous ways, including as a method, graphical user interface, computing device, or a computer readable medium. Several embodiments of the invention are discussed below.

The invention relates, in one embodiment, to a user interface method. The method includes detecting a touch. The method also includes determining a user interface mode when a touch is detected. The method further includes activating one or more GUI elements based on the user interface mode and in response to the detected touch.

The invention relates, in one embodiment, to a user interface method. The method includes displaying a group of media items. The method also includes detecting a touch over the group of media items that are displayed. The method further includes activating a virtual scroll wheel when a touch is detected over the displayed media items. The activation of the virtual scroll wheel includes displaying and enabling the functionality of the virtual scroll wheel, the virtual scroll wheel providing a touch region where a user swirls their finger in order to traverse through the group of media items. The method additionally includes determining if a touch event is performed relative to the touch region of the virtual scroll wheel. Moreover, the method includes scrolling through the group of media items when a scrolling touch event is performed.

The invention relates, in one embodiment, to a method performed on a user operated electronic device having a display and a touch screen. The method includes determining if a touch is detected. The method also includes monitoring and analyzing the current operating conditions when a touch is detected. The method also includes activating a first GUI element for a first set of operating conditions. The method additionally includes activating a second GUI element for a second set of operating conditions.

The invention relates, in one embodiment, to a method performed on a computing device having a display and a touch sensing input device. The method includes sensing touches. The method also includes displaying and enabling a GUI element when a touch is detected. The GUI element is based on at least one of the following: (a) the application currently running on the computing device; (b) the current state of the application; and/or (c) one or more characteristics of the touch. The characteristics include, for example, touch location, touch ID, number of touches, and touch motion. The method further includes disabling and removing the GUI element from display when one of the following events occurs: (a) the touch is no longer detected, (b) a touch has not been detected for a preset amount of time, (c) a certain amount of time has gone by since the step of displaying and enabling, (d) a user selection.

The invention relates, in another embodiment, to a computing system. The computing system includes a display device configured to display a graphical user interface. The system also includes a touch screen positioned over the display device. The touch screen is configured to detect touches that occur over the display device. The system further includes a processor operatively coupled to the display device and the touch screen. The processor instructs the display device to display one or more GUI elements in response to a touch, and performs actions associated with the GUI element when touch events are detected relative to the displayed GUI elements.

The invention relates, in another embodiment, to a computing device. The computing device includes a processor. The computing device also includes a touch screen capable of sensing touch events. The computing device further includes a display configured to simultaneously display a plurality of media items and a virtual scroll wheel. The virtual scroll wheel provides a region where touch events are performed in order to implement a scrolling action. The scrolling action allows a user to traverse through the plurality of media items.

Other aspects and advantages of the invention will become apparent from the following detailed description, taken in conjunction with the accompanying drawings, illustrating by way of example the principles of the invention.

BRIEF DESCRIPTION OF THE DRAWINGS

The invention will be readily understood by the following detailed description in conjunction with the accompanying drawings, wherein like reference numerals designate like structural elements, and in which:

FIGS. 6A-6G illustrate a rotate gesture, in accordance with one embodiment of the present invention.

FIGS. 17A-17E illustrate a floating control sequence, in accordance with one embodiment of the present invention.

FIGS. 21A-21D illustrate a page turning sequence, in accordance with one embodiment of the present invention.

FIGS. 30A-30D illustrate a transition effect, in accordance with another embodiment of the present invention.

DETAILED DESCRIPTION OF THE INVENTION

The invention pertains to gestures and methods of implementing gestures with touch sensitive devices. Examples of touch sensitive devices include touch screens and touch pads. The invention also pertains to user interfaces and methods of implementing user interfaces with displays. One aspect of the invention relates to determining a user interface mode based on one or more conditions. Another aspect of the invention relates to activating one or more GUI elements based on the user interface mode (e.g., displaying a GUI element). Another aspect of the invention relates to a virtual scroll wheel.

These and other aspects of the invention are discussed below with reference to FIGS. 1-38J. However, those skilled in the art will readily appreciate that the detailed description given herein with respect to these figures is for explanatory purposes as the invention extends beyond these limited embodiments.

Figure 1:
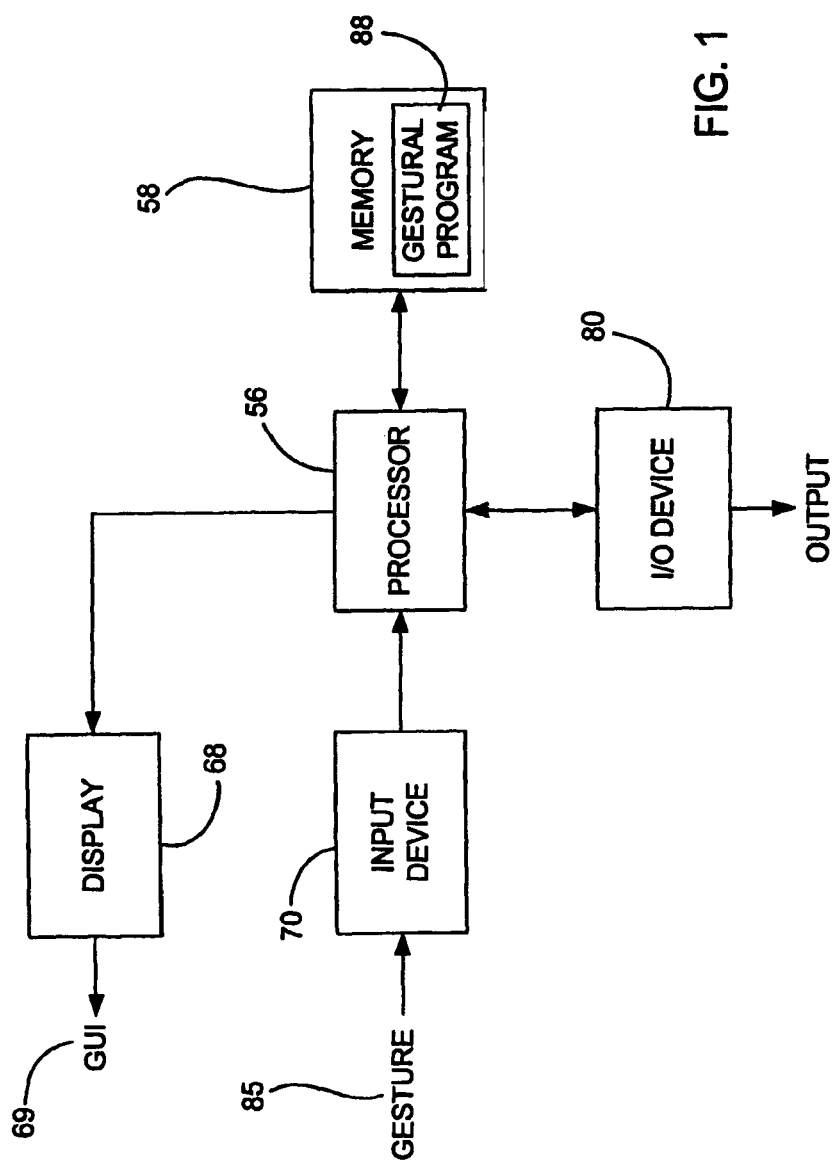
FIG. 1 is a block diagram of a computer system, in accordance with one embodiment of the present invention.

FIG. 1 is a block diagram of an exemplary computer system 50, in accordance with one embodiment of the present invention. The computer system 50 may correspond to a personal computer system, such as a desktops, laptops, tablets or handheld computer. The computer system may also correspond to a computing device, such as a cell phone, PDA, dedicated media player, consumer electronic device, and the like.

The exemplary computer system 50 shown in FIG. 1 includes a processor 56 configured to execute instructions and to carry out operations associated with the computer system 50. For example, using instructions retrieved for example from memory, the processor 56 may control the reception and manipulation of input and output data between components of the computing system 50. The processor 56 can be implemented on a single-chip, multiple chips or multiple electrical components. For example, various architectures can be used for the processor 56, including dedicated or embedded processor, single purpose processor, controller, ASIC, and so forth.

In most cases, the processor 56 together with an operating system operates to execute computer code and produce and use data. Operating systems are generally well known and will not be described in greater detail. By way of example, the operating system may correspond to OS/2, DOS, Unix, Linux, Palm OS, and the like. The operating system can also be a special purpose operating system, such as may be used for limited purpose appliance-type computing devices. The operating system, other computer code and data may reside within a memory block 58 that is operatively coupled to the processor 56. Memory block 58 generally provides a place to store computer code and data that are used by the computer system 50. By way of example, the memory block 58 may include Read-Only Memory (ROM), Random-Access Memory (RAM), hard disk drive and/or the like. The information could also reside on a removable storage medium and loaded or installed onto the computer system 50 when needed. Removable storage mediums include, for example, CD-ROM, PC-CARD, memory card, floppy disk, magnetic tape, and a network component.

The computer system 50 also includes a display device 68 that is operatively coupled to the processor 56. The display device 68 may be a liquid crystal display (LCD) (e.g., active matrix, passive matrix and the like). Alternatively, the display device 68 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 68 is generally configured to display a graphical user interface (GUI) 69 that provides an easy to use interface between a user of the computer system and the operating system or application running thereon. Generally speaking, the GUI 69 represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI 69 can additionally or alternatively display information, such as non interactive text and graphics, for the user on the display device 68.

The computer system 50 also includes an input device 70 that is operatively coupled to the processor 56. The input device 70 is configured to transfer data from the outside world into the computer system 50. The input device 70 may for example be used to perform tracking and to make selections with respect to the GUI 69 on the display 68. The input device 70 may also be used to issue commands in the computer system 50. The input device 70 may include a touch sensing device configured to receive input from a user's touch and to send this information to the processor 56. By way of example, the touch-sensing device may correspond to a touchpad or a touch screen. In many cases, the touch-sensing device recognizes touches, as well as the position and magnitude of touches on a touch sensitive surface. The touch sensing means reports the touches to the processor 56 and the processor 56 interprets the touches in accordance with its programming. For example, the processor 56 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

The input device 70 may be a touch screen that is positioned over or in front of the display 68. The touch screen 70 may be integrated with the display device 68 or it may be a separate component. The touch screen 70 has several advantages over other input technologies such as touchpads, mice, etc. For one, the touch screen 70 is positioned in front of the display 68 and therefore the user can manipulate the GUI 69 directly. For example, the user can simply place their finger over an object to be controlled. In touch pads, there is no one-to-one relationship such as this. With touchpads, the touchpad is placed away from the display typically in a different plane. For example, the display is typically located in a vertical plane and the touchpad is typically located in a horizontal plane. This makes its use less intuitive, and therefore more difficult when compared to touch screens. In addition to being a touch screen, the input device 70 can be a multipoint input device. Multipoint input devices have advantages over conventional singlepoint devices in that they can distinguish more than one object (finger). Singlepoint devices are simply incapable of distinguishing multiple objects. By way of example, a multipoint touch screen, which can be used herein, is shown and described in greater detail in copending and commonly assigned U.S. patent application Ser. No. 10/840,862, which is hereby incorporated herein by reference.

The computer system 50 also includes capabilities for coupling to one or more I/O devices 80. By way of example, the I/O devices 80 may correspond to keyboards, printers, scanners, cameras, speakers, and/or the like. The I/O devices 80 may be integrated with the computer system 50 or they may be separate components (e.g., peripheral devices). In some cases, the I/O devices 80 may be connected to the computer system 50 through wired connections (e.g., cables/ports). In other cases, the I/O devices 80 may be connected to the computer system 80 through wireless connections. By way of example, the data link may correspond to PS/2, USB, IR, RF, Bluetooth or the like.

In accordance with one embodiment of the present invention, the computer system 50 is designed to recognize gestures 85 applied to the input device 70 and to control aspects of the computer system 50 based on the gestures 85. In some cases, a gesture is defined as a stylized interaction with an input device that is mapped to one or more specific computing operations. The gestures 85 may be made through various hand, and more particularly finger motions. Alternatively or additionally, the gestures may be made with a stylus. In all of these cases, the input device 70 receives the gestures 85 and the processor 56 executes instructions to carry out operations associated with the gestures 85. In addition, the memory block 58 may include a gesture operational program 88, which may be part of the operating system or a separate application. The gestural operation program 88 generally includes a set of instructions that recognizes the occurrence of gestures 85 and informs one or more software agents of the gestures 85 and/or what action(s) to take in response to the gestures 85.

When a user performs one or more gestures, the input device 70 relays gesture information to the processor 56. Using instructions from memory 58, and more particularly, the gestural operational program 88, the processor 56 interprets the gestures 85 and controls different components of the computer system 50, such as memory 58, a display 68 and I/O devices 80, based on the gestures 85. The gestures 85 may be identified as commands for performing actions in applications stored in the memory 58, modifying GUI objects shown on the display 68, modifying data stored in memory 58, and/or for performing actions in I/O devices 80. By way of example, the commands may be associated with zooming, panning, scrolling, paging, rotating, sizing, and the like. As further examples, the commands may also be associated with launching a particular program, opening a file or document, viewing a menu, making a selection, executing instructions, logging onto the computer system, permitting authorized individuals access to restricted areas of the computer system, loading a user profile associated with a user's preferred arrangement of the computer desktop, and/or the like.

A wide range of different gestures can be utilized. By way of example, the gestures may be single point or multipoint gestures; static or dynamic gestures; continuous or segmented gestures; and/or the like. Single point gestures are those gestures that are performed with a single contact point, e.g., the gesture is performed with a single touch as for example from a single finger, a palm or a stylus. Multipoint gestures are those gestures that can be performed with multiple points, e.g., the gesture is performed with multiple touches as for example from multiple fingers, fingers and palms, a finger and a stylus, multiple styli and/or any combination thereof. Static gestures are those gestures that do not include motion, and dynamic gestures are those gestures that do include motion. Continuous gestures are those gestures that are performed in a single stroke, and segmented gestures are those gestures that are performed in a sequence of distinct steps or strokes.

In one embodiment, the computer system 50 is configured to register multiple gestures at the same time, i.e., multiple gestures can be performed simultaneously. By way of example, a zoom gesture may be performed at the same time as a rotate gesture, or a rotate gesture may be performed at the same time as a pan gesture. In one particular implementation, zoom, rotate and pan gestures can all occur simultaneously in order to perform zooming, rotating and panning at the same time.

In another embodiment, the system is configured to immediately recognize the gestures so that actions associated with the gestures can be implemented at the same time as the gesture, i.e., the gesture and action simultaneously occur side by side rather than being a two-step process. By way of example, during a scrolling gesture, the screen moves with the finger motion.

In another embodiment, an object presented on a display 68 continuously follows the gesture occurring on a touch screen. There is a one to one relationship between the gesture being performed and the objects shown on the display 68. For example, as the gesture is performed, modifications simultaneously occur to the objects located underneath the gesture. For example, during a zooming gesture, the fingers may spread apart or close together in order to cause the object shown on the display 68 to zoom in during the spreading and zoom out during the closing. During this operation, the computer system 50 recognizes the user input as a zoom gesture, determines what action should be taken, and outputs control data to the appropriate device, in this case the display 68.

In another embodiment, the computer system 50 provides region sensitivity where gestures mean different things when implemented over different areas of the input device 68. For example, a rotation gesture over a volume knob causes volume increase/decrease, whereas a rotation gesture over a photo causes rotation of the photo.

In another embodiment, the number of fingers in contact with the touch screen may indicate an input mode. For example, a single touch as for example by a single finger may indicate the desire to perform tracking, i.e., pointer or cursor movements, or selections, whereas multiple touches as for example by a group of fingers may indicate the desire to perform gesturing. The number of fingers for implementing gesturing may be widely varied. By way of example, two fingers may indicate a first gesture mode, three fingers may indicate a third gesture mode, etc. Alternatively, any number of fingers, i.e., more than one, may be used for the same gesture mode, which can include one or more gesture controls. The orientation of the fingers may similarly be used to denote the desired mode. The profile of the finger may be detected to permit different modal operations based on whether the user has used his thumb or index finger, for example.

In another embodiment, an input can be changed while making a continuous stroke on the input device without stopping the stroke (e.g., lifting off the touch sensitive surface). In one implementation, the user can switch from a tracking (or selection) mode to gesturing mode while a stroke is being made. For example, tracking or selections may be associated with a single finger and gesturing may be associated with multiple fingers; therefore, the user can toggle between tracking/selection and gesturing by picking up and placing down a second finger on the touch screen. In another implementation, the user can switch from one gesture mode to another gesture mode while a stroke is being made. For example, zooming may be associated with spreading a pair of fingers and rotating may be associated with rotating the pair of fingers; therefore, the user can toggle between zooming and rotating by alternating the movement of their fingers between spreading and rotating. In yet another implementation, the number of gesture inputs can be changed while a stroke is being made (e.g., added or subtracted). For example, during zooming where the fingers are spread apart, the user may further rotate their fingers to initiate both zooming and rotation. Furthermore during zooming and rotation, the user can stop spreading their fingers so that only rotation occurs. In other words, the gesture inputs can be continuously input, either simultaneously or consecutively.

In one particular embodiment, a single finger initiates tracking (or selection) and two or more fingers in close proximity to one another initiates scrolling or panning. Two fingers is generally preferred so as to provide easy toggling between one and two fingers, i.e., the user can switch between modes very easily by simply picking or placing an additional finger. This has the advantage of being more intuitive than other forms of mode toggling. During tracking, cursor movement is controlled by the user moving a single finger on the touch sensitive surface of a touch sensing device. The sensor arrangement of the touch sensing device interprets the finger motion and generates signals for producing corresponding movement of the cursor on the display. During scrolling, screen movement is controlled by the user moving dual fingers on the touch sensitive surface of the touch sensing device. When the combined fingers are moved in the vertical direction, the motion is interpreted as a vertical scroll event, and when the combined fingers are moved in the horizontal direction, the motion is interpreted as a horizontal scroll event. The same can be said for panning although panning can occur in all directions rather than just the horizontal and vertical directions.

The term "scrolling" as used herein generally pertains to moving displayed data or images (e.g., text or graphics) across a viewing area on a display screen so that a new set of data (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, the scrolling function allows a user to view consecutive sets of data currently outside of the viewing area. The viewing area may be the entire viewing area of the display screen or it may only be a portion of the display screen (e.g., a window frame).

As mentioned above, scrolling may be implemented vertically (up or down) or horizontally (left or right). In the case of vertical scrolling, when a user scrolls down, each new set of data appears at the bottom of the viewing area and all other sets of data move up one position. If the viewing area is full, the top set of data moves out of the viewing area. Similarly, when a user scrolls up, each new set of data appears at the top of the viewing area and all other sets of data move down one position. If the viewing area is full, the bottom set of data moves out of the viewing area.

By way of example, the display screen, during operation, may display a list of media items (e.g., songs). A user is able to linearly scroll through the list of media items by moving his or her finger across a touch screen. As the finger moves across the touch screen, the displayed items from the list of media items are varied such that the user is able to effectively scroll through the list of media items. In most cases, the user is able to accelerate their traversal of the list of media items by moving his or her finger at greater speeds. Some embodiments, which may be related to the above example, are described in greater detail below. See for example FIGS. 6, 23, 27.

Figure 2:
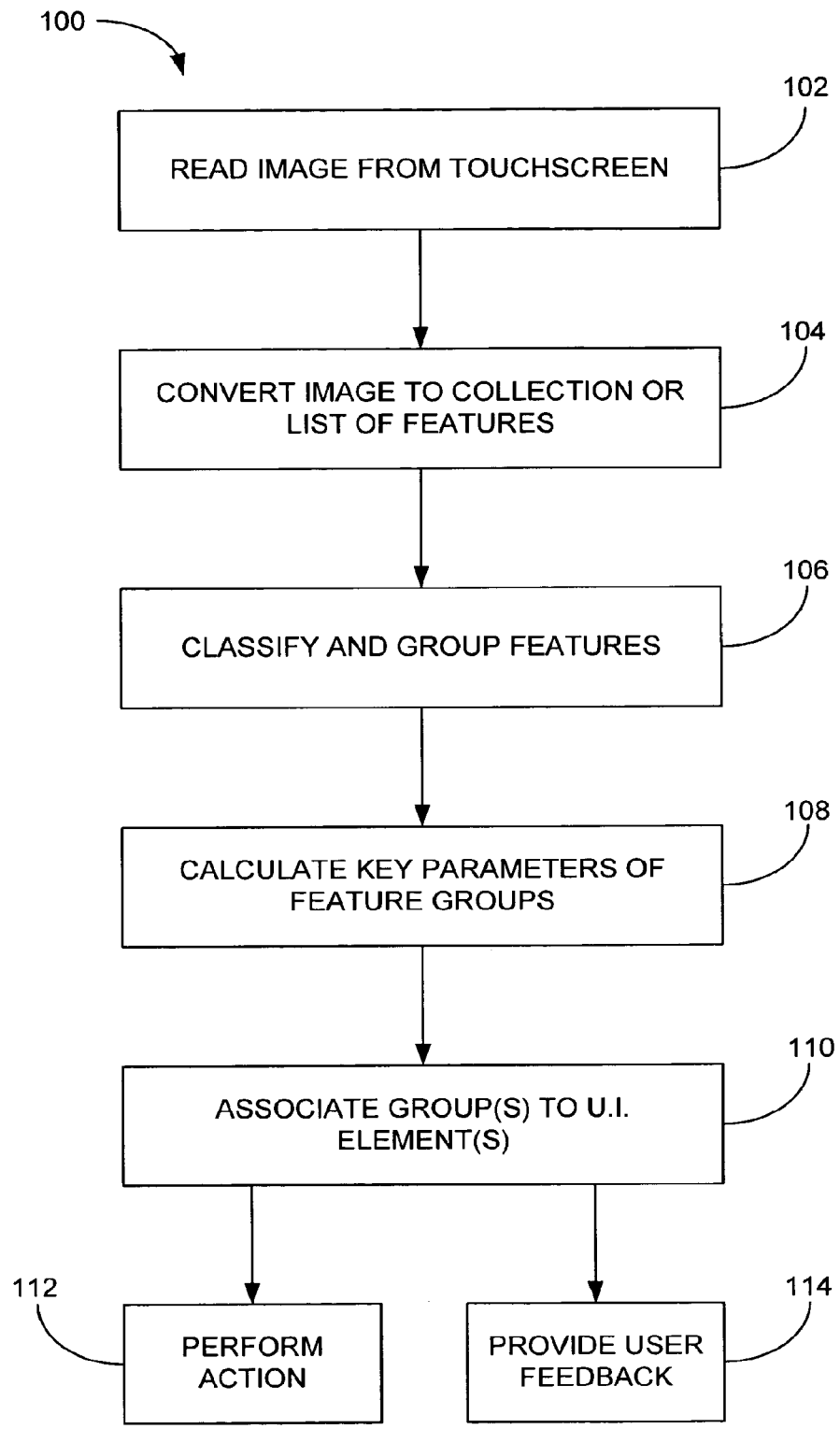
FIG. 2 is a multipoint processing method, in accordance with one embodiment of the present invention.

FIG. 2 is a multipoint processing method 100, in accordance with one embodiment of the present invention. The multipoint processing method 100 may for example be performed in the system shown in FIG. 1. The multipoint processing method 100 generally begins at block 102 where images are read from a multipoint input device, and more particularly a multipoint touch screen. By way of example, the multipoint touch screen may generally correspond to the multipoint touch screen disclosed in copending U.S. patent application Ser. No. 10/840,862, which is hereby incorporated herein by reference. Although the term "image" is used it should be noted that the data may come in other forms. In most cases, the image read from the touch screen provides magnitude (Z) as a function of position (x and y) for each sensing point or pixel of the touch screen. The magnitude may, for example, be reflect the capacitance measured at each point.

Figure 3A:
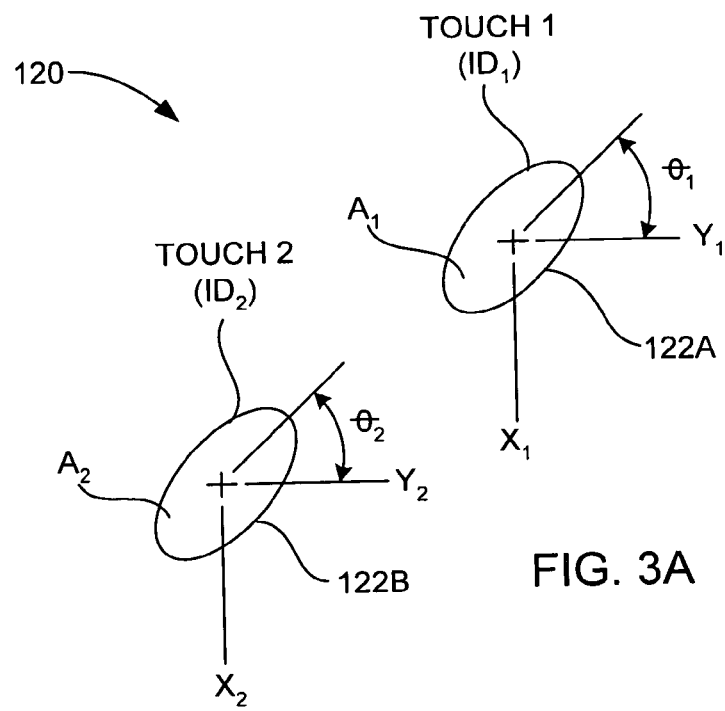
FIGS. 3A and B illustrate an image, in accordance with one embodiment of the present invention.
Figure 3B:
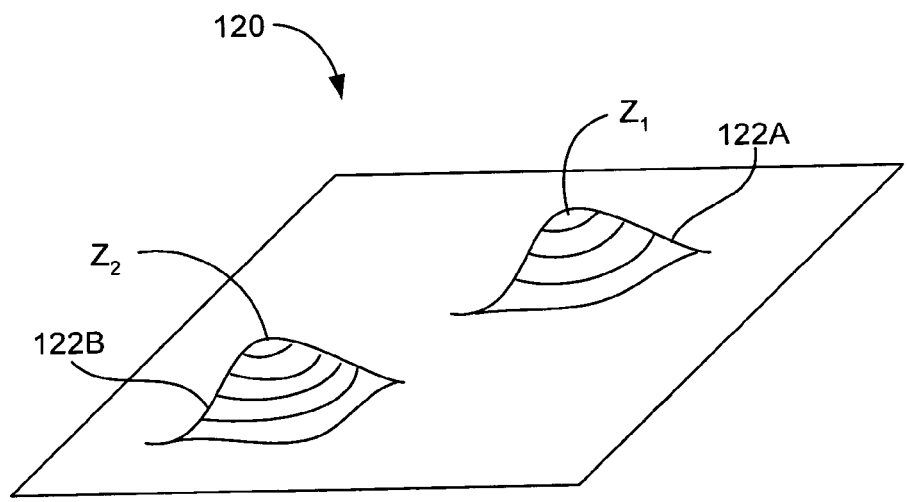

Following block 102, multipoint processing method 100 proceeds to block 104 where the image is converted into a collection or list of features. Each feature represents a distinct input such as a touch. In most cases, each feature includes its own unique identifier (ID), x coordinate, y coordinate, Z magnitude, angle θ, area A, and the like. By way of example, FIGS. 3A and 3B illustrate a particular image 120 in time. In image 120, there are two features 122 based on two distinct touches. The touches may for example be formed from a pair of fingers touching the touch screen. As shown, each feature 122 includes unique identifier (ID), x coordinate, y coordinate, Z magnitude, angle θ, and area A. More particularly, the first feature 122A is represented by $ID_1$, $x_1$, $y_1$, $Z_1$, $\theta_1$, $A_1$ and the second feature 122B is represented by $ID_2$, $x_2$, $y_2$, $Z_2$, $\theta_2$, $A_2$. This data may be outputted for example using a multitouch protocol.

The conversion from data or images to features may be accomplished using methods described in copending U.S. patent application Ser. No. 10/840,862 which is hereby incorporated herein by reference. As disclosed therein, the raw data is received. The raw data is typically in a digitized form, and includes values for each node of the touch screen. The values may be between 0 and 256 where 0 equates to no touch pressure and 256 equates to full touch pressure. Thereafter, the raw data is filtered to reduce noise. Once filtered, gradient data, which indicates the topology of each group of connected points, is generated. Thereafter, the boundaries for touch regions are calculated based on the gradient data, i.e., a determination is made as to which points are grouped together to form each touch region. By way of example, a watershed algorithm may be used. Once the boundaries are determined, the data for each of the touch regions are calculated (e.g., x, y, Z, θ, A).

Following block 104, multipoint processing method 100 proceeds to block 106 where feature classification and groupings are performed. During classification, the identity of each of the features is determined. For example, the features may be classified as a particular finger, thumb, palm or other object. Once classified, the features may be grouped. The manner in which the groups are formed can widely varied. In most cases, the features are grouped based on some criteria (e.g., they carry a similar attribute). For example, the two features shown in FIGS. 3A and 3B may be grouped together because each of these features is located in proximity to each other or because they are from the same hand. The grouping may include some level of filtering to filter out features that are not part of the touch event. In filtering, one or more features may be rejected because they either meet some predefined criteria or because they do not meet some criteria. By way of example, one of the features may be classified as a thumb located at the edge of a tablet PC. Because the thumb is being used to hold the device rather than being used to perform a task, the feature generated therefrom is rejected, i.e., is not considered part of the touch event being processed.

Figure 4:
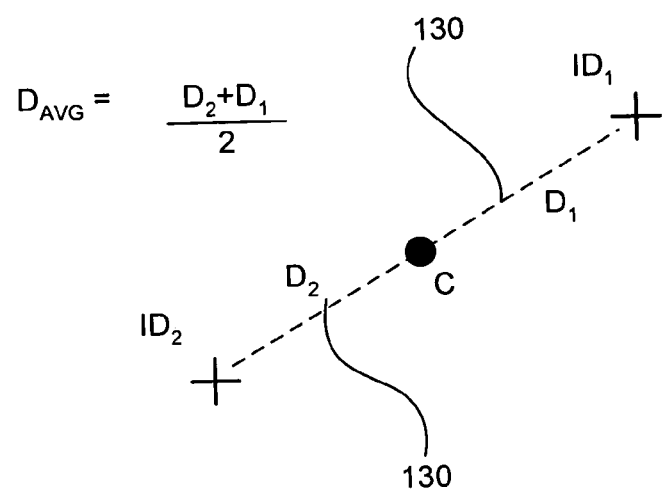
FIG. 4 illustrates a group of features, in accordance with one embodiment of the present invention.

Following block 106, the multipoint processing method 100 proceeds to block 108 where key parameters for the feature groups are calculated. The key parameters may include distance between features, x/y centroid of all features, feature rotation, total pressure of the group (e.g., pressure at centroid), and the like. As shown in FIG. 4, the calculation may include finding the centroid C, drawing a virtual line 130 to each feature from the centroid C, defining the distance D for each virtual line ($D_1$ and $D_2$), and then averaging the distances $D_1$ and $D_2$. Once the parameters are calculated, the parameter values are reported. The parameter values are typically reported with a group identifier (GID) and number of features within each group (in this case three). In most cases, both initial and current parameter values are reported. The initial parameter values may be based on set down, i.e., when the user sets their fingers on the touch screen, and the current values may be based on any point within a stroke occurring after set down. As should be appreciated, blocks 102-108 are repetitively performed during a user stroke thereby generating a plurality of sequentially configured signals. The initial and current parameters can be compared in later steps to perform actions in the system.

Following block 108, the process flow proceeds to block 110 where the group is or associated to a user interface (UI) element. UI elements are buttons boxes, lists, sliders, wheels, knobs, etc. Each UI element represents a component or control of the user interface. The application behind the UI element(s) has access to the parameter data calculated in block 108. In one implementation, the application ranks the relevance of the touch data to the UI element corresponding there to. The ranking may be based on some predetermine criteria. The ranking may include producing a figure of merit, and whichever UI element has the highest figure of merit, giving it sole access to the group. There may even be some degree of hysteresis as well (once one of the UI elements claims control of that group, the group sticks with the UI element until another UI element has a much higher ranking). By way of example, the ranking may include determining proximity of the centroid (or features) to the GUI object associated with the UI element.

Following block 110, the multipoint processing method 100 proceeds to blocks 112 and 114. The blocks 112 and 114 can be performed approximately at the same time. From the user perspective, in one embodiment, the blocks 112 and 114 appear to be performed concurrently. In block 112, one or more actions are performed based on differences between initial and current parameter values as well as the UI element to which they are associated. In block 114, user feedback pertaining to the one or more action being performed is provided. By way of example, user feedback may include display, audio, tactile feedback and/or the like.

Figure 5:
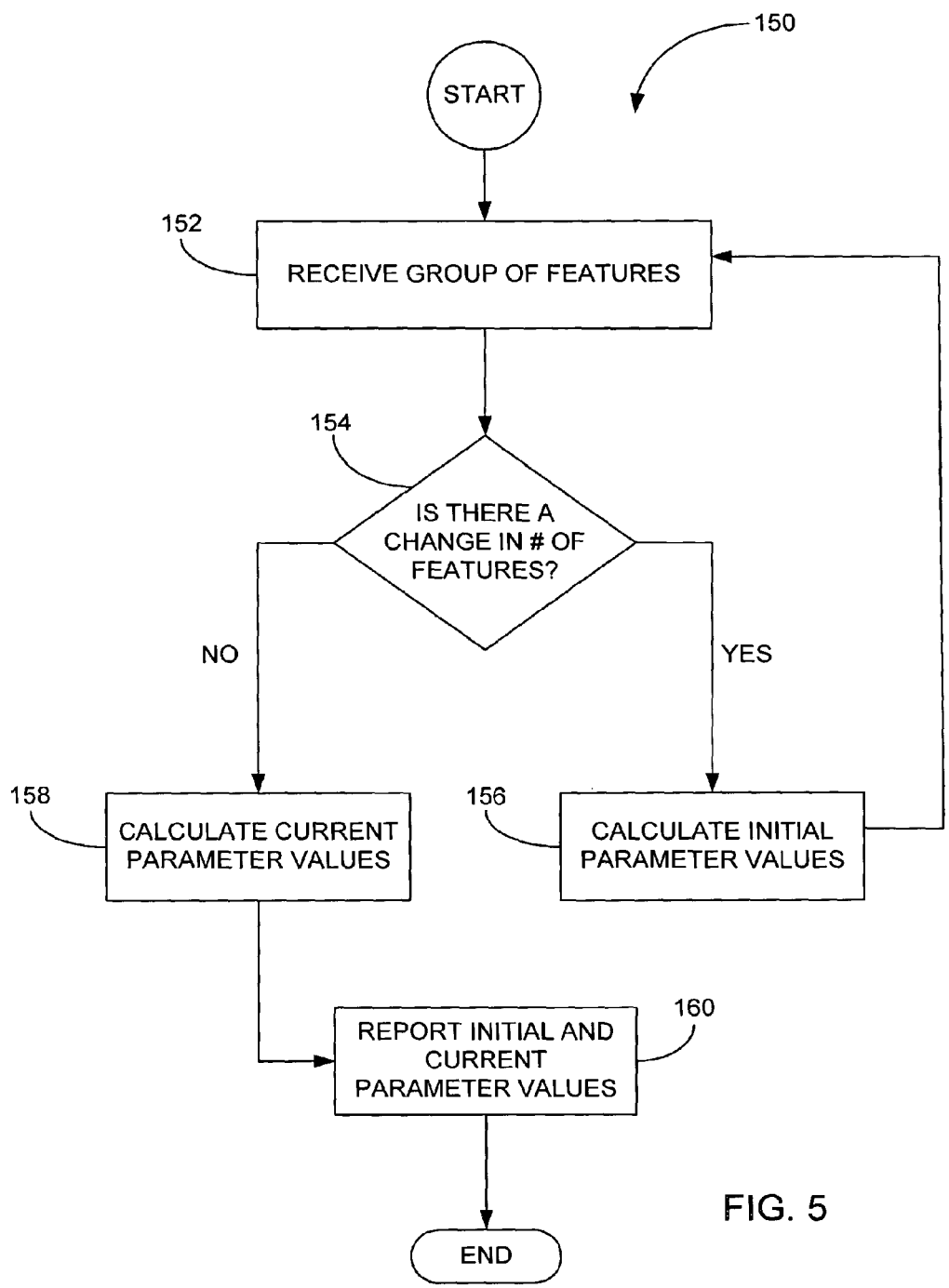
FIG. 5 is a parameter calculation method, in accordance with one embodiment of the present invention.

FIG. 5 is a parameter calculation method 150, in accordance with one embodiment of the present invention. The parameter calculation method 150 may, for example, correspond to block 108 shown in FIG. 2. The parameter calculation method 150 generally begins at block 152 where a group of features is received. Following block 152, the parameter calculation method 150 proceeds to block 154 where a determination is made as to whether or not the number of features in the group of features has changed. For example, the number of features may have changed due to the user picking up or placing an additional finger. Different fingers may be needed to perform different controls (e.g., tracking, gesturing). If the number of features has changed, the parameter calculation method 150 proceeds to block 156 where the initial parameter values are calculated. If the number stays the same, the parameter calculation method 150 proceeds to block 158 where the current parameter values are calculated. Thereafter, the parameter calculation method 150 proceeds to block 150 where the initial and current parameter values are reported. By way of example, the initial parameter values may contain the average initial distance between points (or Distance (AVG) initial) and the current parameter values may contain the average current distance between points (or Distance (AVG) current). These may be compared in subsequent steps in order to control various aspects of a computer system.

The above methods and techniques can be used to implement any number of GUI interface objects and actions. For example, gestures can be created to detect and effect a user command to resize a window, scroll a display, rotate an object, zoom in or out of a displayed view, delete or insert text or other objects, etc. Gestures can also be used to invoke and manipulate virtual control interfaces, such as volume knobs, switches, sliders, handles, knobs, doors, and other widgets that may be created to facilitate human interaction with the computing system.

To cite an example using the above methodologies, and referring to FIGS. 6A-6G, a rotate gesture for controlling a virtual volume knob 170 on a GUI interface 172 of a display 174 of a tablet PC 175 will be described. In order to actuate the knob 170, the user places their fingers 176 on a multipoint touch screen 178. The virtual control knob may already be displayed, or the particular number, orientation or profile of the fingers at set down, or the movement of the fingers immediately thereafter, or some combination of these and other characteristics of the user's interaction may invoke the virtual control knob to be displayed. In either case, the computing system associates a finger group to the virtual control knob and makes a determination that the user intends to use the virtual volume knob. This association may also be based in part on the mode or current state of the computing device at the time of the input. For example, the same gesture may be interpreted alternatively as a volume know gesture if a song is currently playing on the computing device, or as a rotate command if an object editing application is being executed. Other user feedback may be provided, including for example audible or tactile feedback.

Figure 6A:
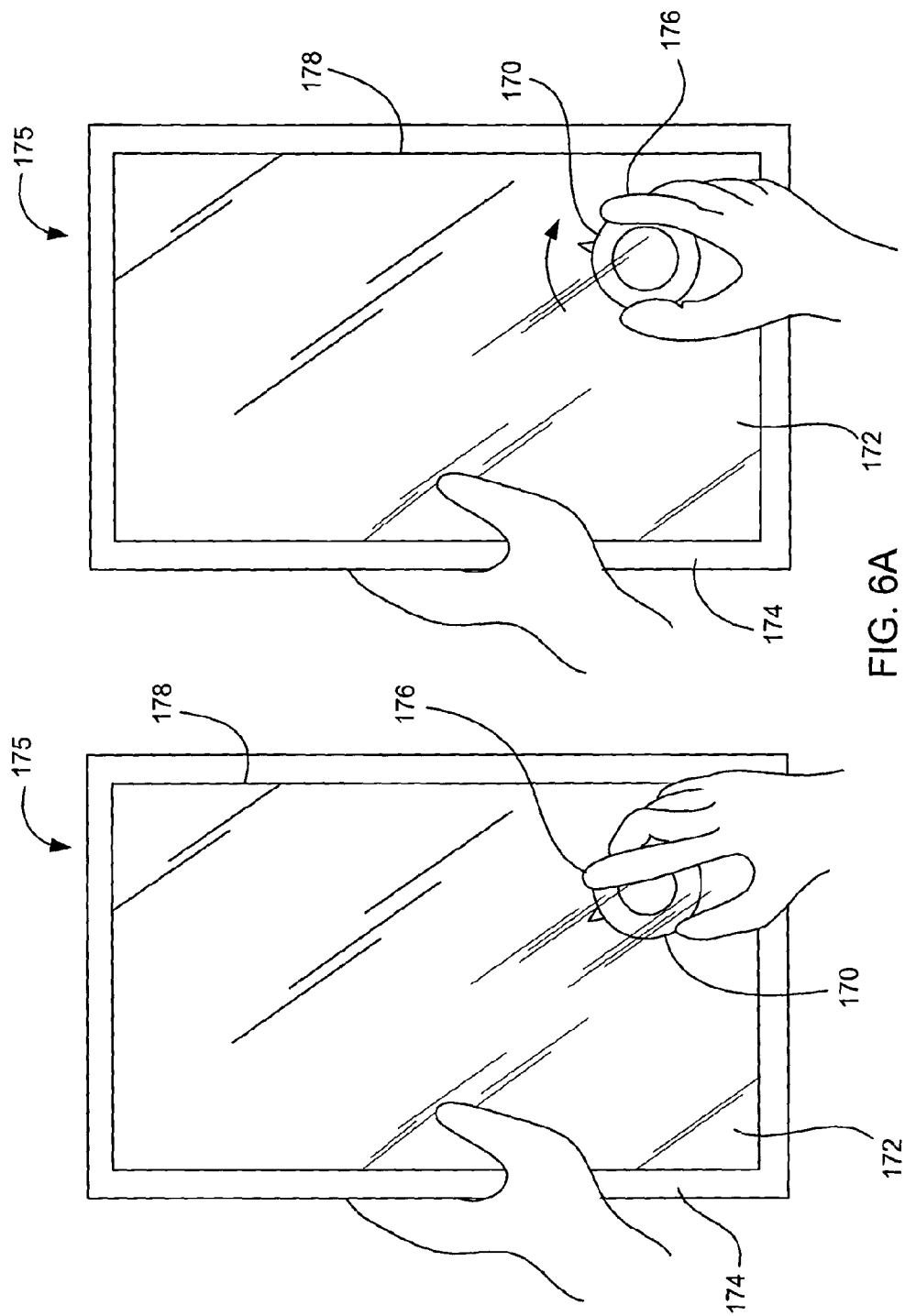

Once knob 170 is displayed as shown in FIG. 6A, the user's fingers 176 can be positioned around the knob 170 similar to if it were an actual knob or dial, and thereafter can be rotated around the knob 170 in order to simulate turning the knob 170. Again, audible feedback in the form of a clicking sound or tactile feedback in the form of vibration, for example, may be provided as the knob 170 is "rotated." The user may also use their other hand to hold the tablet PC 175.

As shown in FIG. 6B, the multipoint touch screen 178 detects at least a pair of images. In particular, a first image 180 is created at set down, and at least one other image 182 is created when the fingers 176 are rotated. Although only two images are shown, in most cases there would be many more images that incrementally occur between these two images. Each image represents a profile of the fingers in contact with the touch screen at a particular instant in time. These images can also be referred to as touch images. It will be understood that the term "image" does not mean that the profile is displayed on the screen 178 (but rather imaged by the touch sensing device). It should also be noted that although the term "image" is used, the data may be in other forms representative of the touch plane at various times.

As shown in FIG. 6C, each of the images 180 and 182 is converted to a collection of features 184. Each feature 184 is associated with a particular touch as for example from the tips each of the fingers 176 surrounding the knob 170 as well as the thumb of the other hand 177 used to hold the tablet PC 175.

Figure 6D:
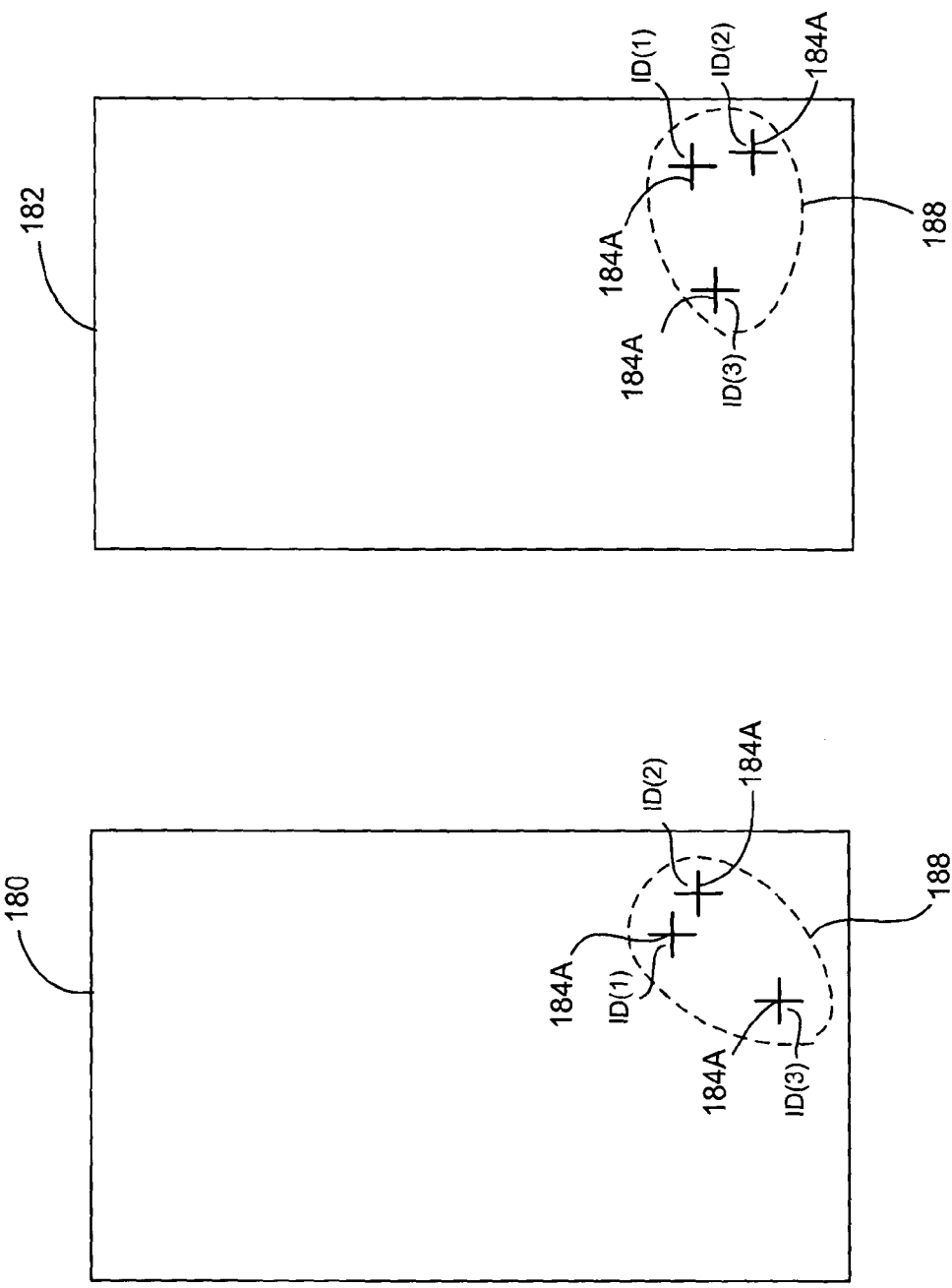

As shown in FIG. 6D, the features 184 are classified, i.e., each finger/thumb is identified, and grouped for each of the images 180 and 182. In this particular case, the features 184A associated with the knob 170 are grouped together to form group 188 and the feature 184B associated with the thumb is filtered out. In alternative arrangements, the thumb feature 184B may be treated as a separate feature by itself (or in another group), for example, to alter the input or operational mode of the system or to implement another gesture, for example, a slider gesture associated with an equalizer slider displayed on the screen in the area of the thumb (or other finger).

As shown in FIG. 6E, the key parameters of the feature group 188 are calculated for each image 180 and 182. The key parameters associated with the first image 180 represent the initial state and the key parameters of the second image 182 represent the current state.

Also as shown in FIG. 6E, the knob 170 is the UI element associated with the feature group 188 because of its proximity to the knob 170. Thereafter, as shown in FIG. 6F, the key parameter values of the feature group 188 from each image 180 and 182 are compared to determine the rotation vector, i.e., the group of features rotated five (5) degrees clockwise from the initial to current state. In FIG. 6F, the initial feature group (image 180) is shown in dashed lines while the current feature group (image 182) is shown in solid lines.

Figure 6G:
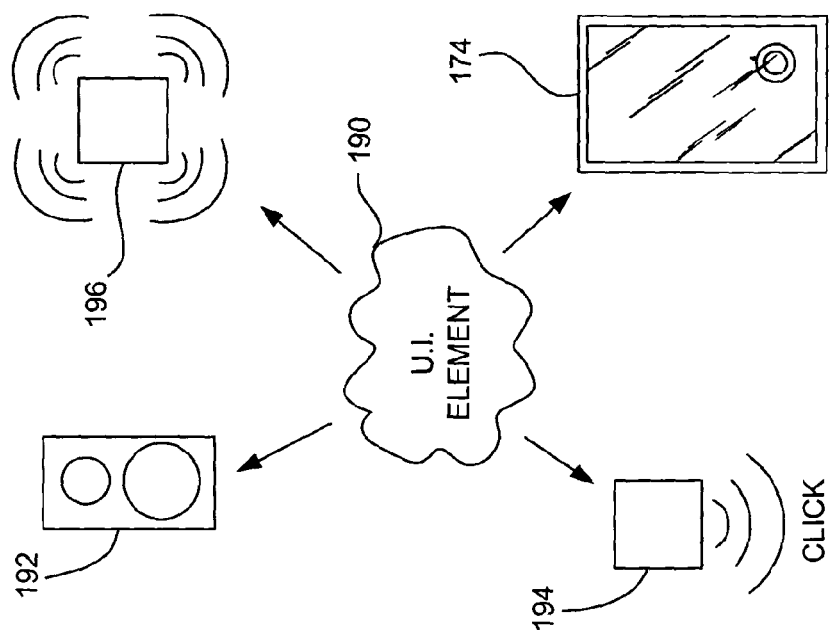
Figure 6F:
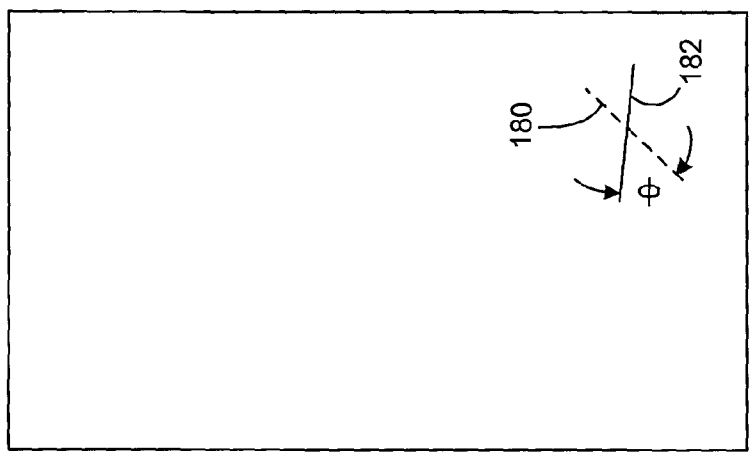

As shown in FIG. 6G, based on the rotation vector the speaker 192 of the tablet PC 175 increases (or decreases) its output in accordance with the amount of rotation of the fingers 176, i.e., increase the volume by 5% based on rotation of 5 degrees. The display 174 of the tablet PC can also adjust the rotation of the knob 170 in accordance with the amount of rotation of the fingers 176, i.e., the position of the knob 170 rotates five (5) degrees. In most cases, the rotation of the knob occurs simultaneously with the rotation of the fingers, i.e., for every degree of finger rotation the knob rotates a degree. In essence, the virtual control knob follows the gesture occurring on the screen. Still further, an audio unit 194 of the tablet PC may provide a clicking sound for each unit of rotation, e.g., provide five clicks based on rotation of five degrees. Sill yet further, a haptics unit 196 of the tablet PC 175 may provide a certain amount of vibration or other tactile feedback for each click thereby simulating an actual knob.

It should be noted that additional gestures can be performed simultaneously with the virtual control knob gesture. For example, more than one virtual control knob can be controlled at the same time using both hands, i.e., one hand for each virtual control knob. Alternatively or additionally, one or more slider bars can be controlled at the same time as the virtual control knob, i.e., one hand operates the virtual control knob, while at least one finger and maybe more than one finger of the opposite hand operates at least one slider and maybe more than one slider bar, e.g., slider bar for each finger.

It should also be noted that although the embodiment is described using a virtual control knob, in another embodiment, the UI element can be a virtual scroll wheel. As an example, the virtual scroll wheel can mimic an actual scroll wheel such as those described in U.S. Patent Publication Nos.: 2003/0076303A1, 2003/0076301A1, 2003/0095096A1, which are all herein incorporated by reference. For example, when the user places their finger on the surface of the virtual scroll wheel and makes a swirling, rotational or tangential gesture motion, a scrolling action can be performed with respect to a list of items displayed in a window.

Figure 7:
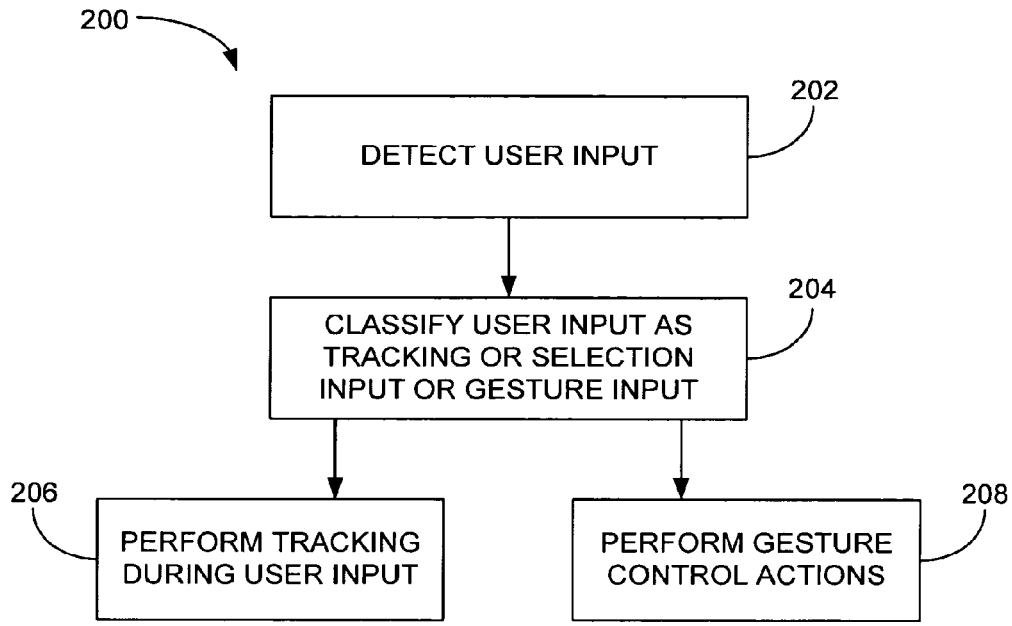
FIG. 7 is a diagram of a touch-based method, in accordance with one embodiment of the present invention.

FIG. 7 is a diagram of a touch-based method 200 in accordance with one embodiment of the present invention. The method generally begins at block 202 where a user input that occurs over a multipoint sensing device is detected. The user input includes one or more touch inputs, with each touch input having a unique identifier. Following block 202, the touch-based method 200 proceeds to block 204 where the user input is classified as a tracking or selection input when the user input includes a single unique identifier (one touch input), or is classified as a gesture input when the user input includes at least two unique identifiers (more than one touch input). If the user input is classified as a tracking input, the touch-based method 200 proceeds to block 206 where tracking is performed corresponding to the user input. If the user input is classified as a gesture input, the touch-based method 200 proceeds to block 208 where one or more gesture control actions are performed corresponding the user input. The gesture control actions are based at least in part on changes that occur with or between the at least two unique identifiers.

Figure 8:
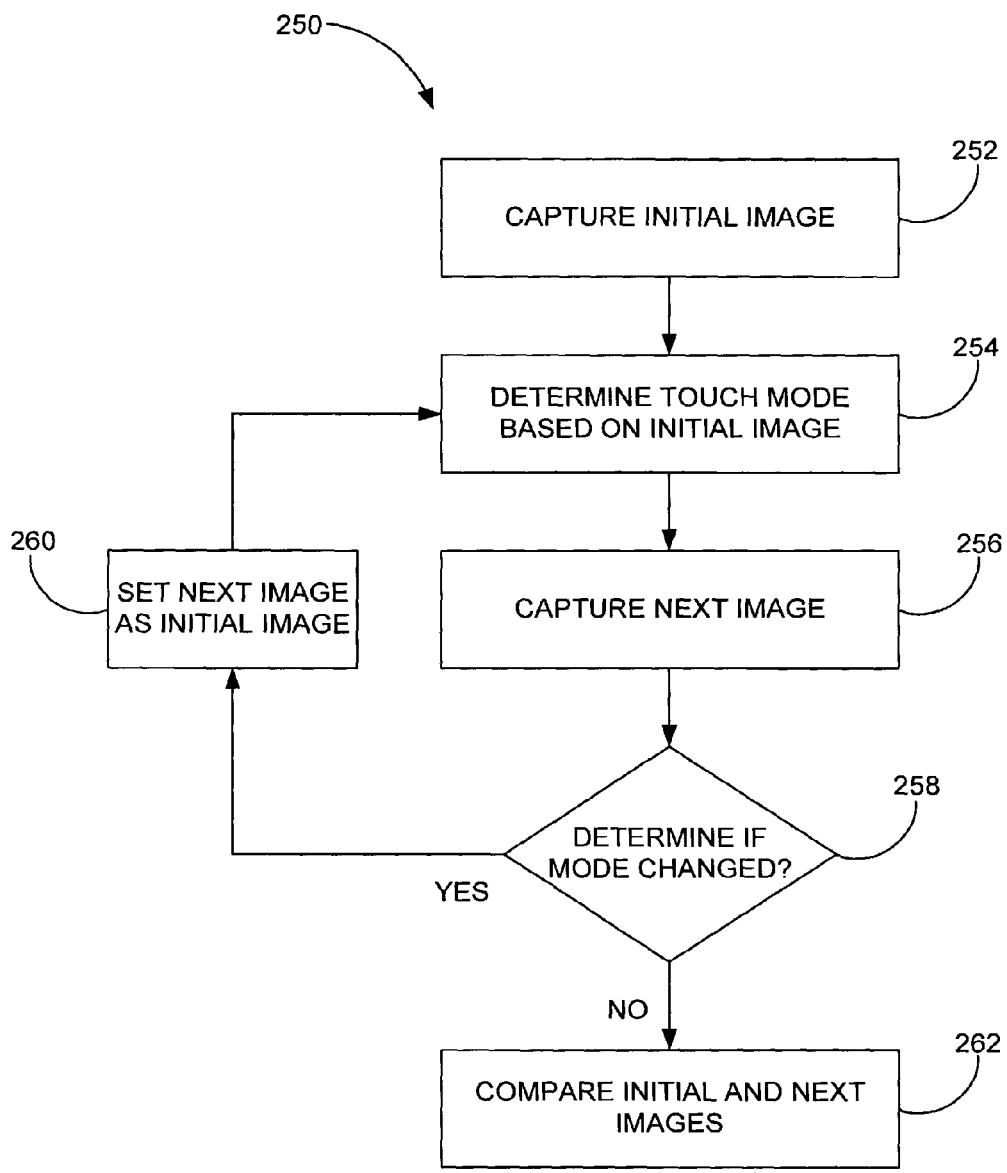
FIG. 8 is a diagram of a touch-based method, in accordance with one embodiment of the present invention.

FIG. 8 is a diagram of a touch-based method 250 in accordance with one embodiment of the present invention. The touch-based method 250 generally begins at block 252 where an initial image is captured during an input stroke on a touch sensitive surface. Following block 252, the touch-based method 250 proceeds to block 254 where the touch mode is determined based on the initial image. For example, if the initial image includes a single unique identifier then the touch mode may correspond to a tracking or selection mode. On the other hand, if the image includes more than one unique identifier, then the touch mode may correspond to a gesture mode. Following block 254, the touch-based method 250 proceeds to block 256 where a next image is captured during the input stroke on the touch sensitive surface. Images are typically captured sequentially during the stroke and thus the there may be a plurality of images associated with the stroke. Following block 256, touch-based method 250 proceeds to block 258 where a determination is made as to whether the touch mode changed between capture of the initial image and capture of the next image. If the touch mode changed, the touch-based method 250 proceeds to block 260 where the next image is set as the initial image and thereafter the touch mode is again determined at block 254 based on the new initial image. If the touch mode stayed the same, the touch-based method 250 proceeds to block 262 where the initial and next images are compared and one or more control signals are generated based on the comparison.

Figure 9:
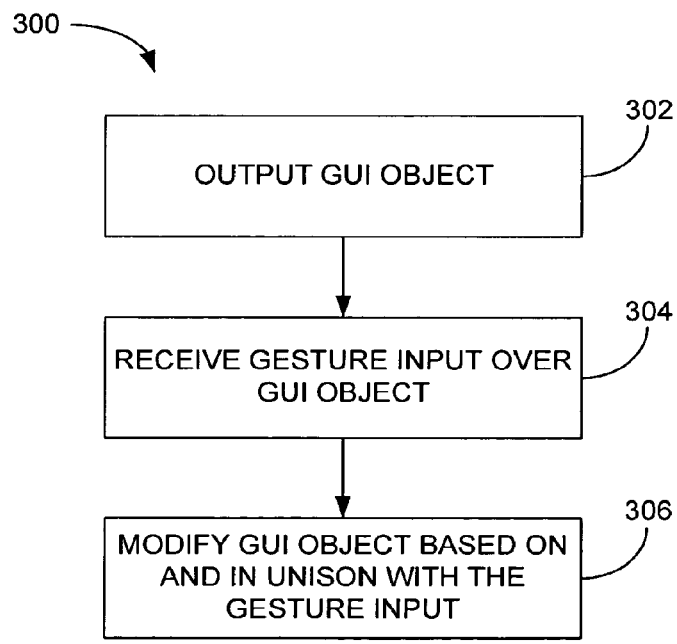
FIG. 9 is a diagram of a touch-based method, in accordance with one embodiment of the present invention.

FIG. 9 is a diagram of a touch-based method 300 in accordance with one embodiment of the present invention. The touch-based method 300 begins at block 302 where a GUI object is output. For example, a processor may instruct a display to display a particular GUI object. Following block 302, the touch-based method 300 proceeds to block 304 where a gesture input is received over the GUI object. For instance, a user may set or move their fingers in a gestural way on the surface of the touch screen and while over the displayed GUI object. The gestural input may include one or more single gestures that occur consecutively or multiple gestures that occur simultaneously. Each of the gestures generally has a particular sequence, motion, or orientation associated therewith. For example, a gesture may include spreading fingers apart or closing fingers together, rotating the fingers, translating the fingers, and/or the like.

Following block 304 the touch-based method 300 proceeds to block 306 where the GUI object is modified based on and in unison with the gesture input. By modified, it is meant that the GUI object changes according to the particular gesture or gestures being performed. By in unison, it is meant that the changes occur approximately while the gesture or gestures are being performed. In most cases, there is a one to one relationship between the gesture(s) and the changes occurring at the GUI object and they occur substantially simultaneously. In essence, the GUI object follows the motion of the fingers. For example, spreading of the fingers may simultaneously enlarge the object, closing of the fingers may simultaneously reduce the GUI object, rotating the fingers may simultaneously rotate the object, translating the fingers may allow simultaneous panning or scrolling of the GUI object.

In one embodiment, block 306 may include determining which GUI object is associated with the gesture being performed, and thereafter locking the displayed object to the fingers disposed over it such that the GUI object changes in accordance with the gestural input. By locking or associating the fingers to the GUI object, the GUI object can continuously adjust itself in accordance to what the fingers are doing on the touch screen. Often the determination and locking occurs at set down, i.e., when the finger is positioned on the touch screen.

Figure 10:
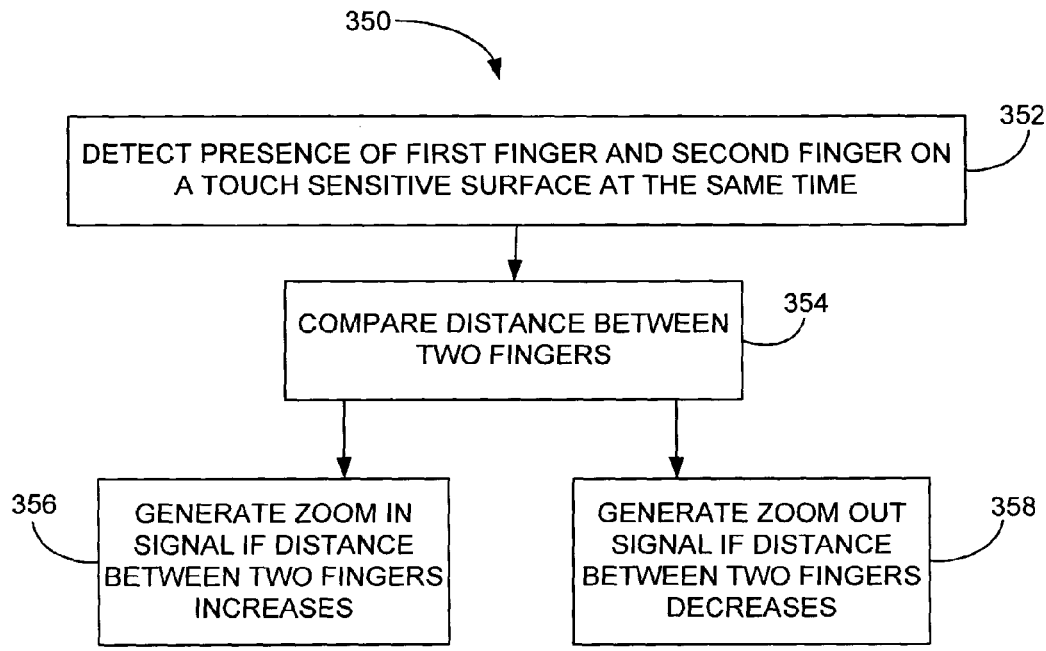
FIG. 10 is a diagram of a zoom gesture method, in accordance with one embodiment of the present invention.

FIG. 10 is a diagram of a zoom gesture method 350, in accordance with one embodiment of the present invention. The zoom gesture may be performed on a multipoint touch screen. The zoom gesture method 350 generally begins at block 352 where the presence of at least a first finger and a second finger are detected on a touch sensitive surface at the same time. The presence of at least two fingers is configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch may be configured to operate whether two, three, four or more fingers are touching, and even if the numbers change during the gesture, i.e., only need a minimum of two fingers at any time during the gesture.

Following block 352, the zoom gesture method 350 proceeds to block 354 where the distance between at least the two fingers is compared. The distance may be from finger to finger or from each finger to some other reference point as for example the centroid. If the distance between the two fingers increases (spread apart), a zoom in signal is generated as shown in block 356. If the distance between two fingers decreases (close together), a zoom-out signal is generated as shown in block 358. In most cases, the set down of the fingers will associate or lock the fingers to a particular GUI object being displayed. For example, the touch sensitive surface can be a touch screen, and the GUI object can be displayed on the touch screen. This typically occurs when at least one of the fingers is positioned over the GUI object. As a result, when the fingers are moved apart, the zoom-in signal can be used to increase the size of the embedded features in the GUI object and when the fingers are pinched together, the zoom-out signal can be used to decrease the size of embedded features in the object. The zooming typically occurs within a predefined boundary such as the periphery of the display, the periphery of a window, the edge of the GUI object, and/or the like. The embedded features may be formed on a plurality of layers, each of which represents a different level of zoom. In most cases, the amount of zooming varies according to the distance between the two objects. Furthermore, the zooming typically can occur substantially simultaneously with the motion of the objects. For instance, as the fingers spread apart or closes together, the object zooms in or zooms out at the same time. Although this methodology is directed at zooming, it should be noted that it may also be used for enlarging or reducing. The zoom gesture method 350 may be particularly useful in graphical programs such as publishing, photo, and drawing programs. Moreover, zooming may be used to control a peripheral device such as a camera, i.e., when the finger is spread apart, the camera zooms out and when the fingers are closed the camera zooms in.

Figure 11A:
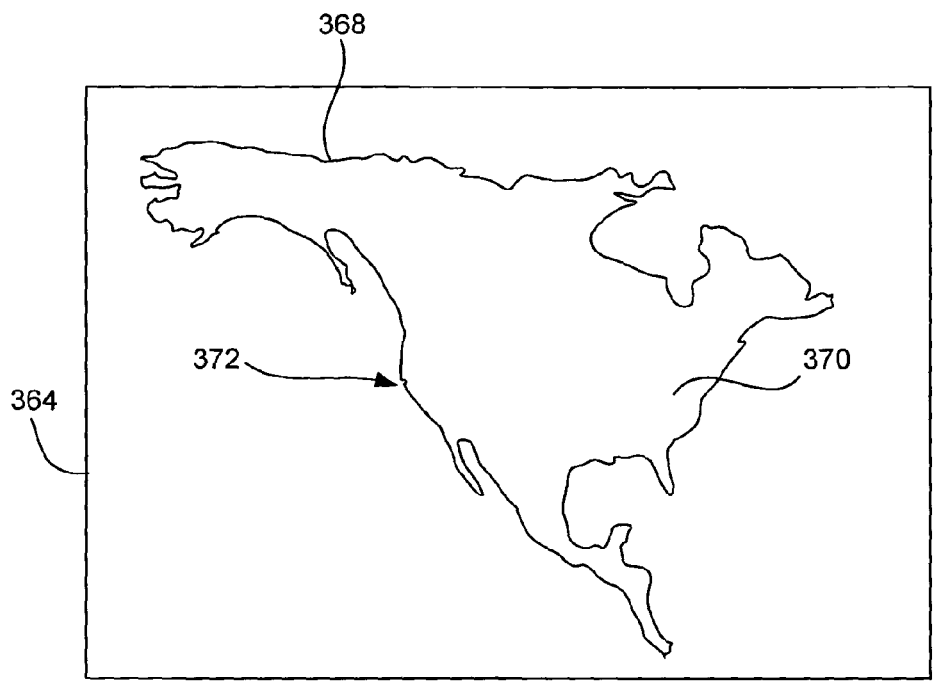
FIGS. 11A-11H illustrates a zooming sequence, in accordance with one embodiment of the present invention.
Figure 11B:
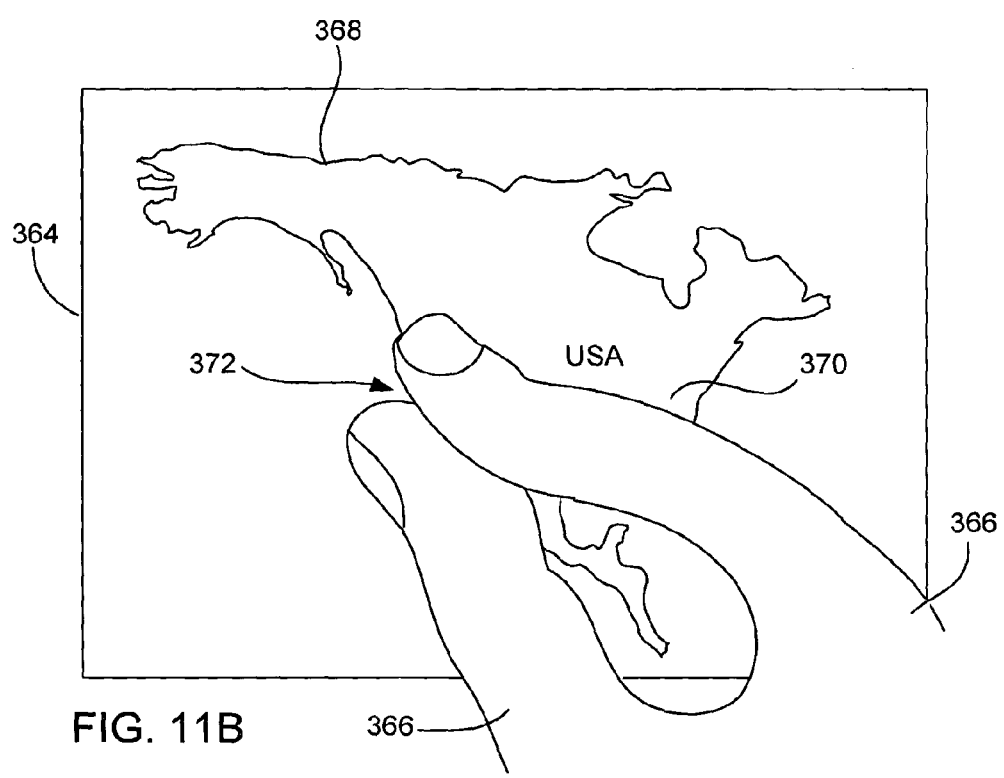
Figure 11C:
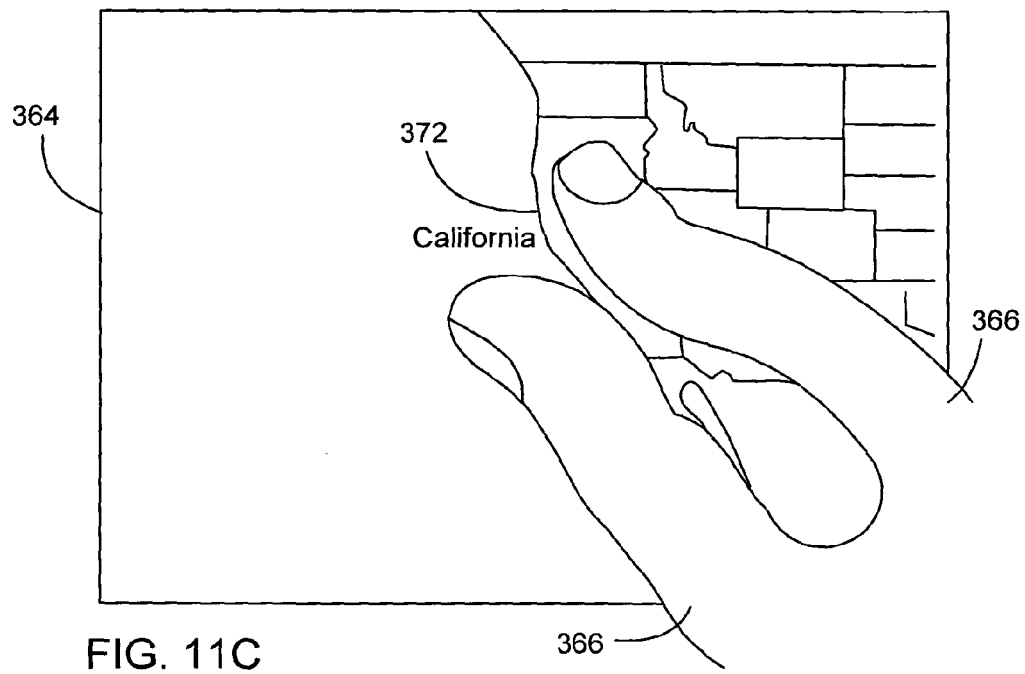
Figure 11D:
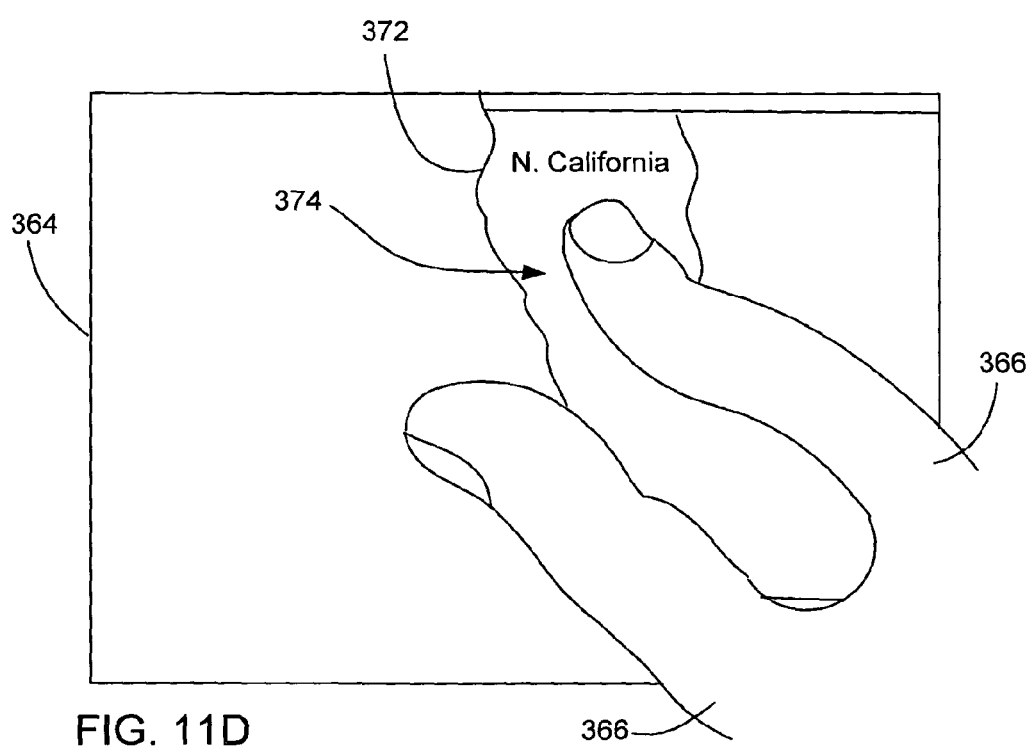
Figure 11E:
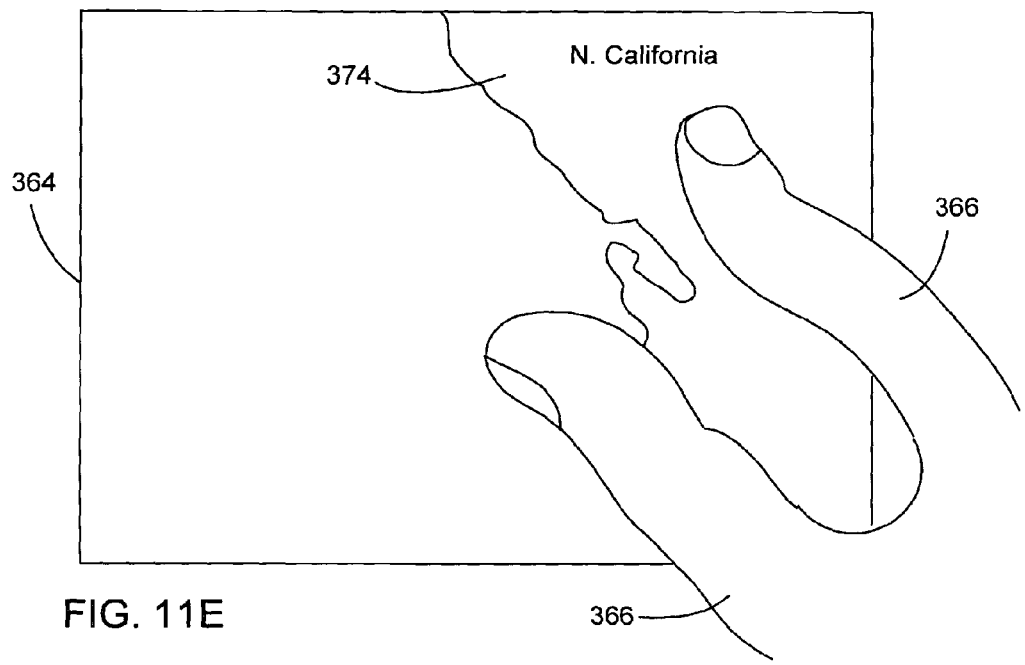
Figure 11F:
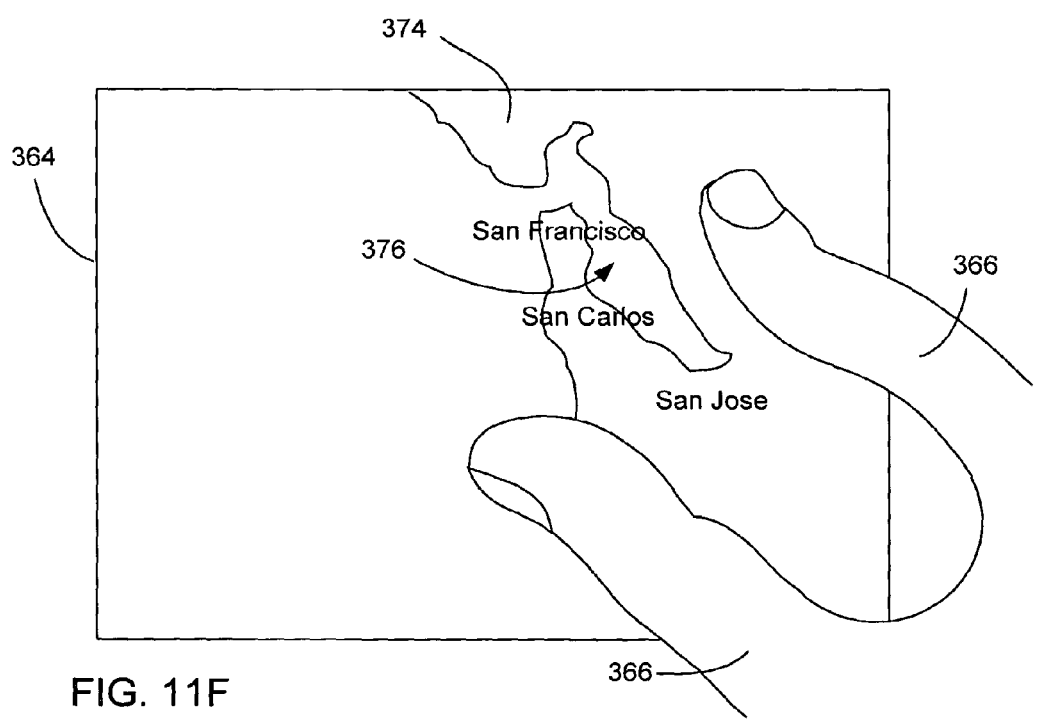
Figure 11G:
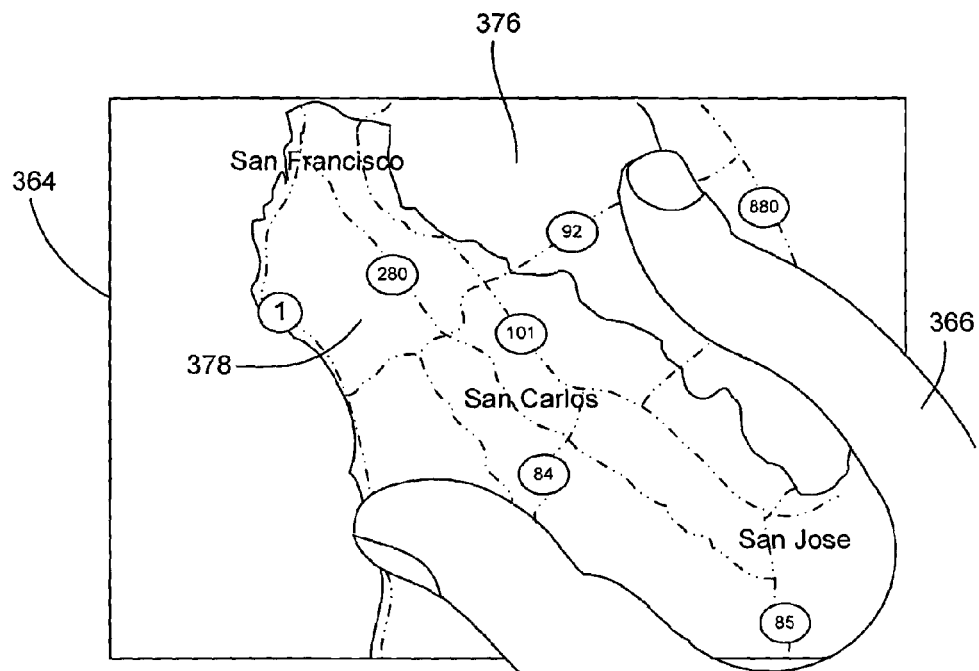
Figure 11H:
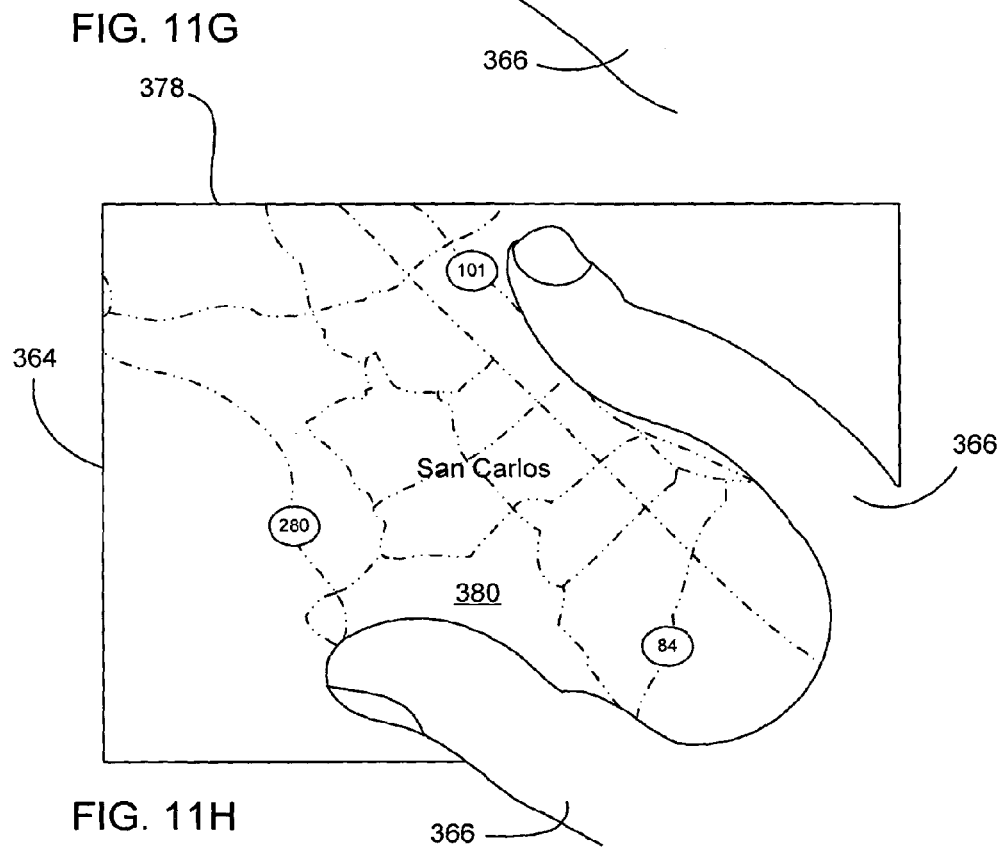

FIGS. 11A-11H illustrate a zooming sequence using the method described above. FIG. 11A illustrates a display presenting a GUI object 364 in the form of a map of North America with embedded levels which can be zoomed. In some cases, as shown, the GUI object is positioned inside a window that forms a boundary of the GUI object 364. FIG. 11B illustrates a user positioning their fingers 366 over a region of North America 368, particularly the United States 370 and more particularly California 372. In order to zoom in on California 372, the user starts to spread their fingers 366 apart as shown in FIG. 11C. As the fingers 366 spread apart further (distance increases), the map zooms in further on Northern California 374, then to a particular region of Northern California 374, then to the Bay area 376, then to the peninsula 378 (e.g., the area between San Francisco and San Jose Area), and then to the city of San Carlos 380 located between San Francisco and San Jose as illustrated in FIGS. 11D-11H. In order to zoom out of San Carlos 380 and back to North America 368, the fingers 366 are closed back together following the sequence described above, but in reverse.

Figure 12:
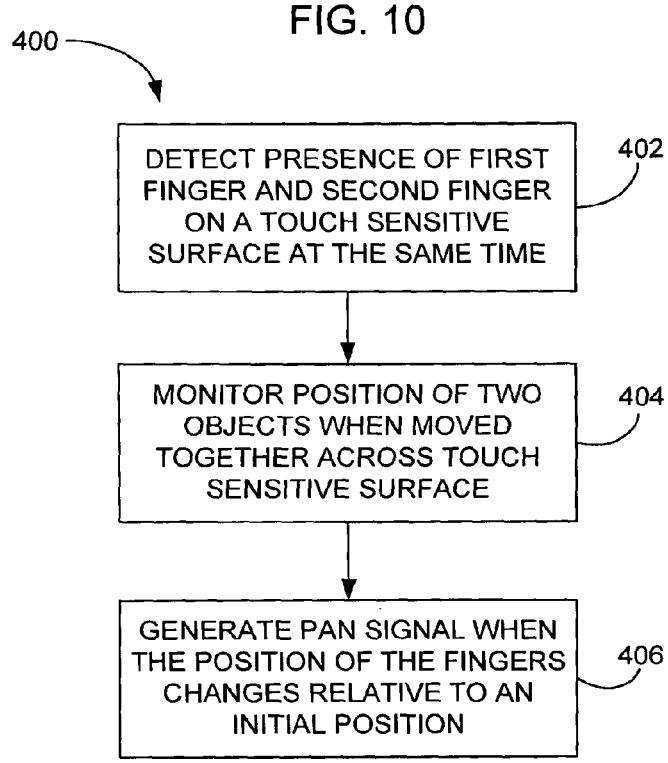
FIG. 12 is a diagram of a pan method, in accordance with one embodiment of the present invention.

FIG. 12 is a diagram of a pan method 400, in accordance with one embodiment of the present invention. The pan gesture may be performed on a multipoint touch screen. The pan method 400 generally begins at block 402 where the presence of at least a first object and a second object are detected on a touch sensitive surface at the same time. The presence of at least two fingers is configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch may be configured to operate whether two, three, four or more fingers are touching, and even if the numbers change during the gesture, i.e., only need a minimum of two fingers. Following block 402, the pan method 400 proceeds to block 404 where the position of the two objects when the objects are moved together across the touch screen is monitored. Following block 404, the pan method 400 proceeds to block 406 were a pan signal is generated when the position of the two objects changes relative to an initial position. In most cases, the set down of the fingers will associate or lock the fingers to a particular GUI object displayed on the touch screen. Typically, when at least one of the fingers is positioned over the image on the GUI object. As a result, when the fingers are moved together across the touch screen, the pan signal can be used to translate the image in the direction of the fingers. In most cases, the amount of panning varies according to the distance the two objects move. Furthermore, the panning typically can occur substantially simultaneously with the motion of the objects. For instance, as the fingers move, the object moves with the fingers at the same time.

Figure 13A:
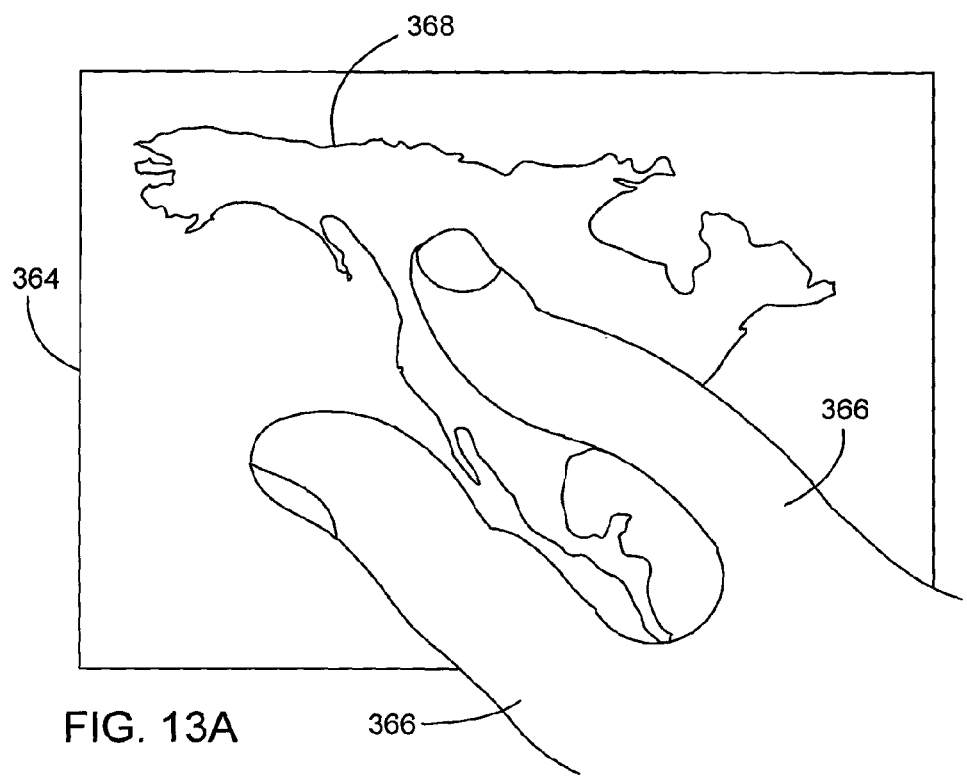
FIGS. 13A-13D illustrate a panning sequence, in accordance with one embodiment of the present invention.
Figure 13B:
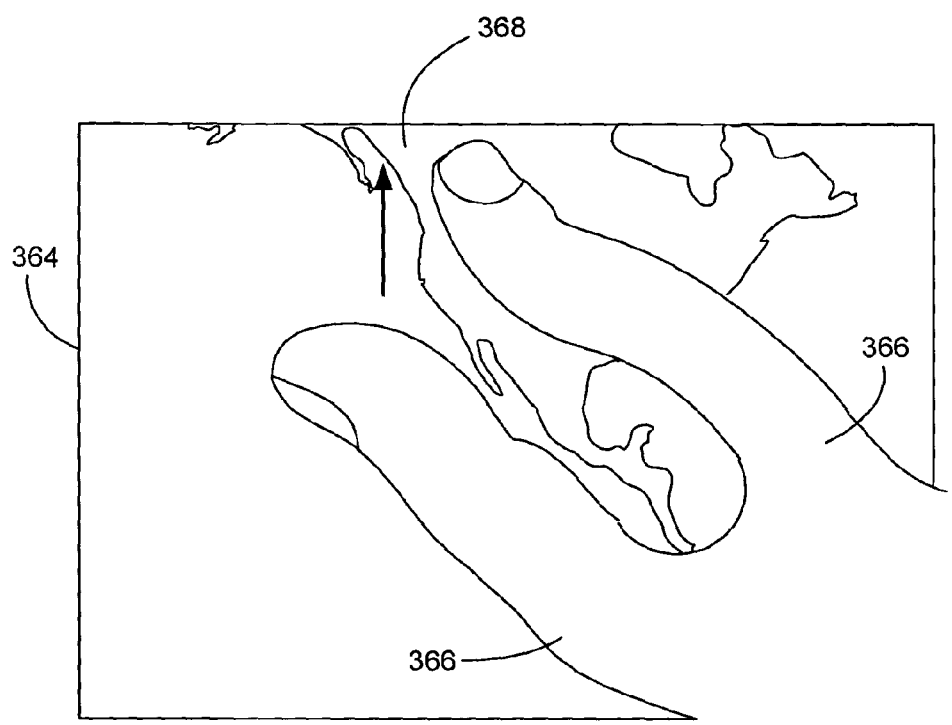
Figure 13C:
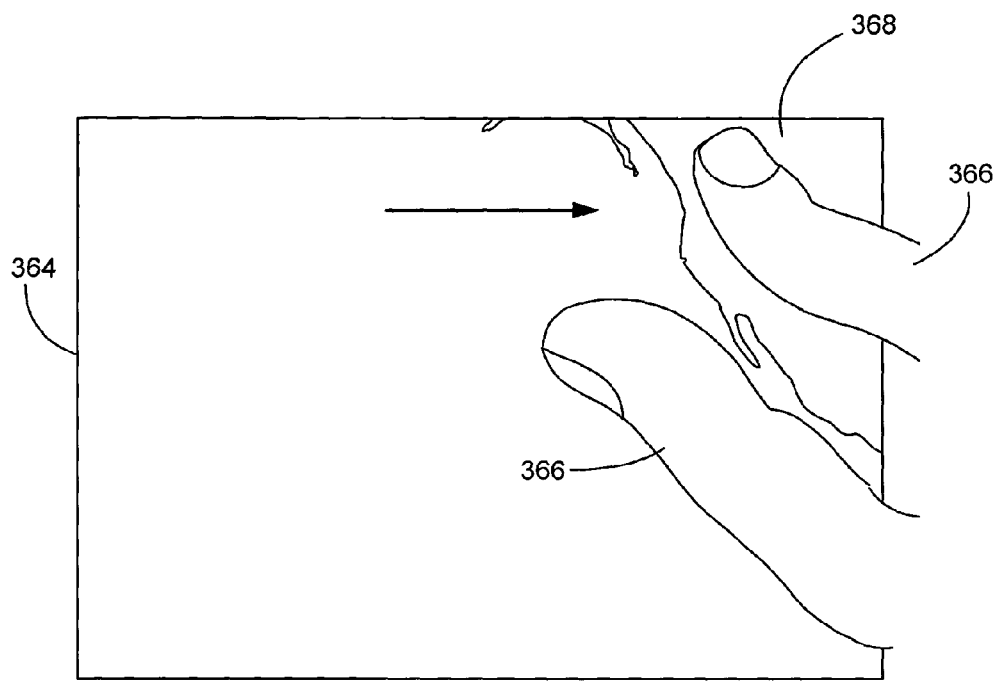
Figure 13D:
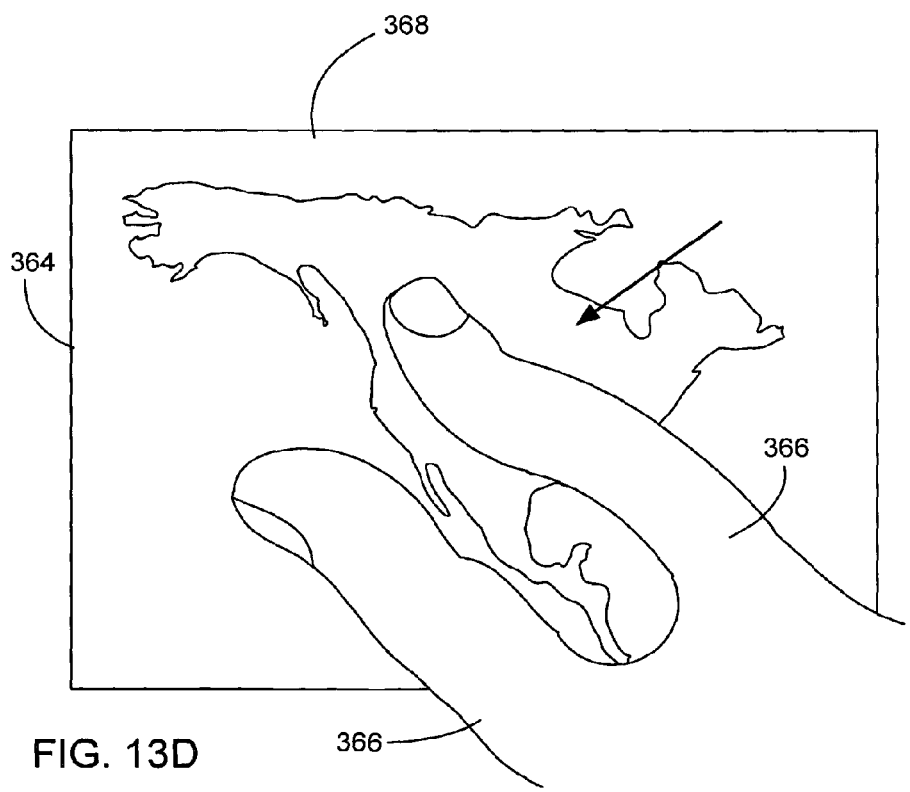

FIGS. 13A-13D illustrate a panning sequence based on the pan method 400 described above. Using the map of FIG. 11, FIG. 13A illustrates a user positioning their fingers 366 over the map. Upon set down, the fingers 366 are locked to the map. As shown in FIG. 13B, when the fingers 366 are moved vertically up, the entire map 364 is moved up thereby causing previously seen portions of map 364 to be placed outside the viewing area and unseen portions of the map 364 to be placed inside the viewing area. As shown in FIG. 13C, when the fingers 366 are moved horizontally sideways, the entire map 364 is moved sideways thereby causing previously seen portions of map 364 to be placed outside the vowing area and unseen portions of the map to be placed inside the viewing area. As shown in FIG. 13D, when the fingers 366 are moved diagonally, the entire map 364 is moved diagonally thereby causing previously seen portions of map 364 to be placed outside the viewing area and unseen portions of the map to be placed inside the viewing area. As should be appreciated, the motion of the map 364 follows the motion of the fingers 366. This process is similar to sliding a piece of paper along a table. The pressure the fingers exert on the paper locks the paper to the fingers and when the fingers are slid across the table, the piece of paper moves with them.

Figure 14:
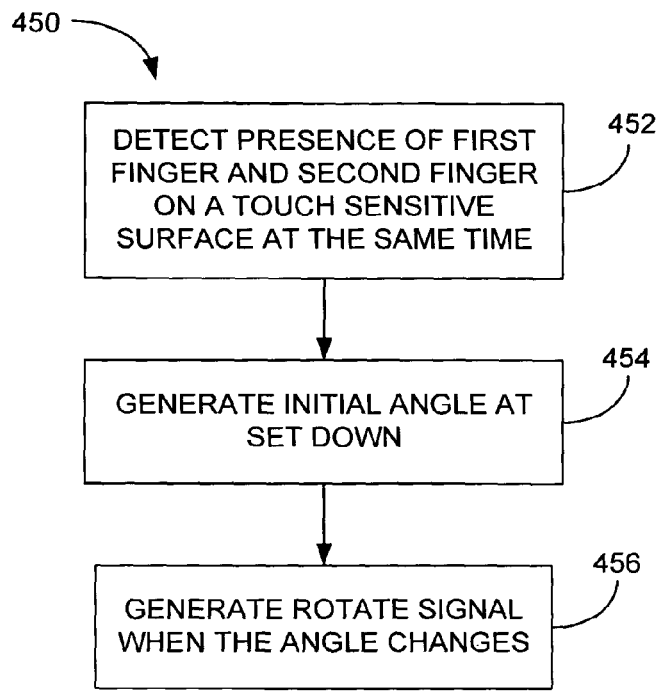
FIG. 14 is a diagram of a rotate method, in accordance with one embodiment of the present invention.

FIG. 14 is a diagram of a rotate method 450, in accordance with one embodiment of the present invention. The rotate gesture may be performed on a multipoint touch screen. The rotate method 450 generally begins at block 452 where the presence of a first object and a second object are detected at the same time. The presence of at least two fingers is configured to indicate that the touch is a gestural touch rather than a tracking touch based on one finger. In some cases, the presence of only two fingers indicates that the touch is a gestural touch. In other cases, any number of more than two fingers indicates that the touch is a gestural touch. In fact, the gestural touch may be configured to operate whether two, three, four or more fingers are touching, and even if the numbers change during the gesture, i.e., only need a minimum of two fingers.

Following block 452, the rotate method 450 proceeds to block 454 where the angle of each of the finger is set. The angles are typically determined relative to a reference point. Following block 454, rotate method 450 proceeds to block 456 where a rotate signal is generated when the angle of at least one of the objects changes relative to the reference point. In most cases, the set down of the fingers will associate or lock the fingers to a particular GUI object displayed on the touch screen. Typically, when at least one of the fingers is positioned over the image on the GUI object, the GUI object will be associated with or locked to the fingers. As a result, when the fingers are rotated, the rotate signal can be used to rotate the object in the direction of finger rotation (e.g., clockwise, counterclockwise). In most cases, the amount of object rotation varies according to the amount of finger rotation, i.e., if the fingers move 5 degrees then so will the object. Furthermore, the rotation typically can occur substantially simultaneously with the motion of the fingers. For instance, as the fingers rotate, the object rotates with the fingers at the same time.

Figure 15A:
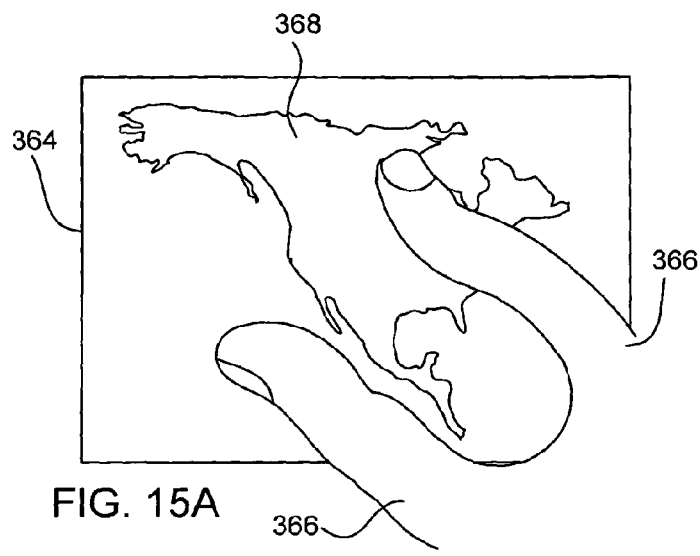
FIGS. 15A-15C illustrate a rotating sequence, in accordance with one embodiment of the present invention.
Figure 15B:
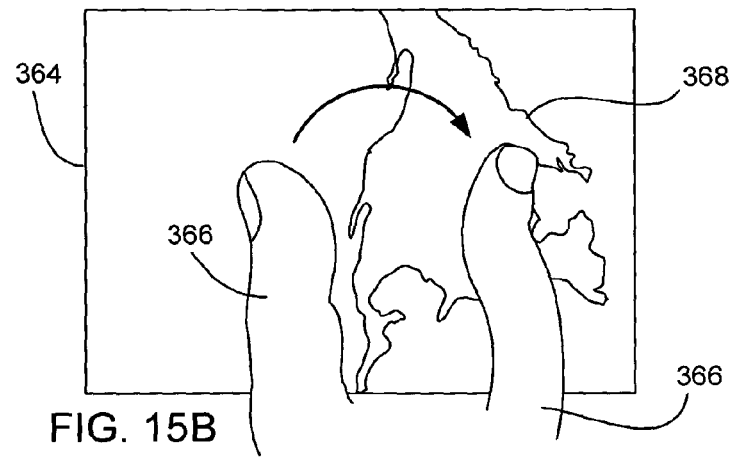
Figure 15C:
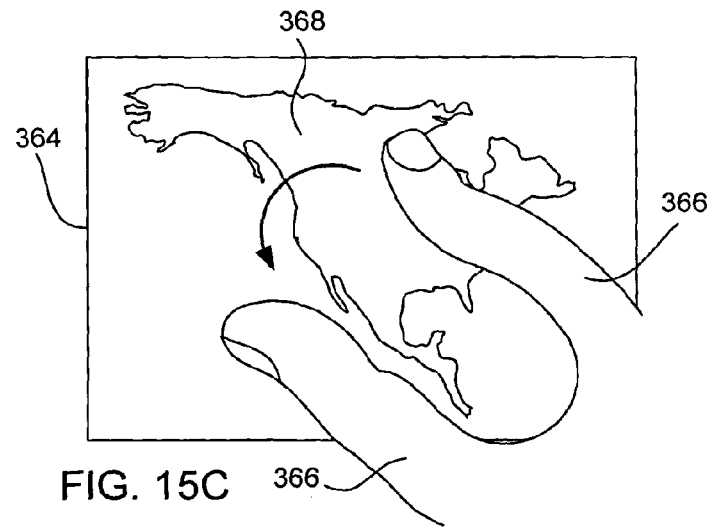

FIGS. 15A-15C illustrate a rotating sequence based on the method described above. Using the map of FIG. 11, FIG. 15A illustrates a user positioning their fingers 366 over the map 364. Upon set down, the fingers 366 are locked to the map 364. As shown in FIG. 15B, when the fingers 366 are rotated in a clockwise direction, the entire map 364 is rotated in the clockwise direction in accordance with the rotating fingers 366. As shown in FIG. 15C, when the fingers 366 are rotated in a counterclockwise direction, the entire map 364 is rotated in the counter clockwise direction in accordance with the rotating fingers 366.

It should be noted that the methods described in FIGS. 10-15 can be implemented during the same gestural stroke. That is, zooming, rotating and panning can all be performed during the gestural stroke, which may include spreading, rotating and sliding fingers. For example, upon set down with at least two fingers, the displayed object (map) is associated or locked to the two fingers. In order to zoom, the user can spread or close their fingers. In order to rotate, the user can rotate their fingers. In order to pan, the user can slid their fingers. Each of these actions can occur simultaneously in a continuous motion. For example, the user can spread and close their fingers while rotating and sliding them across the touch screen. Alternatively, the user can segment each of these motions without having to reset the gestural stroke. For example, the user can first spread their fingers, then rotate their fingers, then close their fingers, then slide their fingers and so on.

Figure 16:
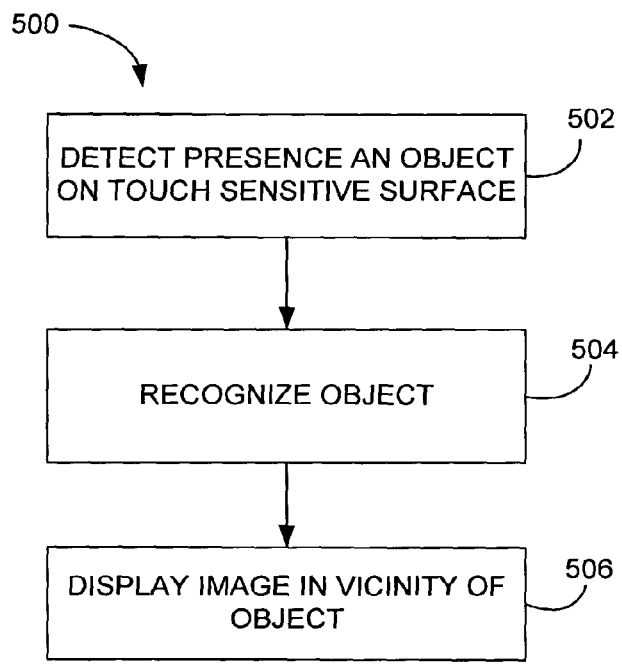
FIG. 16 is a diagram of a GUI operational method, in accordance with one embodiment of the present invention.

FIG. 16 is a diagram of a GUI operational method 500, in accordance with one embodiment of the present invention. The GUI operational method 500 is configured for initiating floating controls in a GUI. The GUI operational method 500 generally begins at block 502 where the presence of an object such as a finger or thumb is detected. This may for example be accomplished using a touch screen. Following block 502, the GUI operational method 500 proceeds to block 504 where the object is recognized (the identity of the object is found). The object may be recognized among a plurality of objects. For example, see block 104 of FIG. 2 above.

Following block 504, the GUI operational method 500 proceeds to block 506 where an image in the vicinity of the object is generated. The image is typically based on the recognized object. The image may include windows, fields, dialog boxes, menus, icons, buttons, cursors, scroll bars, etc.

In some cases, the user can select and activate the image (or features embedded therein) in order to initiate functions and tasks. By way of example, the image may be a user interface element or a group of user interface elements (e.g., one or more buttons that open, close, minimize, or maximize a window). The image may also be one or more icons that launch a particular program or files that open when selected. The image may additionally correspond to non interactive text and graphics. In most cases, the image is displayed as long as the object is detected or it may be displayed for some preset amount of time, i.e., after a period of time it times out and is removed.

In one particular embodiment, the image includes one or more control options that can be selected by the user. The control options may include one or more control buttons for implementing various tasks. For example, the control option box may include music listening control buttons as for example, play, pause, seek and menu.

Figure 17E:
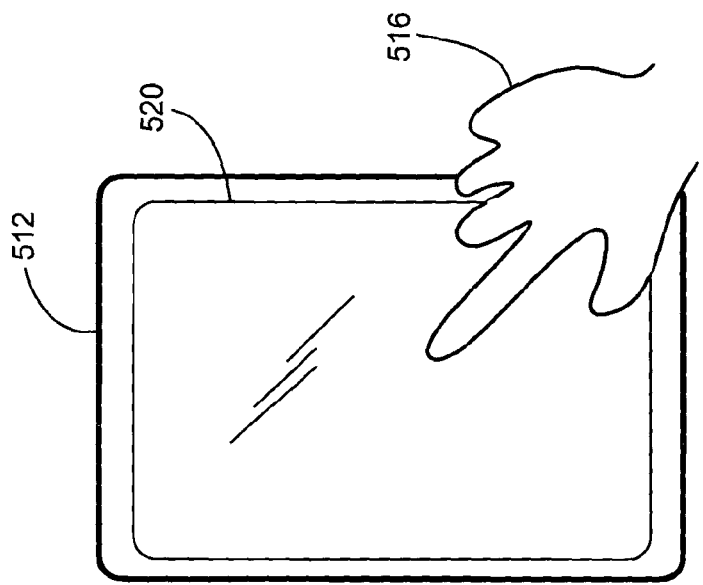
Figure 17D:
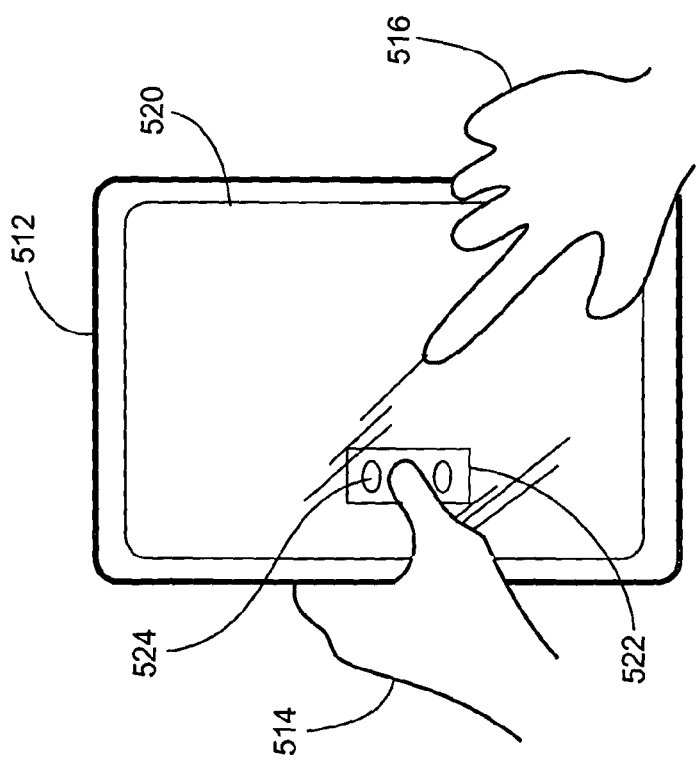

FIGS. 17A-17E illustrate a floating control sequence using the method described above. As shown in FIG. 17A, a user 510 is using a tablet PC 512 and therefore is holding the tablet PC 512 with one hand 514 while navigating (e.g., tracking, gesturing) with the other hand 516. As shown in FIG. 17B, which is a close up of the user holding the tablet PC 512, a portion of the thumb of the holding hand 514 is positioned over the touch screen 520. As shown in FIG. 17C, the tablet PC 512 recognizes the thumb and displays a control box 522 adjacent the thumb. The control box 522 includes various buttons 524, which can be selected by the user's thumb to initiate tasks in the tablet PC 512. As shown in FIG. 17D, while holding the tablet PC 512, the thumb is extended over one of the buttons 524 and subsequently tapped thereby selecting the task associated with the button 524. By way of example, the task may be associated with launching a program or gaining access to a network or changing the mode of operation of the device. The control box 522 and buttons 524 may be used to change the input mode of the touch screen 520 so that, for example, the identical gesture made with the fingers of the user's other hand may have multiple meanings depending on which of buttons 524 is selected. As shown in FIG. 17E, when the thumb is moved away from the touch screen 520, the control box 522 may time out and disappear. Alternatively, the control box may be closed using conventional close icons or buttons.

Figure 18:
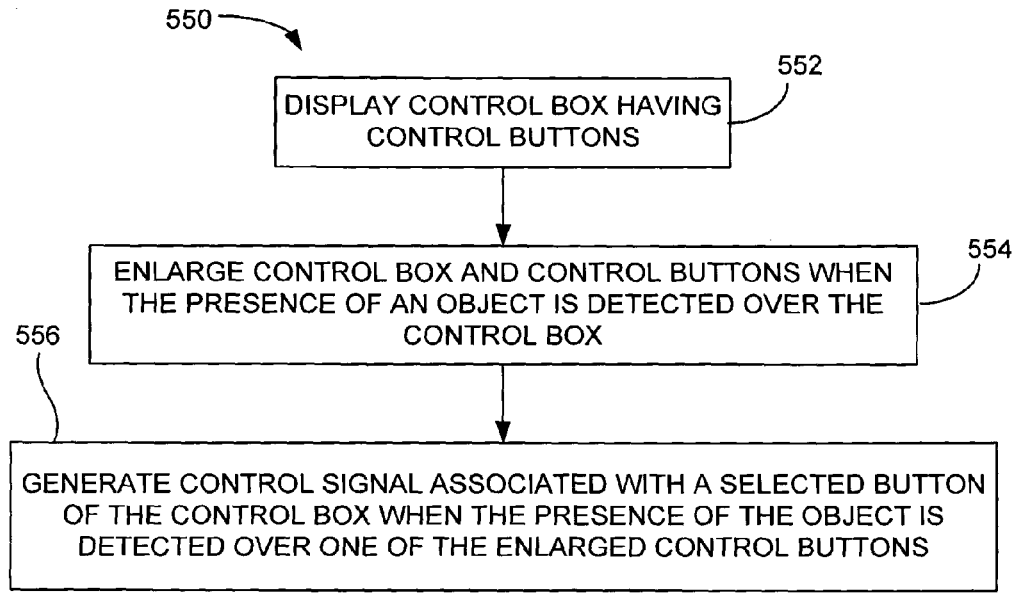
FIG. 18 is a diagram of a GUI operational method, in accordance with one embodiment of the present invention.

FIG. 18 is a diagram of a GUI operational method 550, in accordance with one embodiment of the present invention. The GUI operational method 550 is configured for initiating zooming targets. The GUI operational method 550 generally begins at block 552 where a control box GUI element is displayed. The control box contains one or more control buttons, which are somewhat close together, and which can be used to perform actions. The control box may, for example, include control buttons such as maximize, minimize, close, and the like. Following block 552, the GUI operational method 550 proceeds to block 554 where the control box is enlarged, or at least one of the control buttons is enlarged for a period of time when the presence of an object over the control box or one of the control buttons is detected. In the case where the control box is enlarged each of the control buttons is enlarged thereby making selection thereof much easier. In the case where only the control button is enlarged, the user would decide whether this is the correct button and if so select the enlarged control button, or restart the process so that the appropriate control button is presented. In most cases, the size of the control buttons corresponds to the size of the finger so that they may be easily selected by the object. Following block 554, the GUI operational method 550 proceeds to block 556 where a control signal associated with the selected control button is generated when the presence of the object over one of the enlarged control buttons is detected.

Figure 19A:
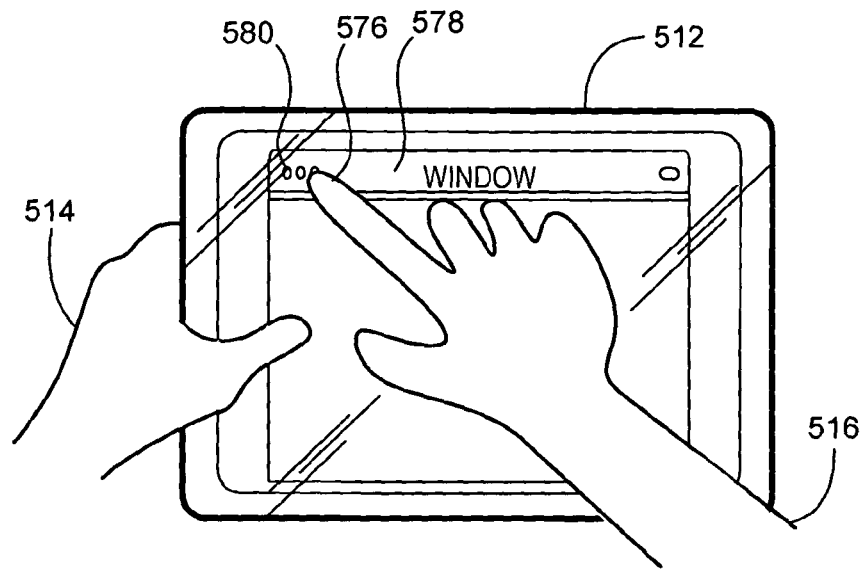
FIGS. 19A-19D illustrate a zooming target sequence, in accordance with one embodiment of the present invention.
Figure 19B:
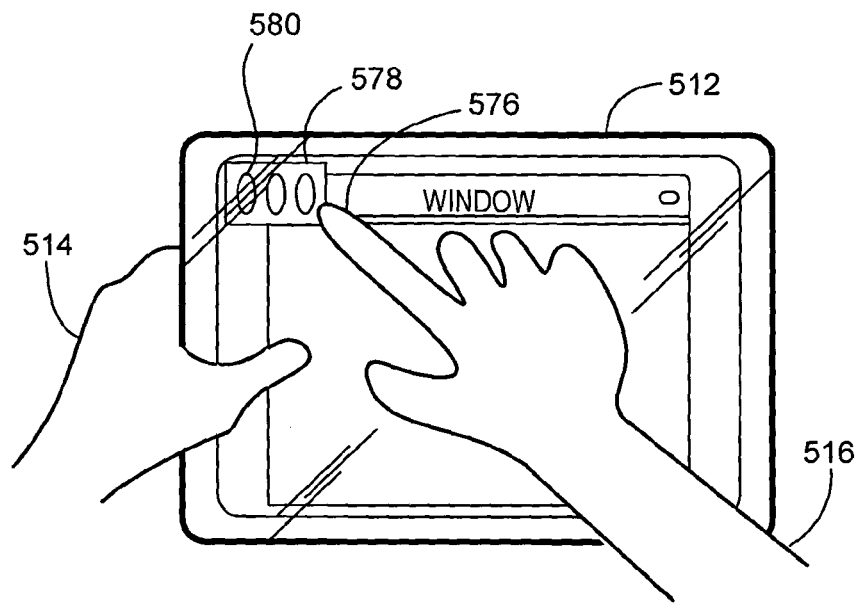
Figure 19C:
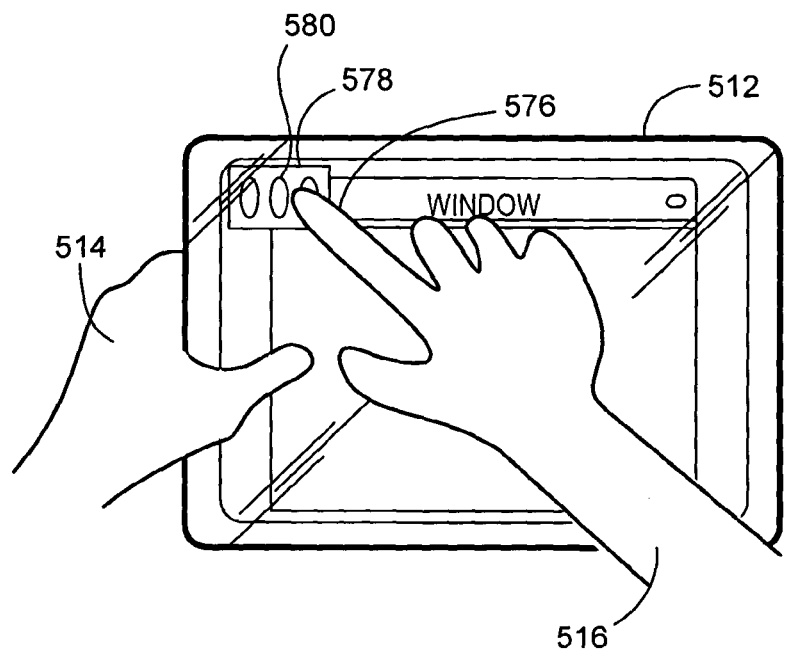
Figure 19D:
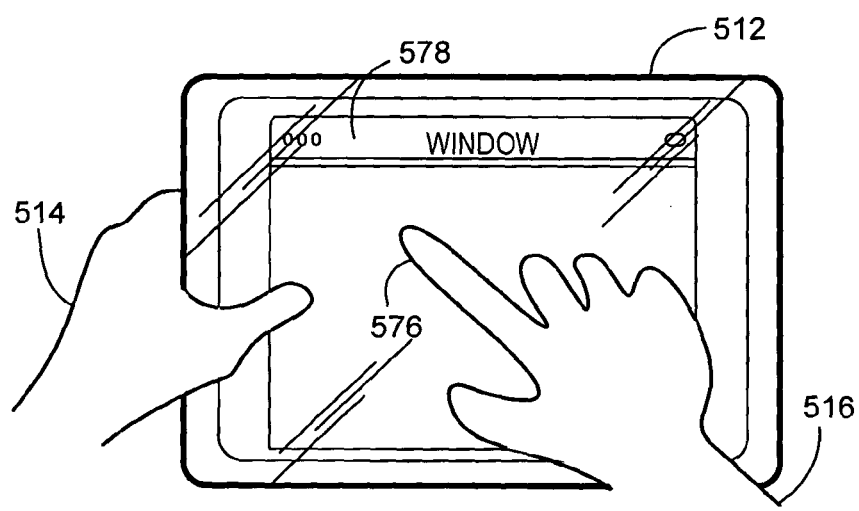

FIGS. 19A-19D illustrate a zooming target sequence using the GUI operational method 550 described above. As shown in FIG. 19A, a user 510 places their finger 576 over a control box 578. Because the buttons 580 of the control box 578 included therein are smaller than the finger 576 and located close together, it is difficult for the user 510 to make a selection directly without possibly pressing an undesirable button 580, e.g., a button adjacent the desired button. By way of example, the finger 576 may cover two or more of the buttons 580. As shown in FIG. 19B, at least a portion of the control box 578 is enlarged including the buttons 580 included therein when the user places their thumb over the control box. As shown in FIG. 19C, once the control box has reached its enlarged state, the user can select one of the enlarged buttons, which is now closer to the size of the thumb. By way of example, the user may tap on the desired control button. As shown in FIG. 19D, the control box reduces to its initial size after the button is selected or after a predetermined time period in which no selection was made (e.g., times out) or when the user moves their finger away from the control box.

Figure 20:
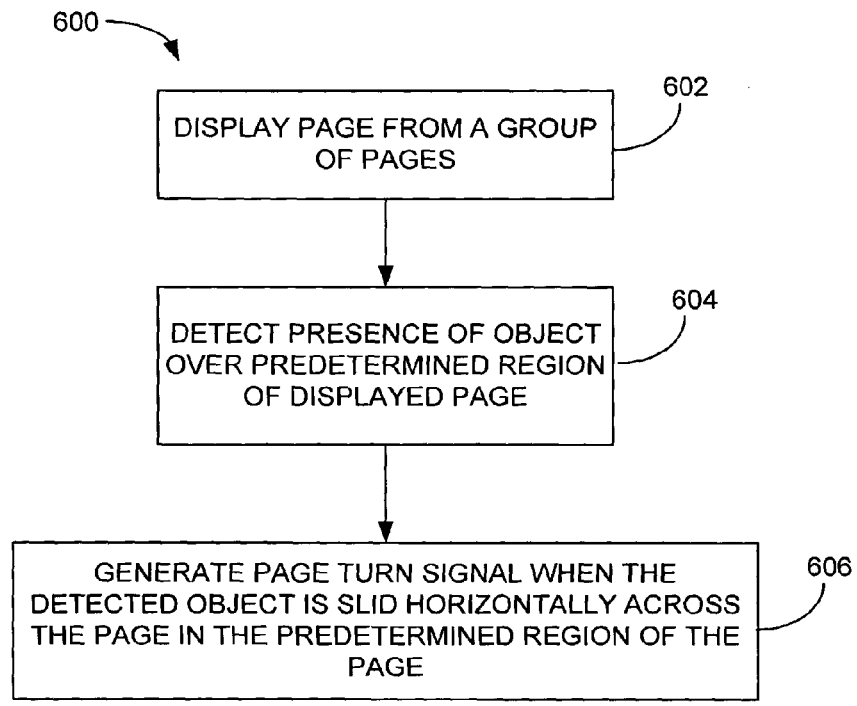
FIG. 20 is a diagram of a GUI operational method, in accordance with one embodiment of the present invention.

FIG. 20 is a diagram of a GUI operational method 600, in accordance with one embodiment of the present invention. The GUI operational method 600 is configured for initiating a page turn. The GUI operational method 600 generally begins at block 602 where a page from a multitude of pages is displayed in a GUI. By way of example, the pages may be associated with an electronic book. Following block 602, the GUI operational method 600 proceeds to block 604 where the presence of an object (or objects) in a predetermined region over the page is detected. The predetermined area may, for example, correspond to the area where the page number is displayed. Following block 604, the GUI operational method 600 proceeds to block 606 where a page turn signal is generated when the object (or objects) is translated in the predetermined region. The translation is configured to simulate a finger turning the page in an actual paper bound book. The direction of the translation indicates whether to go to the next page or previous page in the list of pages. For example, if the finger is swiped right to left, then a page back signal is generated, and if the finger is swiped left to right, then a page up signal is generated. This GUI operational method 600 may be enhanced several ways. For instance, if multiple fingers are swiped, then this may create a paging signal greater than one page. For example, a two finger swipe equals two page turns, three finger swipe equals three page turns, etc. Or a two finger swipe equals ten page turns, three finger swipe equals 50 page turns, etc.

FIGS. 21A-21D illustrate a page turning sequence using the GUI operational method 600 described above. As shown in FIG. 21A, which is a close up of a user 510 holding the tablet PC 512, the user swipes their finger over the page number in a direction to the left of the page 630. As shown in FIG. 21B, the tablet PC 512 recognizes the swipe and direction of the swipe in the area of the page number and therefore the tablet PC 512 displays the next page in a group of pages. This can be performed repeatedly to whisk through the group of pages. As shown in FIG. 21C, the user swipes their finger 576 over the page number in a direction to the right of the page 630. As shown in FIG. 21D, the tablet PC 512 recognizes the swipe and direction of the swipe in the area of the page number and therefore the tablet PC 512 displays the previous page in a group of pages. This can be performed repeatedly to whisk through the group of pages.

Figure 22:
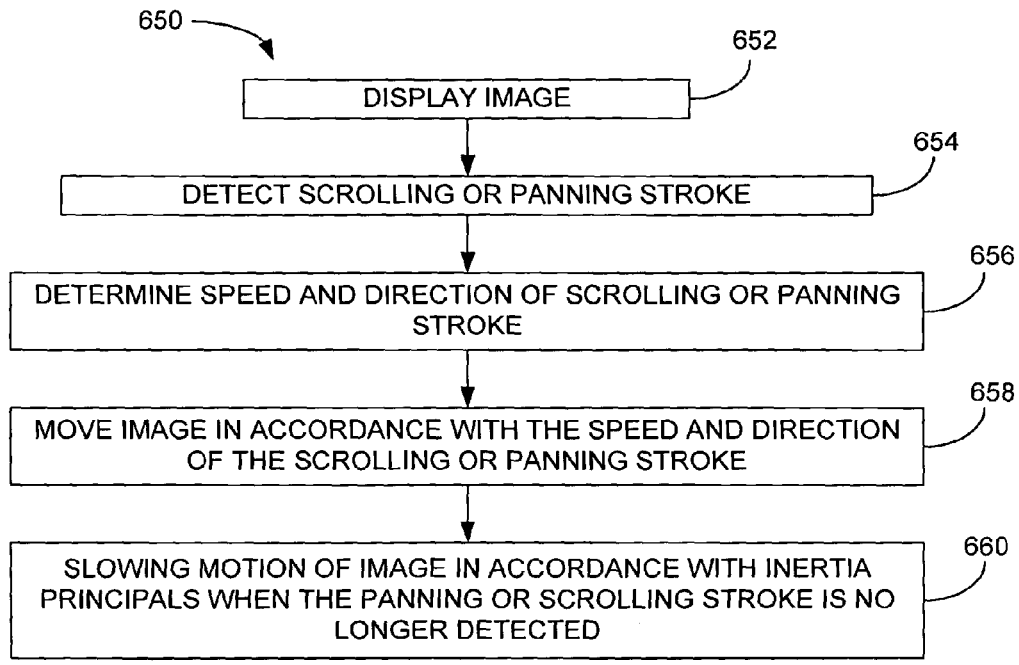
FIG. 22 is a diagram of a GUI operational method, in accordance with one embodiment of the present invention.

FIG. 22 is a diagram of a GUI operational method 650, in accordance with one embodiment of the present invention. The GUI operational method 650 is configured for initiating inertia typically during a scrolling or panning operation. Inertia is generally defined as the tendency of a body at rest to remain at rest or of a body in motion to stay in motion in a straight line unless disturbed by an external force. In this particular embodiment, the GUI or some portion thereof is associated with inertial properties, which is its resistance to rate of change in motion. For a GUI with high inertia characteristics, the acceleration of the GUI will be small for a given input. On the other hand, if the GUI has low inertia characteristics, the acceleration will be large for a given input.

The GUI operational method 650 generally begins at block 652 where a graphical image is displayed on a GUI. Following block 652, the GUI operational method 650 proceeds to block 654 where a scrolling or panning stroke on a touch sensitive surface is detected. By way of example, the stroke may be a linear or rotational stroke. During a linear stroke, the direction of scrolling or panning typically follows the direction of the stroke. During a rotational stroke (see FIG. 6), the rotational stroke is typically converted to a linear input where clockwise motion may correspond to vertical up and counterclockwise motion may correspond to vertical down. Following block 654 the process flow proceeds to block 656 where the speed and direction of the scrolling or panning stroke is determined. Following block 656, the GUI operational method 650 proceeds to block 658 where the image is moved in accordance with the speed and direction of the scrolling or panning stroke as well as the associated inertial characteristics. Following block 658, the GUI operational method 650 proceeds to block 660 where the motion of the image continues even when the panning or scrolling stroke is no longer detected. For example, when the user picks up their finger from the touch sensitive surface, the scrolling or panning function continues as if the scrolling or panning stroke was still being made. In some cases, the motion of the image continues infinitely until some braking (stopping or slowing) control is performed. This particular methodology simulates zero gravity. In other cases, the motion of the image is slowed in accordance with the associated inertia GUI operational method 650. Metaphorically speaking, the image may correspond to a piece of paper moving over a desktop. In order to move the piece of paper, the user exerts a force on the paper in the desired direction. When the user lifts their finger off the paper, the paper will continue to slid along the desktop in the desired direction for some period of time. The amount it slides after lifting the finger generally depends on, among other things, its mass, the force applied by the finger, the friction force found between the paper and the desktop, etc. As should be appreciated, traditionally when scrolling and panning are implemented, the scrolling or panning stops when the fingers are picked up. In contrast, using the above mentioned methodology, the scrolling or panning continues to move when the fingers are picked up.

The GUI operational method 650 may additionally include blocks A and B. In block A, an object such as a finger is detected on the touch sensitive surface when the image is moving without the assistance of the object (block 660). In block B, the motion of the image is stopped when the object is detected, i.e., the new touch serves as a braking means. Using the metaphor above, while the piece of paper is sliding across the desktop, the user presses their finger on the paper thereby stopping its motion.

Figure 23A:
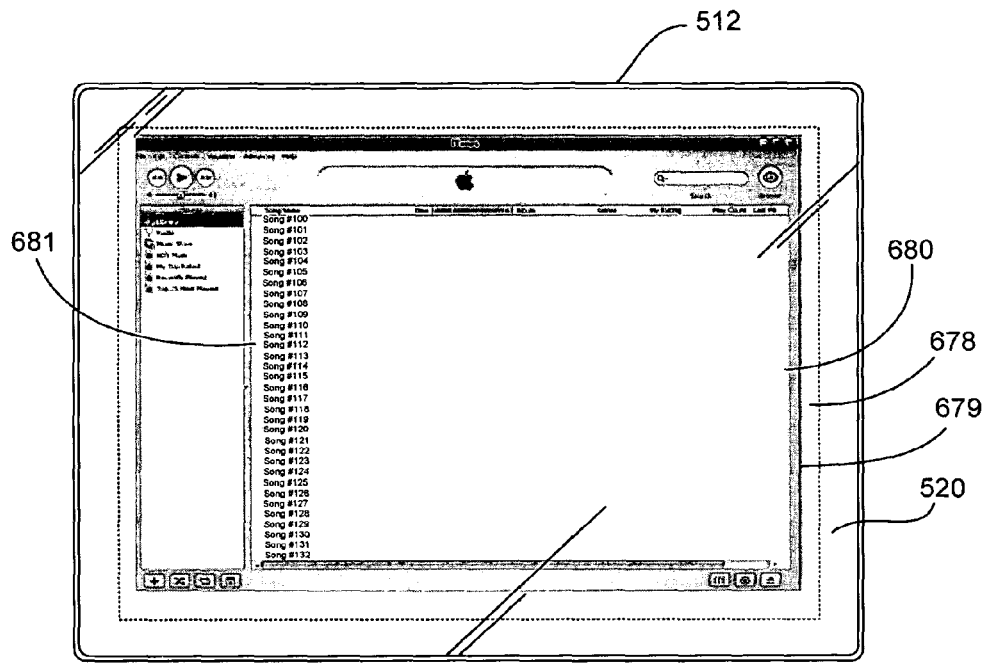
FIGS. 23A-23D illustrate an inertia sequence, in accordance with one embodiment of the present invention.
Figure 23B:
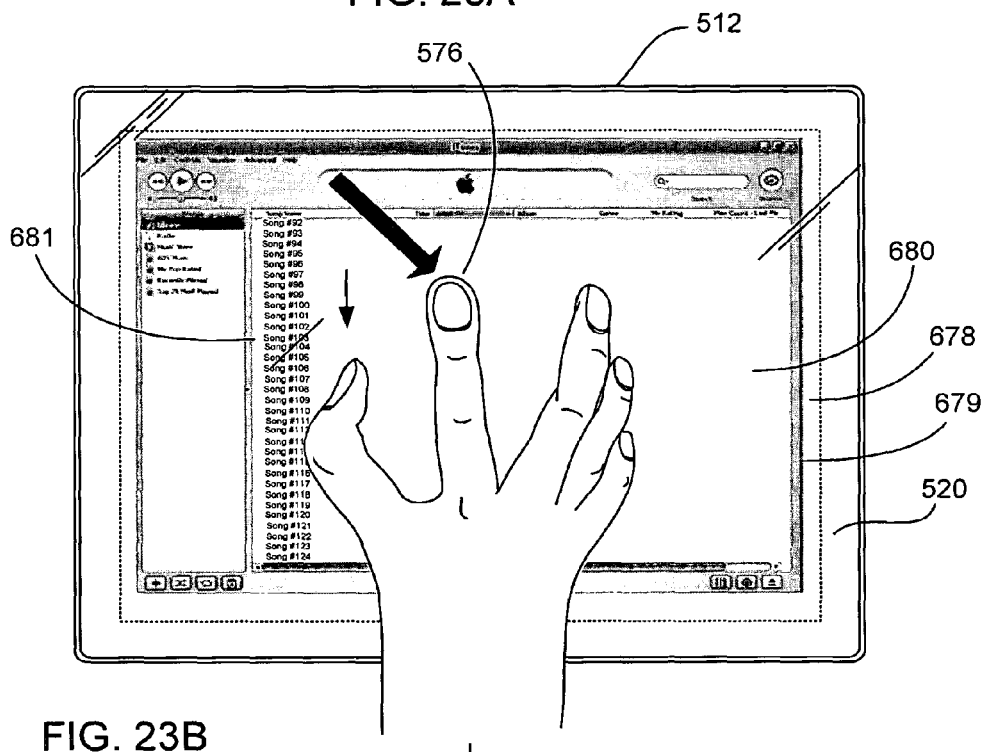

FIGS. 23A-23D illustrate an inertia sequence using the method described above. FIG. 23A illustrates a display presenting a GUI 678 including a window 679 having a list 680 of media items 681. The window 679 and list 680 may for example correspond to a control window and music list found in iTunes® manufactured by Apple Computer, Inc of Cupertino, Calif. As shown in FIG. 23B, when the user slides their finger or fingers 576 over the touch screen 520, vertical scrolling, which moves media items up or down through the window, is implemented. The direction of scrolling may follow the same direction as finger movement (as shown), or it may go in the reverse direction. In one particular embodiment, a single finger is used for selecting the media items from the list, and two fingers are used to scroll through the list.

Scrolling generally pertains to moving displayed data or images (e.g., media items 681) across a viewing area on a display screen so that a new set of data (e.g., media items 681) is brought into view in the viewing area. In most cases, once the viewing area is full, each new set of data appears at the edge of the viewing area and all other sets of data move over one position. That is, the new set of data appears for each set of data that moves out of the viewing area. In essence, these functions allow a user to view consecutive sets of data currently outside of the viewing area. In most cases, the user is able to accelerate their traversal through the data sets by moving his or her finger at greater speeds. Examples of scrolling through lists can be found in U.S. Patent Publication Nos.: 2003/0076303A1, 2003/0076301A1, 2003/0095096A1, which are herein incorporated by reference.

Figure 23C:
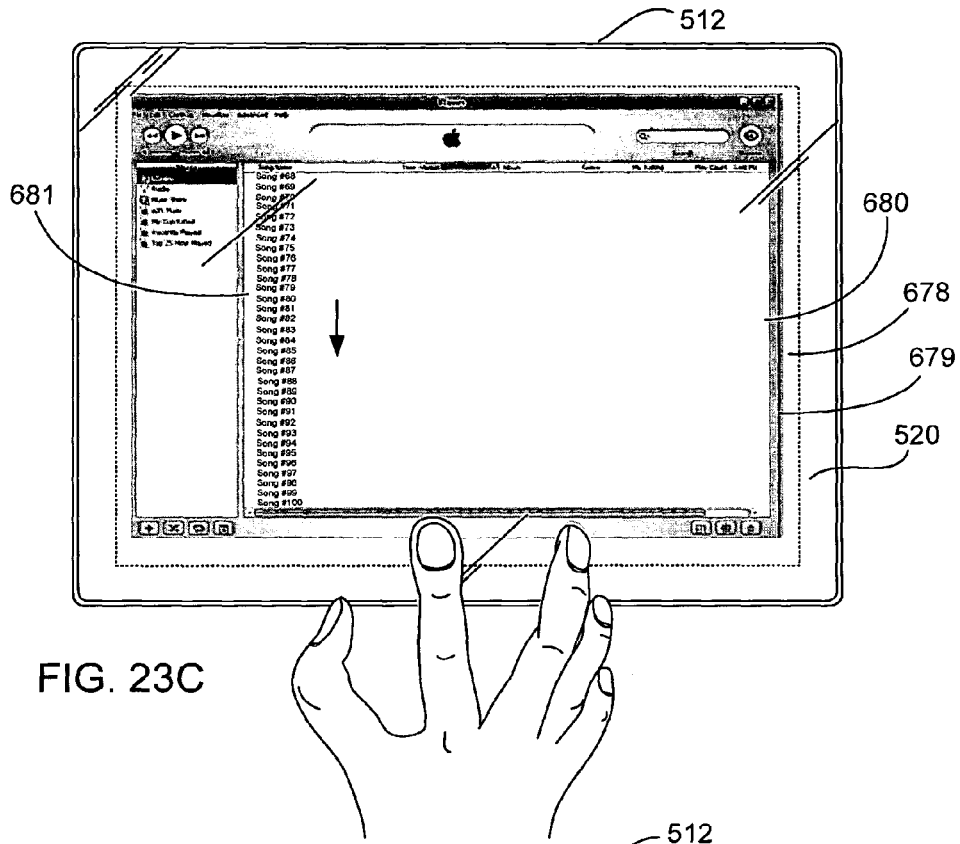
Figure 23D:
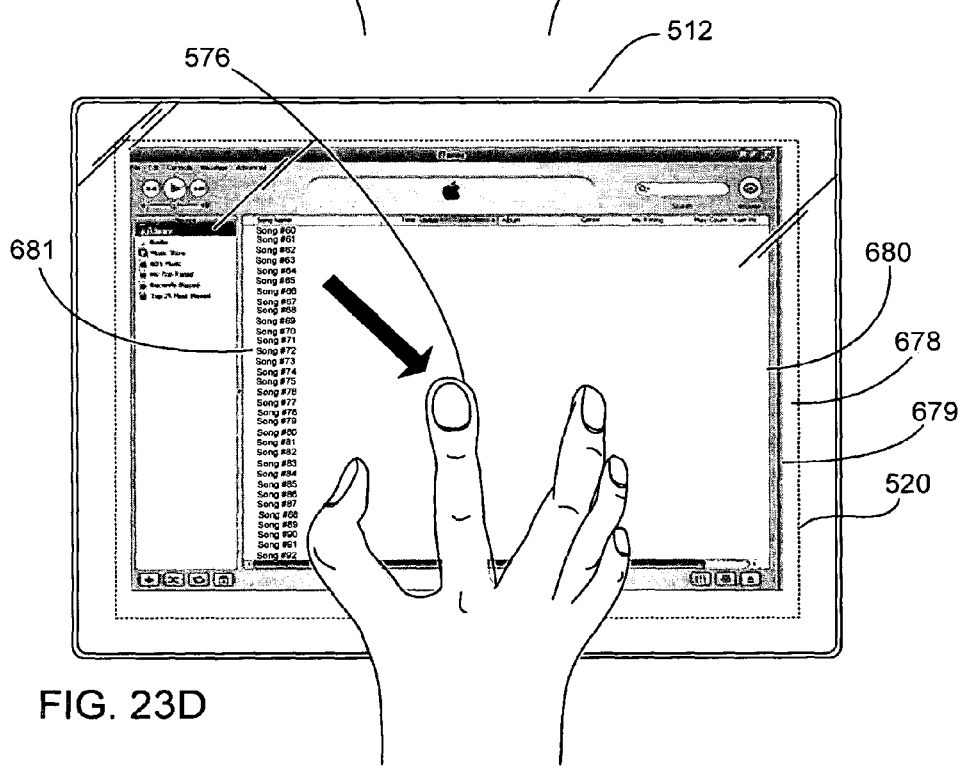

As shown in FIG. 23C, the displayed data continues to move even when the finger is removed from the touch screen. The continuous motion is based at least in part on the previous motion. For example the scrolling may be continued in the same direction and speed. In some cases, the scrolling slow down over time, i.e., the speed of the traversal through the media items gets slower and slower until the scrolling eventually stops thereby leaving a static list. By way of example, each new media item brought into the viewing area may incrementally decrease the speed. Alternatively or additionally, as shown in FIG. 23D, the displayed data stops moving when the finger 576 is placed back on the touch screen 520. That is, the placement of the finger back on the touch screen can implement braking, which stops or slows down the continuous acting motion. Although this sequence is directed at vertical scrolling it should be noted that this is not a limitation and that horizontal scrolling as well as panning may be performed using the methods described above.

Figure 24:
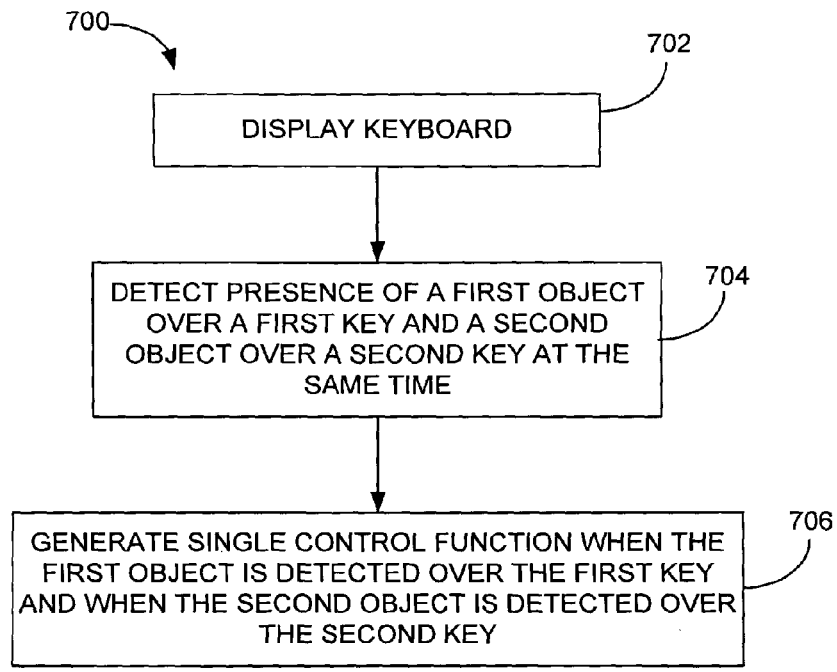
FIG. 24 is a diagram of a GUI operational method, in accordance with one embodiment of the present invention.

FIG. 24 is a diagram of a GUI operational method 700, in accordance with one embodiment of the present invention. The method 700 is configured for simulating a keyboard. The method generally begins at block 702 where a keyboard is presented on the display. Following block 702, the process flow proceeds to block 704 where the presence of a first object over a first key and a second object over a second key at the same time is detected on a touch screen. The touch screen is positioned over or in front of the display. By way of example, the display may be an LCD and the touch screen may be a multipoint touch screen. Following block 704, the process flow proceeds to block 706 where one or more simultaneous control signals are generated when the first object is detected over the first key and when the second object is detected over the second key at the same time.

In one embodiment, only a single control signal is generated when the first object is detected over the first key and when the second object is detected over the second key at the same time. By way of example, the first key may be a shift key and the second key may be a symbol key (e.g., letters, numbers). In this manner, the keyboard acts like a traditional keyboard, i.e., the user is allowed to select multiple keys at the same time in order to change the symbol, i.e., lower/upper case. The keys may also correspond to the control key, alt key, escape key, function key, and the like.

In another embodiment, a control signal is generated for each actuated key (key touch) that occurs at the same time. For example, groups of characters can be typed at the same time. In some cases, the application running behind the keyboard may be configured to determine the order of the characters based on some predetermined criteria. For example, although the characters may be jumbled, the application can determine that the correct order of characters based on spelling, usage, context, and the like.

Although only two keys are described, it should be noted that two keys is not a limitation and that more than two keys may be actuated simultaneously to produce one or more control signals. For example, control-alt-delete functionality may be implemented or larger groups of characters can be typed at the same time.

Figure 25A:
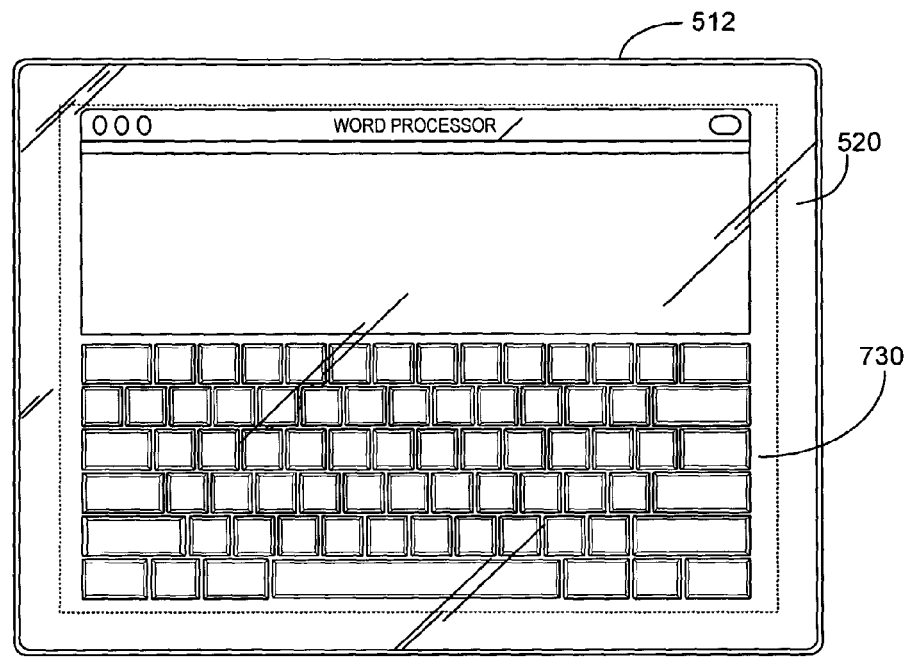
FIGS. 25A-25D illustrates a keyboard sequence, in accordance with one embodiment of the present invention.
Figure 25B:
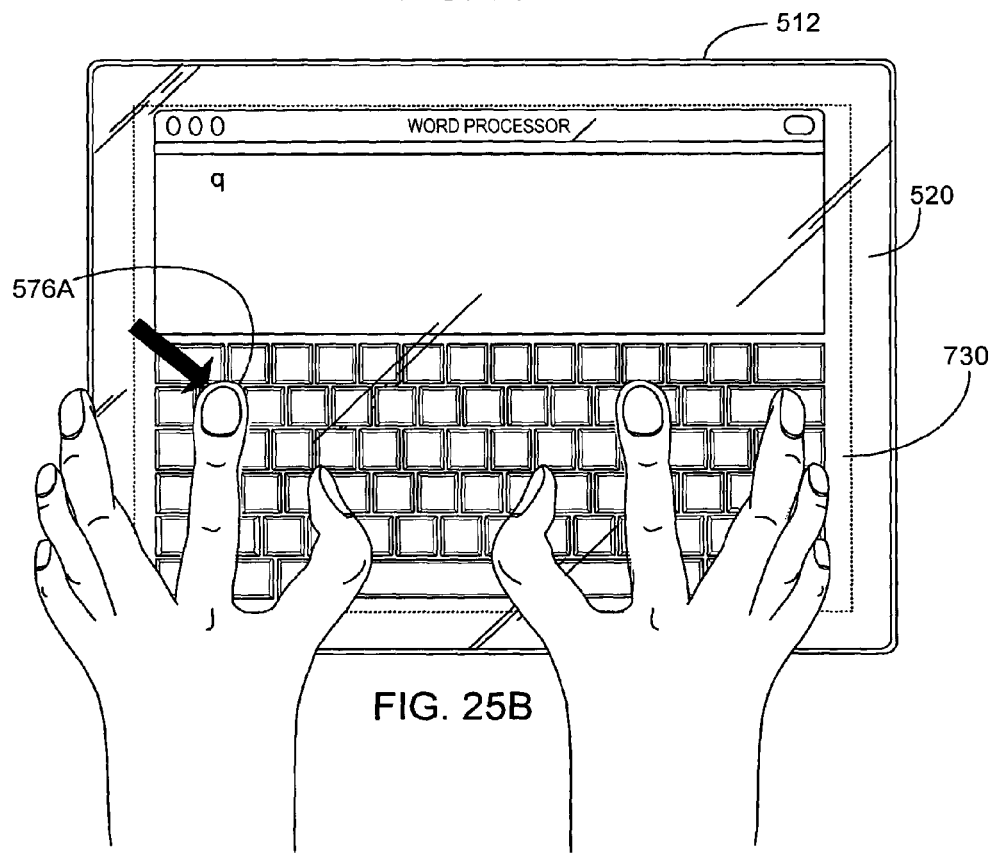
Figure 25C:
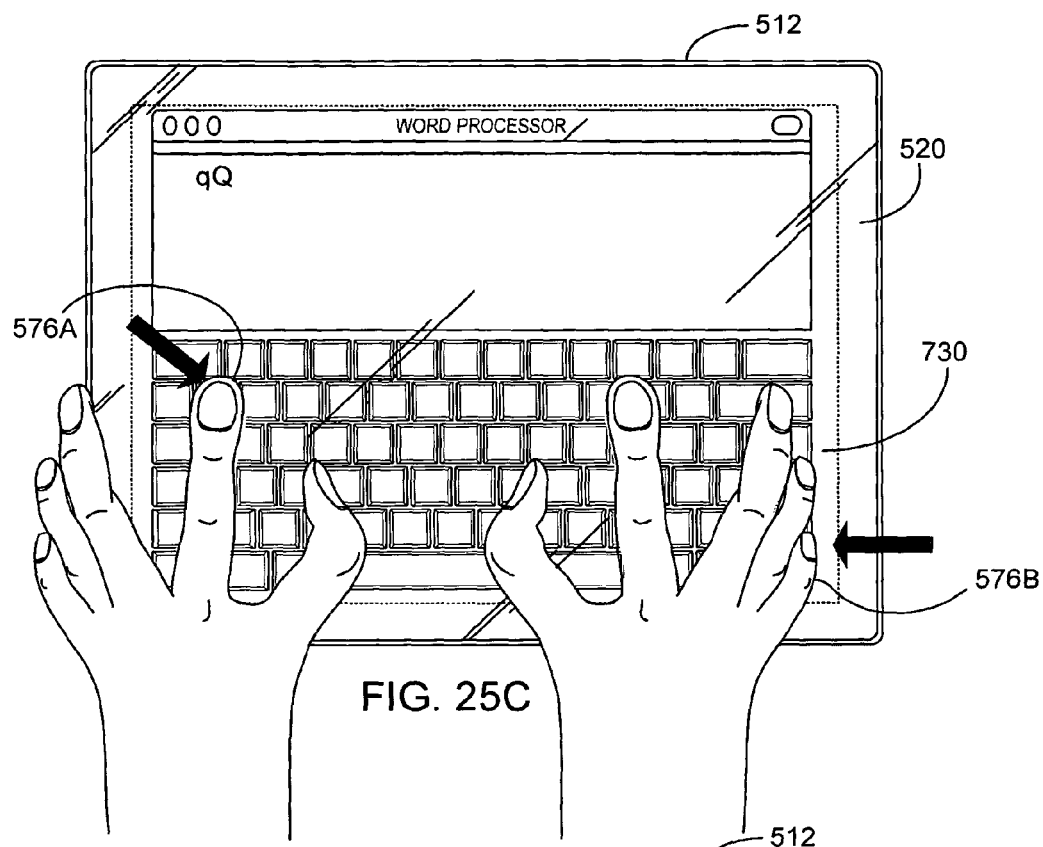
Figure 25D:
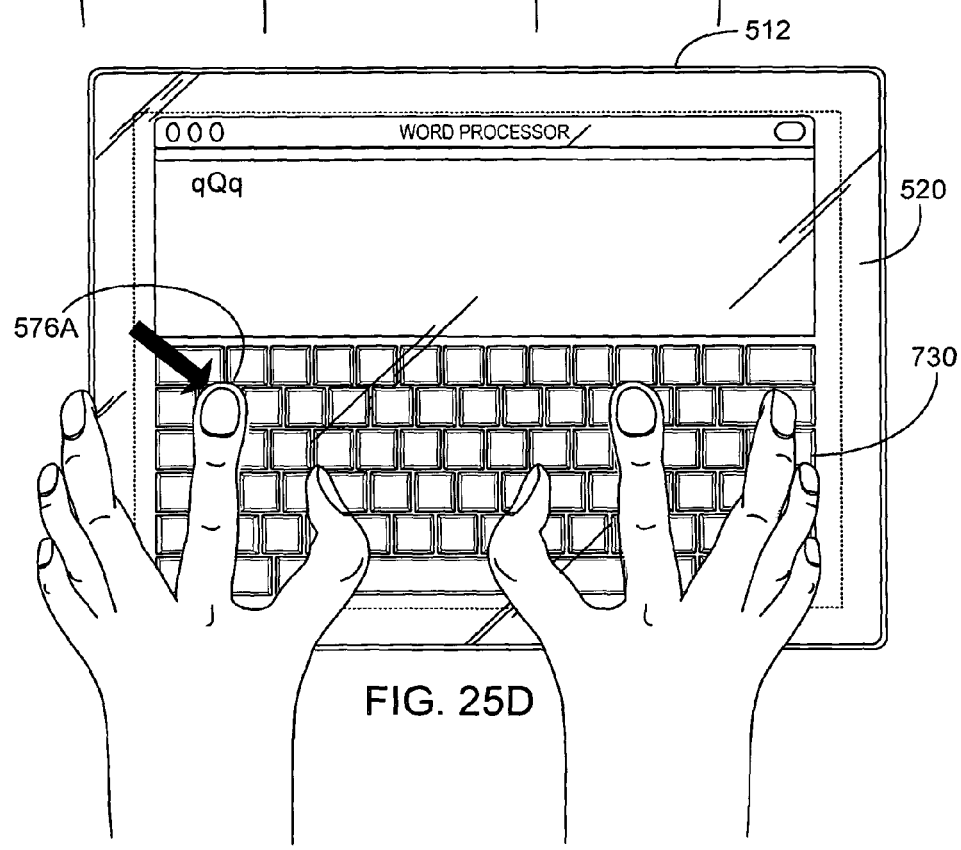

FIGS. 25A-25D illustrates a keyboard sequence using the method described above. FIG. 25A illustrates a display presenting a GUI object 730 in the form of a keyboard. As shown in FIG. 25B, a user positions their fingers 576 over the multipoint touch screen 520 over the keyboard 730 to enter data into a word processing program. By way of example, the user may place one of their fingers 576A on the Q key in order to produce a lower case "q" in the word processing program. As shown in FIG. 25C, when the user decides that a letter should be in upper case, the user places one finger 576B on the shift key and another finger 576A on the desired letter (as indicated by the arrows). As shown in FIG. 25D, in order to continue typing in lower case, the user simply removes their finger 576B from the shift key and places their finger 576A over a desired letter (as indicated by the arrow).

Figure 26:
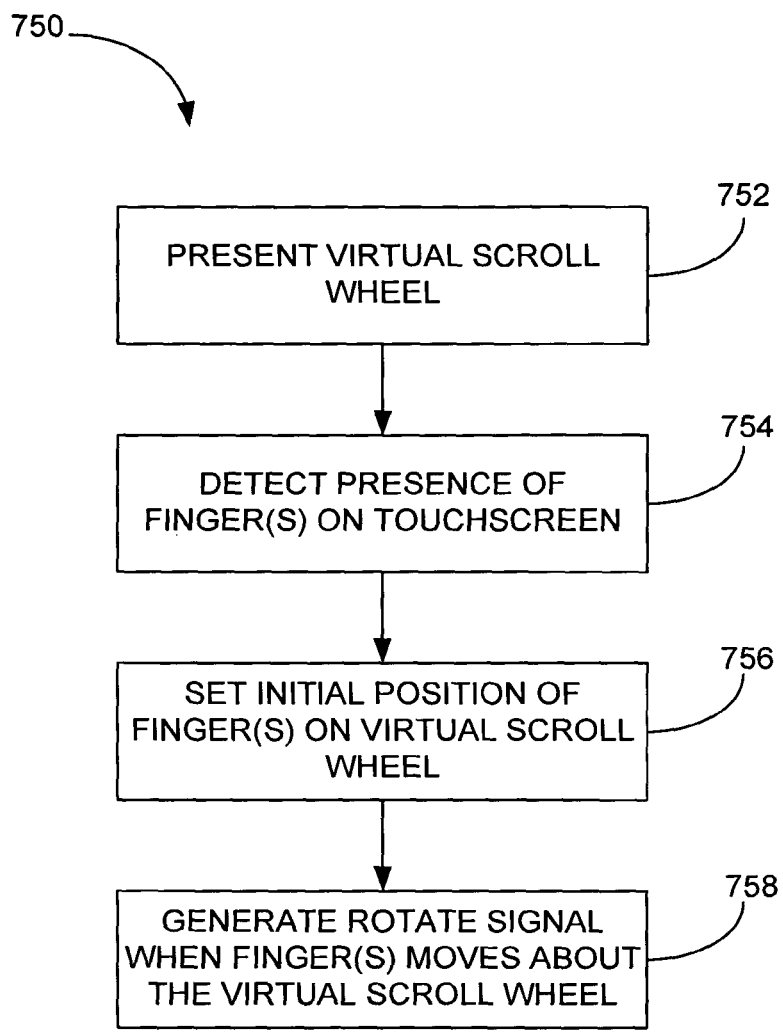
FIG. 26 is a diagram of a GUI operational method, in accordance with one embodiment of the present invention.

FIG. 26 is a diagram of a GUI operational method 750, in accordance with one embodiment of the present invention. The method 750 is configured for simulating a scroll wheel such as those described in U.S. Patent Publication Nos.: 2003/0076303A1, 2003/0076301A1, 2003/0095096A1, all of which are herein incorporated by reference. The method generally begins at block 752 where a virtual scroll wheel is presented on the display. In some cases, the virtual scroll wheel may include a virtual button at its center. The virtual scroll wheel is configured to implement scrolling as for example through a list and the button is configured to implement selections as for example items stored in the list. Following block 752, the method proceeds to block 754 where the presence of at least one finger and in some cases more than one finger, such as first and second fingers, over the virtual scroll wheel is detected on a touch screen. The touch screen is positioned over or in front of the display. By way of example, the display may be an LCD and the touch screen may be a multipoint touch screen. Following block 754, the method proceeds to block 756 where the initial position of the fingers on the virtual scroll wheel is set. By way of example, the angle of the fingers relative to a reference point may be determined (e.g., 12 o clock, 6 o clock, etc.). In most cases, the set down of the finger(s) associate, link or lock the fingers (or finger) to the virtual scroll wheel when the fingers are positioned over the virtual scroll wheel.

Following block 756, the method 750 proceeds to block 758 where a rotate signal is generated when the angle of the fingers change relative to the reference point. The rotate signal can be used to perform several actions including for example scrolling through a plurality of media items, and possibly moving the virtual scroll wheel with the finger(s). By way of example, the combination and frequency of the signals may be converted into distance, direction and speed necessary for moving a selector through the media items as well for moving the virtual scroll wheel around its axis. In most cases, the amount of scrolling and wheel rotation varies according to the amount of finger rotation. By way of example, if the fingers move 5 degrees then so will the wheel. Furthermore, the scrolling and rotation of the wheel typically occurs substantially simultaneously with the motion of the fingers. For instance, as the fingers rotate, both scrolling and rotation of the wheel are performed at the same time. Moreover, although not a requirement, the direction of scrolling and rotation of the wheel is generally the same as the direction of the finger motion. For example, the virtual scroll wheel rotates in the direction of finger rotation (e.g., clockwise, counterclockwise, etc.)

In some cases, the principals of inertia as described above can be applied to the virtual scroll wheel. In cases such as these, the virtual scroll wheel continues to rotate when the fingers (or one of the fingers) are lifted off of the virtual scroll wheel and slowly comes to a stop via virtual friction. Alternatively or additionally, the continuous rotation can be stopped by placing the fingers (or the removed finger) back on the scroll wheel thereby braking the rotation of the virtual scroll wheel.

It should be pointed out that a rotating virtual scroll wheel is not a limitation, and in some cases, the virtual scroll wheel may remain stationary (e.g., does not rotate with the fingers) so as to simulate a touch surface rather than a mechanical rotating wheel.

Figure 27A:
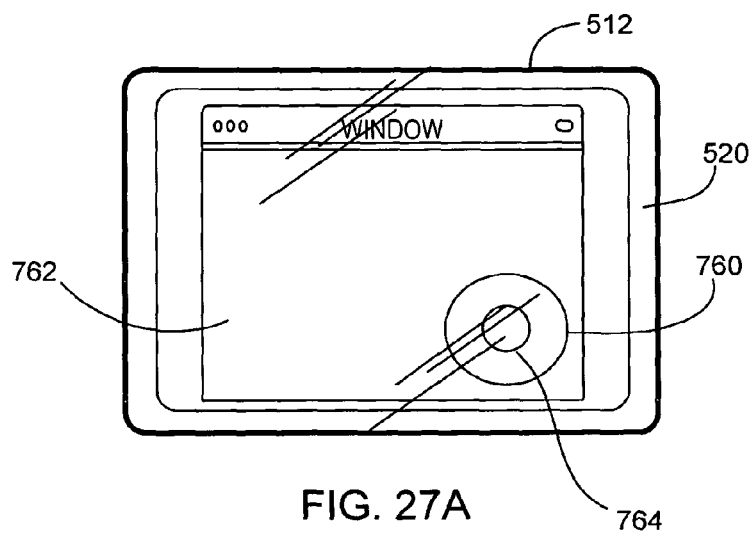
FIGS. 27A-27D illustrates a scroll wheel sequence, in accordance with one embodiment of the present invention.

FIGS. 27A-27D illustrates a scroll wheel sequence using the method described above. FIG. 27A illustrates a display presenting a scroll wheel. The scroll wheel may be displayed automatically as part of a program or it may be displayed when a particular gesture is performed. By way of example, during the operation of a music program (such as iTunes® manufactured by Apple Computer Inc., of Cupertino, Calif.), the virtual scroll wheel may appear on the GUI of the music program when two fingers are placed on the touch screen rather than one finger which is typically used for tracking in the music program. In some cases, the virtual scroll wheel only appears when two fingers are placed on a predetermined area of the GUI. Alternatively, the appearance of the virtual scroll wheel may be based on something other than or in addition to the number of fingers. For example, the virtual scroll wheel may appear in response to any touch that occurs when the music program is running.

Figure 27B:
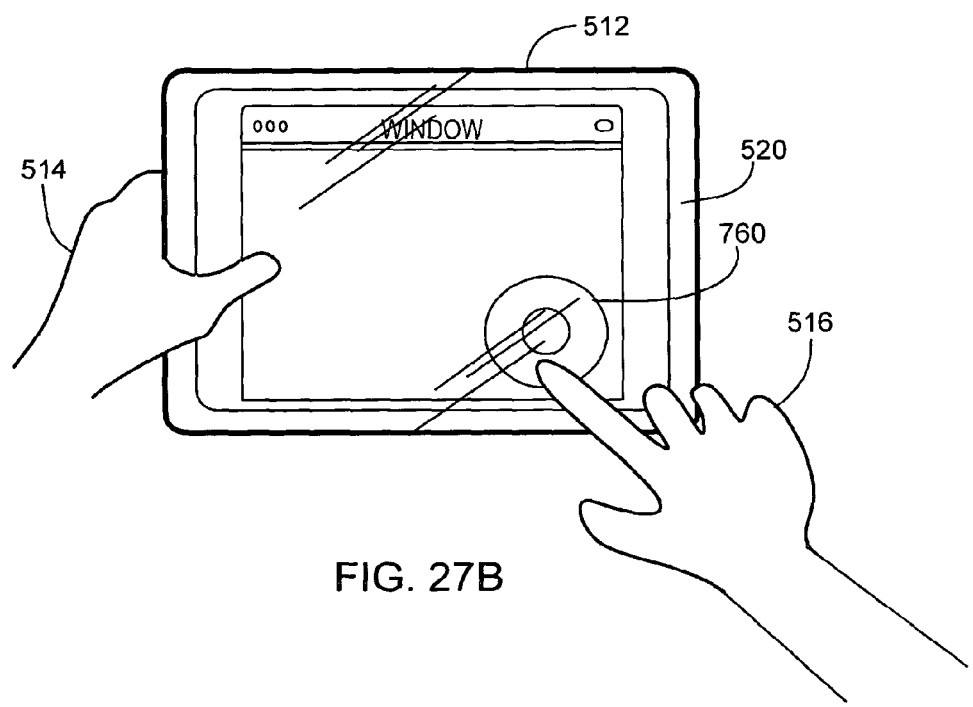
Figure 27C:
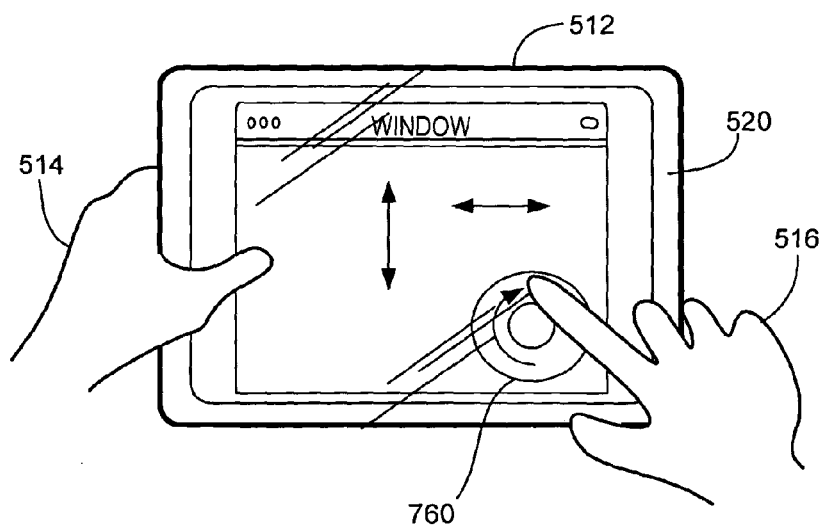
Figure 27D:
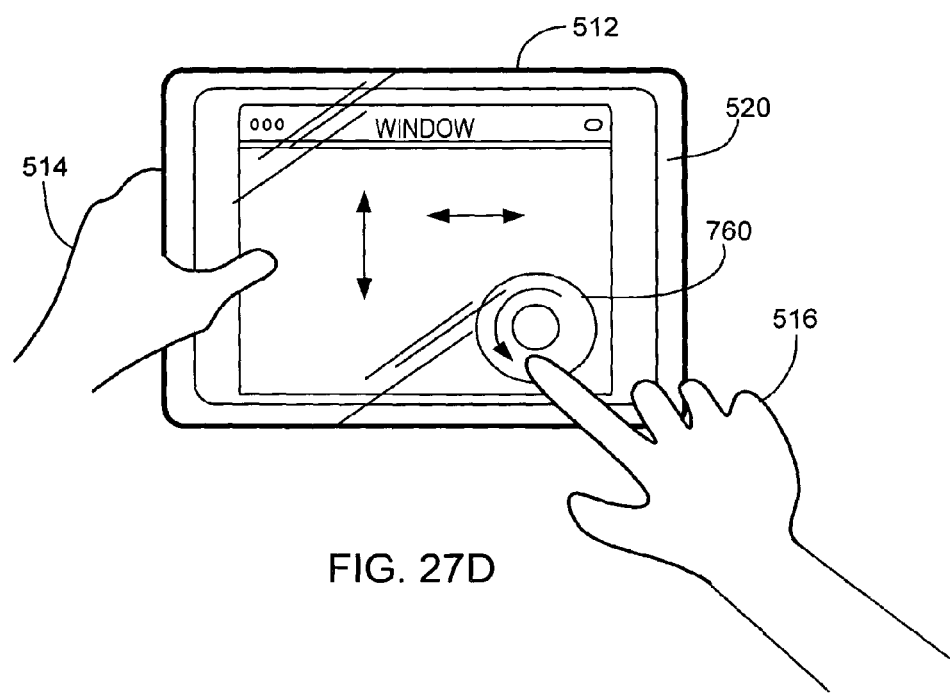

As shown in FIG. 27B, a user positions their fingers over the multipoint touch screen 520 over the scroll wheel. At some point, the fingers are locked to the scroll wheel. This can occur at set down for example. As shown in FIG. 27C, when the fingers are rotated in a clockwise direction, the scroll wheel is rotated in the clockwise direction in accordance with the rotating fingers. As shown in FIG. 27D, when the fingers are rotated in a counterclockwise direction, the virtual scroll wheel is rotated in the counter clockwise direction in accordance with the rotating fingers. Alternatively, rotation of the virtual scroll wheel may also be rotated with linear motion of the fingers in a tangential manner.

Figure 28:
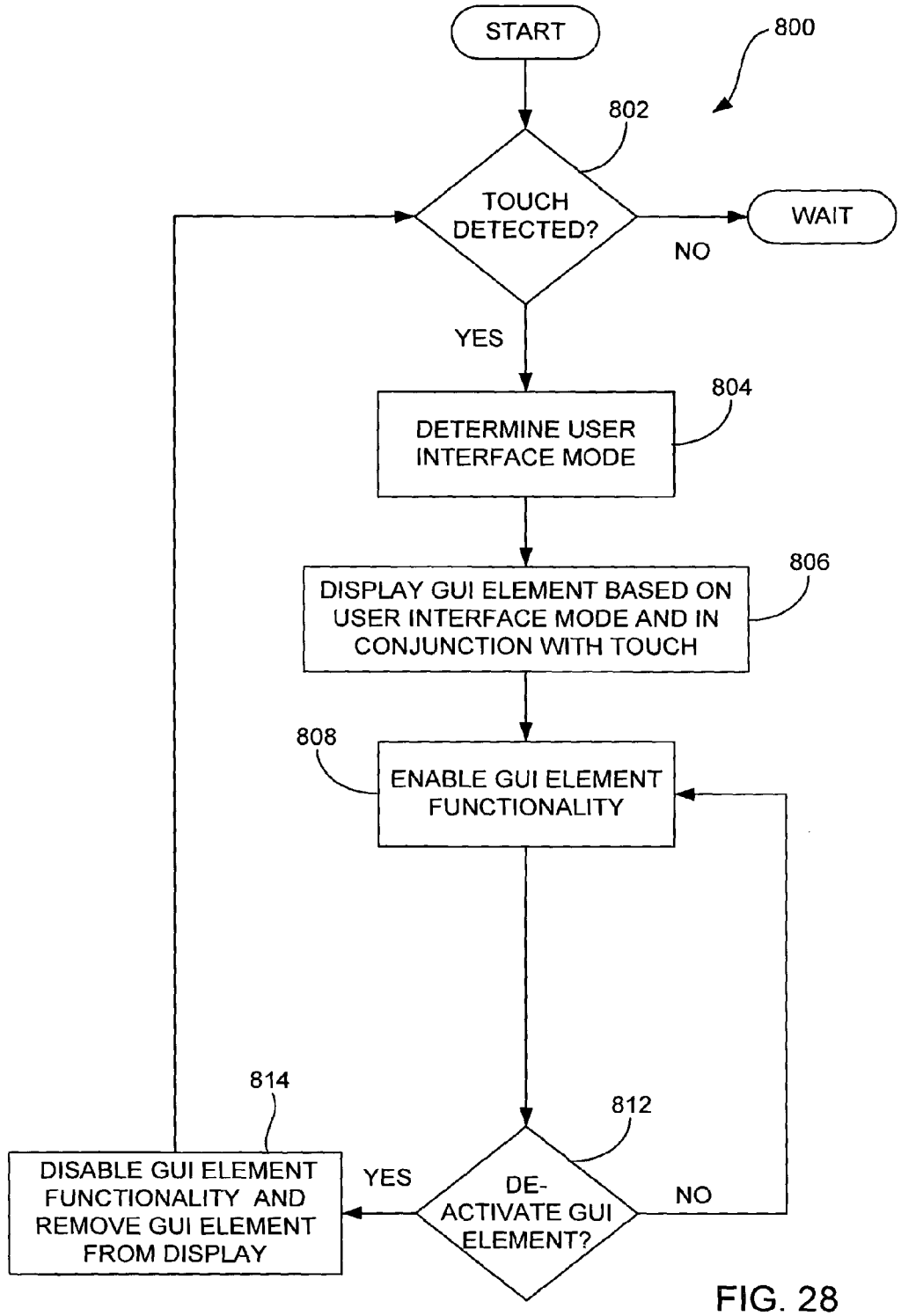
FIG. 28 is user interface method, in accordance with one embodiment of the present invention.
Figure 29C:
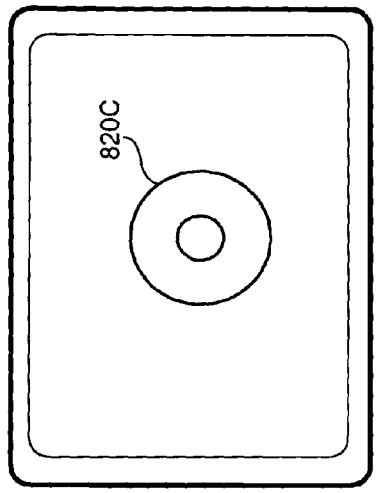
FIGS. 29A-29D illustrate a transition effect, in accordance with one embodiment of the present invention.
Figure 29D:
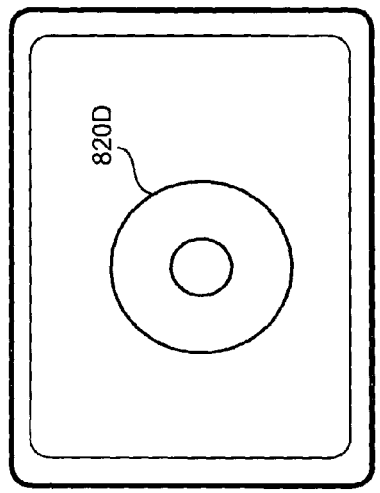
Figure 29A:
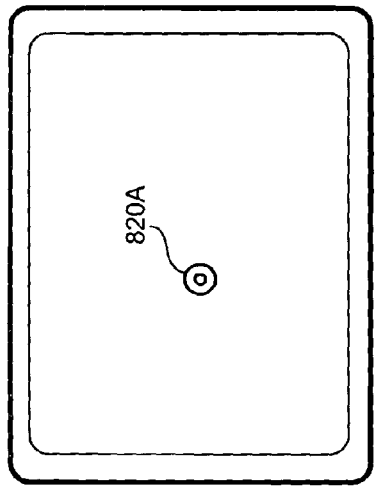
Figure 29B:
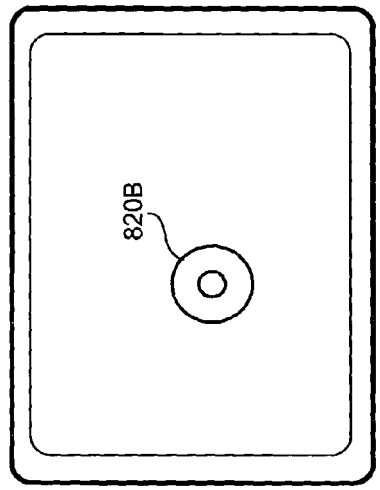
Figure 31C:
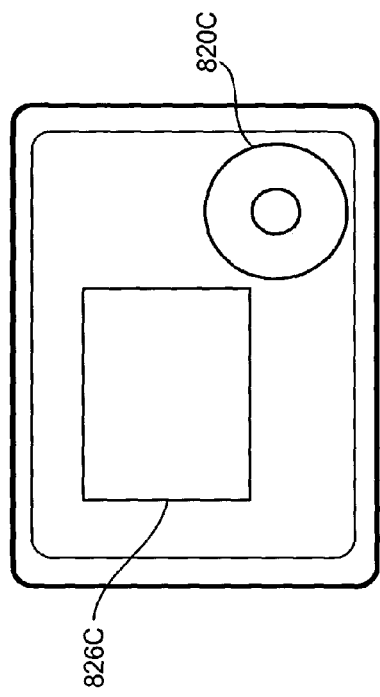
FIGS. 31A-31D illustrate a transition effect, in accordance with another embodiment of the present invention.
Figure 31D:
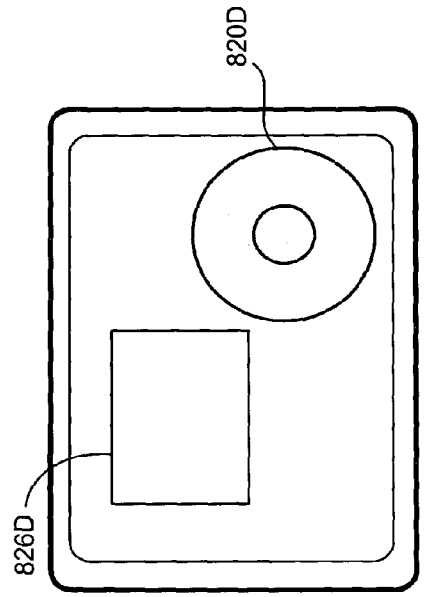
Figure 31A:
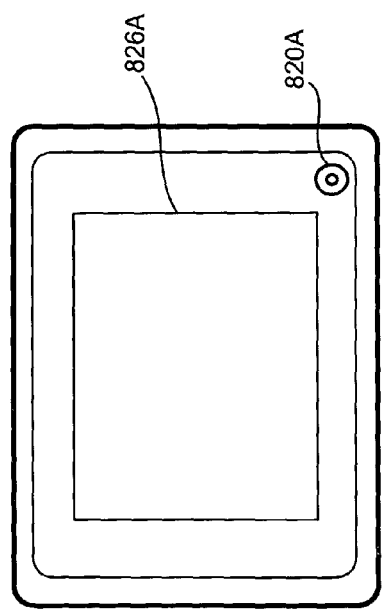
Figure 31B:
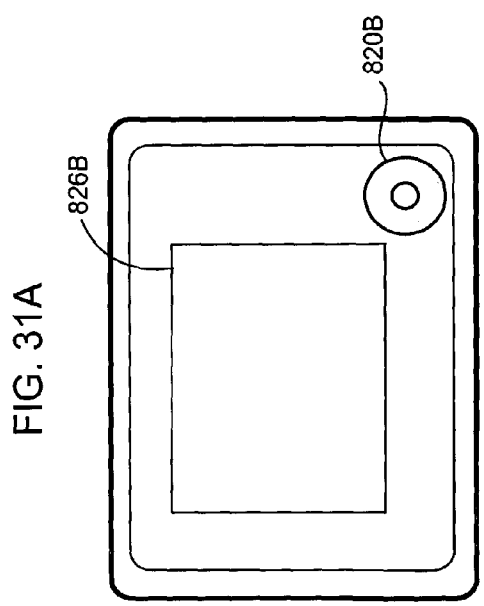

FIG. 28 is user interface method 800, in accordance with one embodiment of the present invention. The user interface method 800 may for example be performed on a computing device having a display and a touch sensitive input device such as a touch screen. The user interface method 800 begins at block 802 where a touch is detected. This may be accomplished with the touch sensitive input device when an object such as a stylus or one or more fingers, is placed on the touch sensitive surface of the touch sensitive input device.

Once a touch is detected, the user interface method 800 proceeds to block 804 where a user interface (UI) mode is determined in response to the touch. The user interface mode may be widely varied. The user interface mode may include navigation modes, scroll modes, data entry modes, edit modes, control modes, information modes, display modes, etc. Each mode typically has one or more GUI interface elements associated therewith. By way of example, a virtual scroll wheel (e.g., FIG. 27) or slider bar may be associated with a scroll mode, a keyboard (e.g., FIG. 25) or keypad may be associated with data entry mode, a tool bar such as a formatting tool bar or drawing tool bar may be associated with an edit mode, a control panel including buttons may be associated with a control mode, a window may be associated with an information mode, etc.

The user interface mode may be determined at block 804 based on one or more conditions including for example, one or more applications currently running on the computing device, the current state or mode of the one or more applications and/or the touch characteristics associated with the touch. In fact, determining the user interface mode at block 804 may involve monitoring and analyzing one or more conditions.

The current applications may for example include operating systems (e.g., Mac OS), word processing programs, spreadsheet programs, draw editing programs, image editing programs, gaming programs, photo management programs (e.g., iPhoto), music management programs (e.g., iTunes), video editing programs (e.g., iMovie), movie management programs (e.g., QuickTime), music editing programs (e.g., GarageB and), Internet interface programs and/or the like.

The current state or mode of the applications may correspond to an active portion of the application (e.g., current window or windows within windows). For example, the active portion of a music management program may correspond to a music control mode, a playlist select mode, a menu mode, and/or the like. Further, the active portion of a photo management program may correspond to photo browsing mode or photo editing mode. Further still, the active portion of an internet interface program may correspond to a web mode or an email mode.

The touch characteristics on the other hand may, for example, correspond to touch location, touch ID, number of touches, etc., as described in many of the embodiments mentioned above.

With regards to applications, different applications may indicate different UI modes. For example, a word processing or spreadsheet application may indicate a data entry mode, while a music management program may indicate a control or scrolling mode. With regards to the current state of an application, different modes of the application may indicate different UI modes. For example, in a music management program, a menu window may indicate one UI mode, while a playlist window may indicate another UI mode.

With regards to the touch, the number of fingers may indicate different UI modes. For example, one finger may indicate a first mode while two fingers may indicate a second mode. In addition, the identity of the touch may indicate different UI modes. For example, a thumb may indicate a first UI mode and an index finger may indicate a second UI mode. Moreover, the location of the touch may indicate different UI modes. For example, a first touch location may indicate a first UI mode, while a second touch location may indicate a second UI mode (if the touch is located over a border of a music program a first UI mode may be implemented, and if the touch is located over a playlist or list of songs in the music program a second UI mode may be implemented.

In one embodiment, the user interface mode is based on only one of the conditions. For example, the user interface mode is only based on the application, the current state of the application or one of the various touch characteristics as described above. In another embodiment, the user interface mode is based on multiple conditions. For example, the user interface mode may be based on a combination of at least two selected from the application, the current state of the application and the various touch characteristics. By way of example, the application combined with a first touch characteristic may indicate a first UI mode and the same application combined with a second touch characteristic may indicate a second UI mode.

To cite a few examples, if the application is a word processing or spreadsheet program then the mode may be determined to be a data entry mode so that data can be entered into the spreadsheet (e.g., keyboard). If the application is a music management program and a playlist is currently showing (active portion), the mode may be determined to be a scroll mode so that the items in the list may be scrolled through in order to find a desired item (e.g., scroll wheel). Alternatively, if a song is playing (active portion), the mode may be determined to be a control mode so that the manner in which songs are played can be controlled (e.g., play, stop, seek and volume control options). Further, if the application is a photo management program and a particular photo is displayed (active portion), the mode may be determined to be a control mode so that the photo can be modified (e.g., converting to black and white, removing red eye, and rotate options).

After determining the user interface mode 804, the user interface method 800 proceeds to block 806 where one or more GUI elements are displayed based on the user interface mode and in response to the touch(s). In some cases, only one GUI element is displayed and in other cases multiple GUI elements are displayed. The GUI element is typically associated with a particular mode. For example, a slider bar or scroll wheel may be displayed in a scroll mode, a keyboard or keypad may be displayed in a data entry mode, a tool bar may be displayed in an edit mode, various buttons or a control panel may be displayed in a control mode, and information windows may be displayed in an information mode.

The GUI element may be displayed in a variety of ways. For example, it can be positioned over the currently displayed graphical images, or it can displace the currently displayed graphical images (e.g., minimize, shift, etc.). In some cases, the GUI element is made semi transparent so that the current graphical image disposed below the GUI element can be seen (thereby eliminating minimizing and shifting). This may be helpful when using a scroll wheel to traverse through a list disposed below the scroll wheel. Furthermore, the GUI element can be placed in the vicinity of the touch or it can be placed in some predetermined location. The predetermined location may be based on ergonomics, i.e., what is the best location for the user.

In addition to the above, the GUI element may be displayed using a transition effect such as growing, fading in, popping up, and in some cases may even pulsate, throb, etc. If the effect is popping up, the GUI element is immediately brought into view. If the effect is growing, as shown in FIGS. 29A-29D, a small GUI element 820A (scroll wheel) is initially displayed, and thereafter the GUI element 820A continuously enlarges through various sizes 820B and 820 C until it reaches its desired size 820D. The speed of growth may be based on the pressure of the touch. For example, if the touch pressure is low, the GUI element may grow slowly and if the touch pressure is high, the GUI element may grow more rapidly. In addition, the final size of the GUI element may be based on the length of the touch. For example, the GUI element stops growing when the touch is no longer detected. Alternatively, the speed and size may be user adjustable as for example through a control panel. If the effect is fading, as shown in FIGS. 30A-30D, the GUI element 822 is slowly brought into view from nothing, through various levels of distortion or transparency 822A-822C, to a final complete image 822D. The fading can be controlled similarly to growth. For example, the speed and level of fade may be controlled by the pressure and length of touch.

The transition effect may even carry over to the currently displayed images, i.e., the images currently displayed before the touch was detected. In one embodiment, the opposite effect happens to the currently displayed images. For example, as shown in FIGS. 31A-31D, the currently displayed graphical images 826 are minimized smaller and smaller as the GUI element 820 grows larger and larger. Alternatively, if the GUI element immediately pops in, the currently displayed graphical images can immediately pop out or be immediately minimized.

Once the GUI element is displayed (806), the user interface method 800 proceeds to block 808 where the functionality of the GUI element is enabled. For example, touch event is monitored relative to the GUI element and actions associated with the touch event are performed. The enablement of the GUI element may occur simultaneously with the display of the GUI element so that a user can immediately start using the GUI element once displayed. By way of example, in a scroll mode, a virtual scroll wheel may be displayed and when enabled, the touch events are monitored relative to the scroll wheel. During monitoring, control signals associated with the position of the finger on the scroll wheel are generated as the finger swirls around the virtual scroll wheel. These signals can be used to perform scrolling. For example, the number, combination and frequency of the signals may be converted into distance, direction and speed necessary for moving a selection bar through a list. By way of example, see FIGS. 6, 26 and 27 for more detailed descriptions of virtual scroll wheels and how they function.

At some point after enabling and displaying the GUI element, a determination 812 is made as to whether or not to deactivate the GUI element. The determination 812 can be made in a variety of ways including, for example: 1) the touch is no longer detected, 2) a touch has not been detected for a preset amount of time, 3) a time out occurs (a preset amount of time has gone by since the GUI element was first displayed/enabled), or 4) a user selection (e.g., a user selects a button that closes the GUI element).

If the determination indicates deactivation, then the method proceeds to block 814 where the GUI element is disabled and removed from display. Once disabled, actions will no longer be performed when a touch event occurs. The removal of the GUI element from display may function similar to displaying the GUI element in that it can be removed using a transition effect such as slowly fading out, shrinking or immediately disappearing (popping out). The removal transition effect may work opposite the displaying transitioning effect. For example, the GUI element fades out similarly to fading in, shrinks similarly to growth or pops out similarly to popping in. Further, the GUI element can slowly recess and disappear from view while the displaced or shrunken current graphical images can slowly grow back to their original size and shape. If the determination does not indicate deactivation, then the method maintains the display of the GUI element as well as the enablement thereof.

Figure 32:
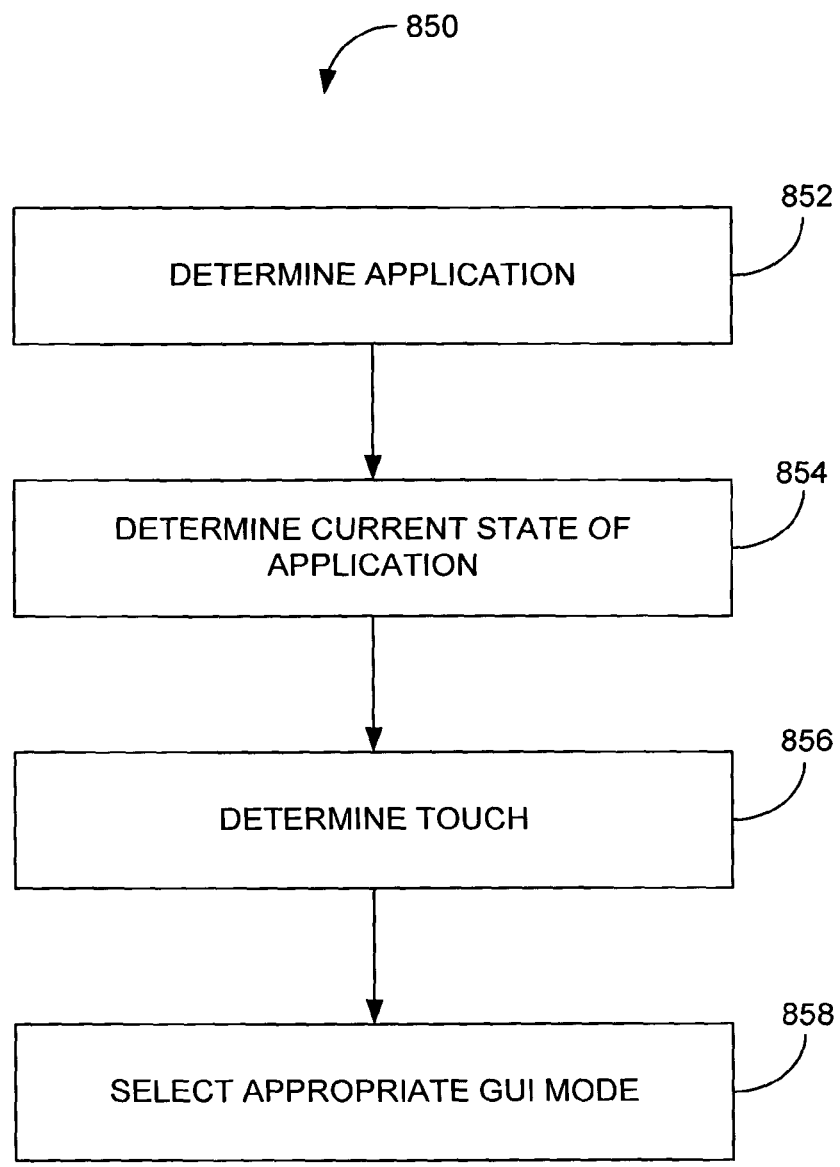
FIG. 32 is a determination method, in accordance with one embodiment of the present invention.

FIG. 32 is a determination method 850 in accordance with one embodiment of the present invention. The determination method may, for example, correspond to the block 804 in FIG. 28. The determination method begins at block 852 where the current application is determined. The determination method proceeds to block 854 where the current state of the application is determined. Following block 854, the determination method proceeds to block 856 where the touch characteristics associated with the touch are determined. The determination method proceeds to block 860 where a UI mode is selected based on the results from blocks 852-858. By way of example, a set of rules may indicate appropriate UI modes for a particular set of conditions.

Figure 33:
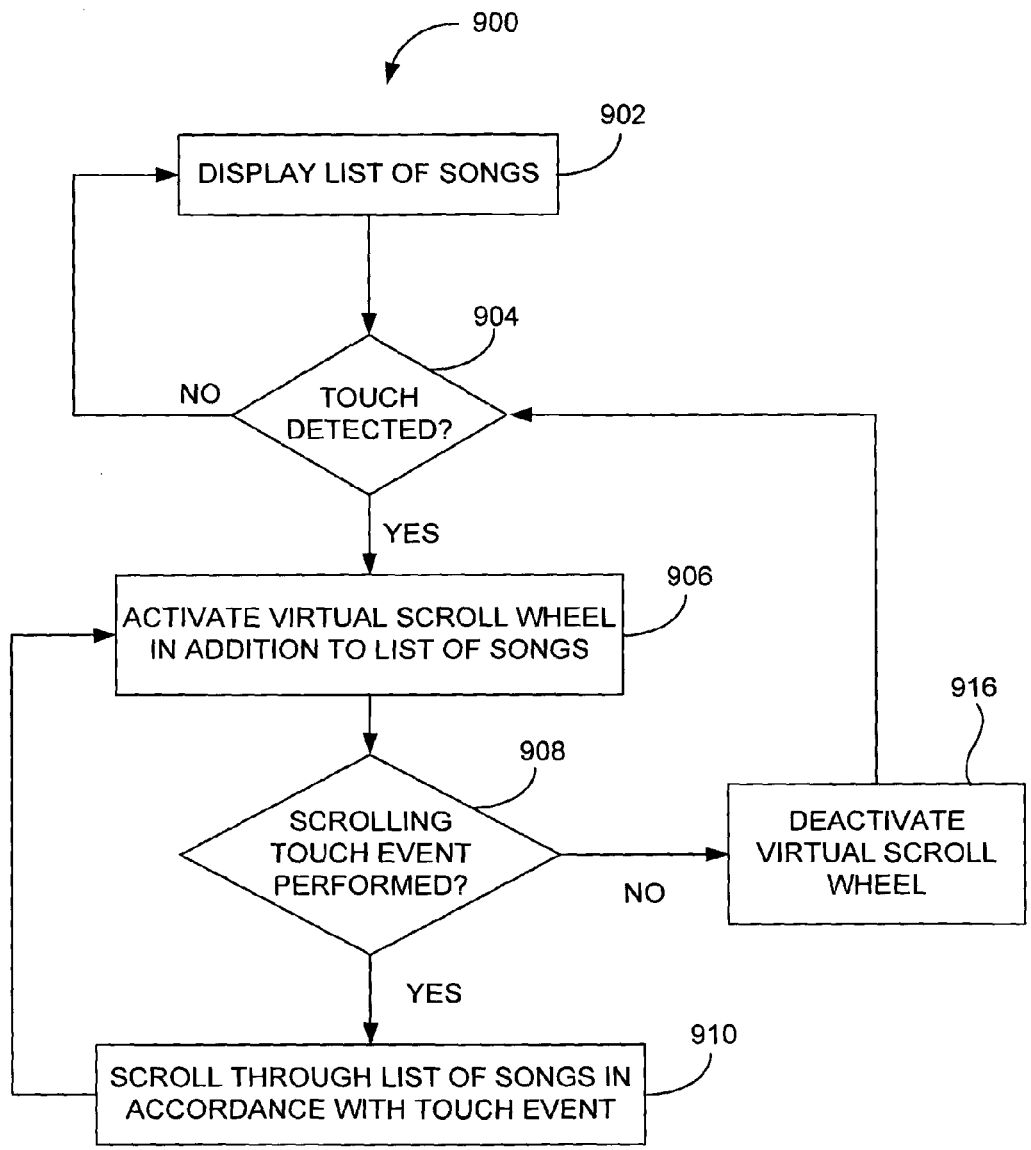
FIG. 33 is a user interface method, in accordance with one embodiment of the present invention.
Figure 34A:
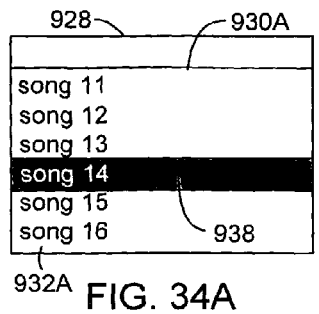
FIG. 34A-34F illustrates a sequence associated with the method shown in FIG. 33, in accordance with one embodiment of the present invention.
Figure 35A:
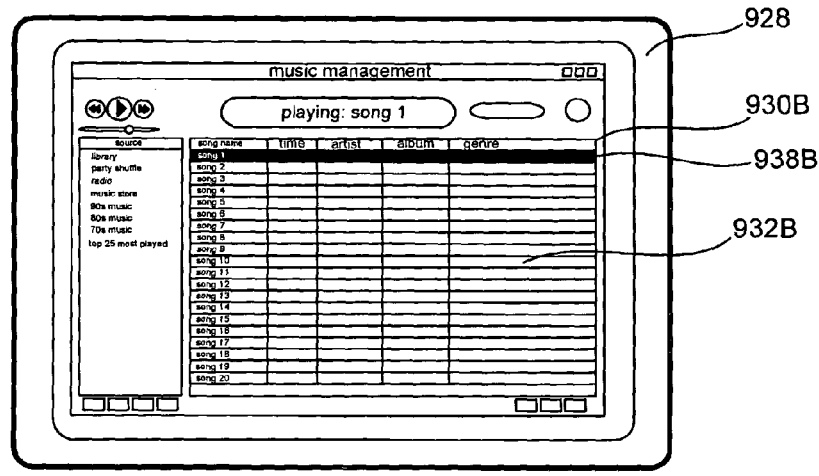
FIG. 35A-35F illustrates a sequence associated with the method shown in FIG. 33, in accordance with one embodiment of the present invention.

FIG. 33 is a user interface method 900 in accordance with one embodiment of the present invention. The method may, for example, be performed on a computing device having a display and a touch sensitive input device such as a touch screen. The interface method 900 begins at block 902 where a list of songs are displayed. FIG. 34A shows one example of a window 930A including a list of songs 932A, and FIG. 35A shows another example of a window 930B including a list of songs 932B. FIG. 34A may, for example, be a graphical user interface displayed on an iPod® manufactured by Apple Computer of Cupertino, Calif., and FIG. 35A may for example be a graphical user interface associated with a music management program, such as iTunes® manufactured by Apple Computer of Cupertino, Calif.

Figure 34D:
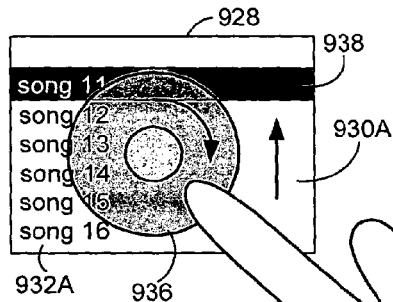
Figure 34B:
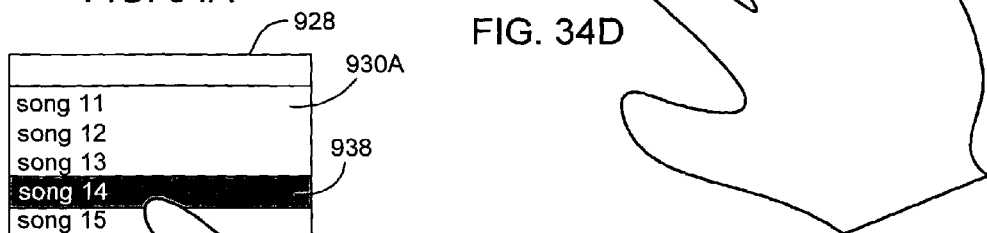
Figure 35B:
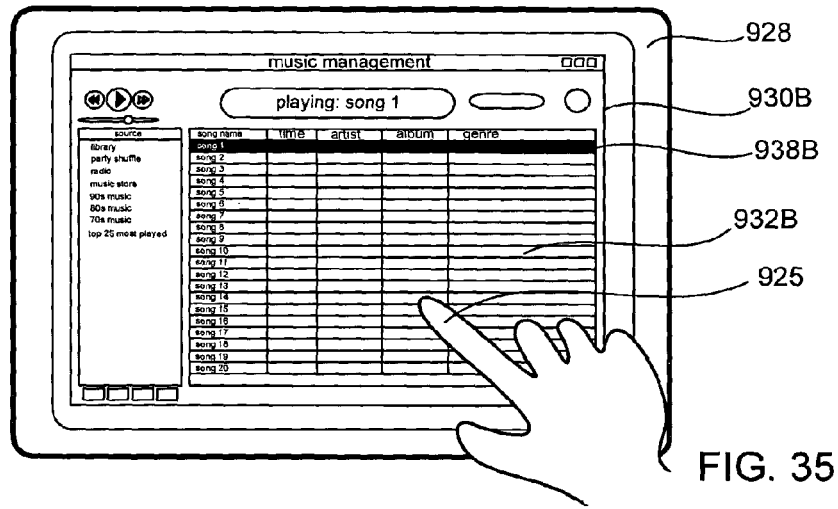

Following block 902, the user interface method 900 proceeds to block 904 where a touch is detected over the displayed list of songs (or window or entire GUI). This may be accomplished with the touch sensitive input device when an object such as a stylus or one or more fingers is placed on the touch sensitive surface of the touch sensitive input device such as a touch screen. FIGS. 34B and 35B show a finger 925 placed over the window 930 including the list of songs 932.

Figure 34E:
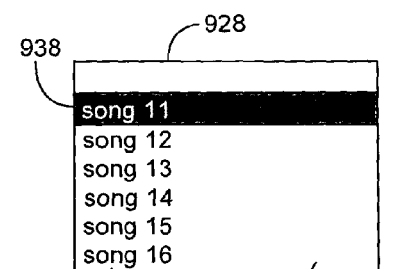
Figure 34C:
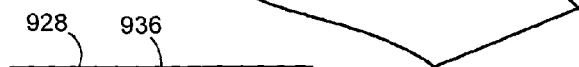
Figure 34F:
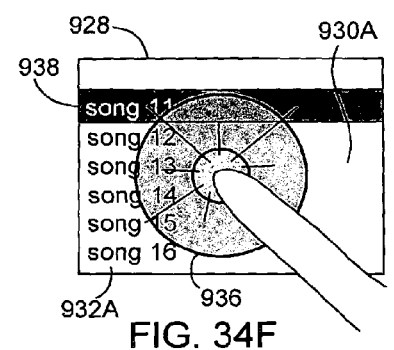
Figure 35C:
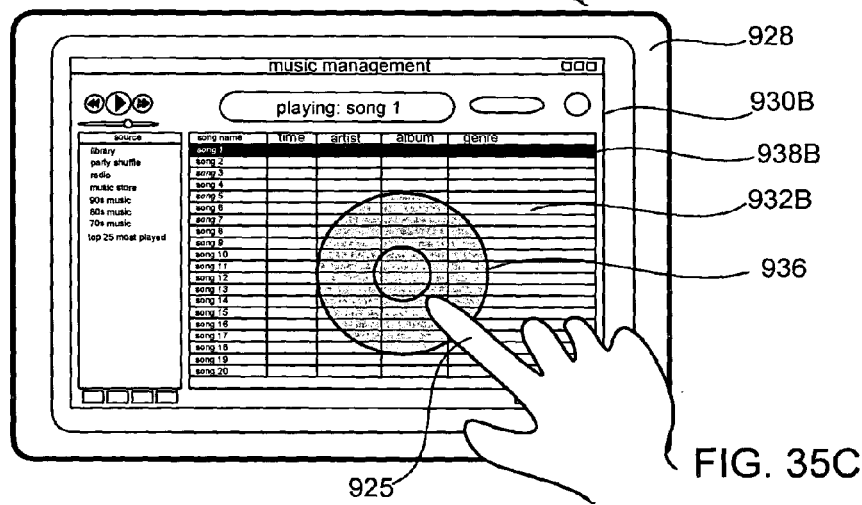

Once a touch is detected, the user interface method 900 proceeds to block 906 where a virtual scroll wheel is activated. That is, a virtual scroll wheel is displayed in addition to the list of songs and its functionality is enabled. In essence, because the song list was touched, a scroll wheel that allows a user to traverse through the songs in the list of songs is provided. In some cases, the virtual scroll wheel displaces the media items, i.e., the media items are minimized or shifted to make room for the virtual scroll wheel. In other cases, the virtual scroll wheel is positioned or laid over the media items (the media items keep their current size, shape and position). The virtual scroll wheel can be made semi-transparent so that the media items can be viewed through the virtual scroll wheel. FIGS. 34C and 35C show a transparent virtual scroll 936 wheel laid over the window 930 including the list of songs 932. Alternatively, a virtual slider bar may be displayed.

Once displayed, a determination 908 is made as to whether or not a scrolling touch event (or gesture) is performed relative to the virtual scroll wheel. For example, whether or not a finger is positioned over the scroll wheel and whether or not the finger is moved around the scroll wheel in a swirling fashion.

Figure 35D:
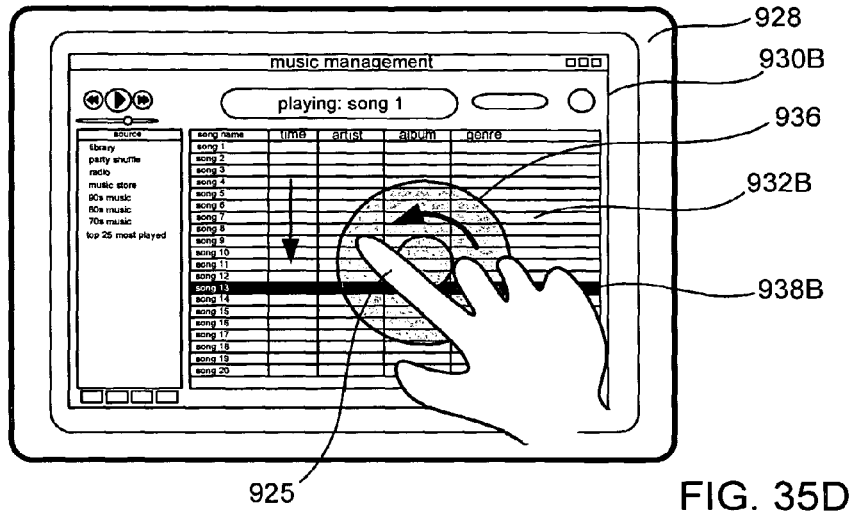

If a scrolling touch event is performed by the user, the user interface method 900 proceeds to block 910 where scrolling is implemented through the list of songs in accordance with the scrolling touch event. By way of example, a selector bar may be moved from one song to another as the finger is swirled around the virtual scroll wheel. FIGS. 34D and 35D show the finger 925 swirling around the virtual scroll wheel 936, and a selector bar 938 moving linearly through the list of songs 932 in accordance with the swirling finger 925. In the illustrated embodiments, the selector bar is moved linearly up when the finger is swirled in a clockwise fashion and linearly down when the finger is swirled in a counterclockwise fashion. It should be noted, however, that this is not a limitation. For example, the selector bar may moved linearly down when the finger is swirled in a clockwise fashion and linearly up when the finger is swirled in a counterclockwise fashion.

Figure 35E:
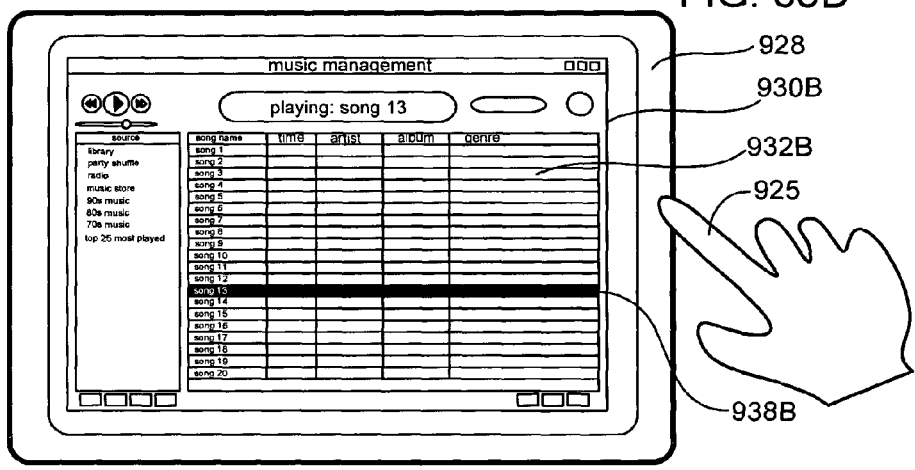
Figure 35F:
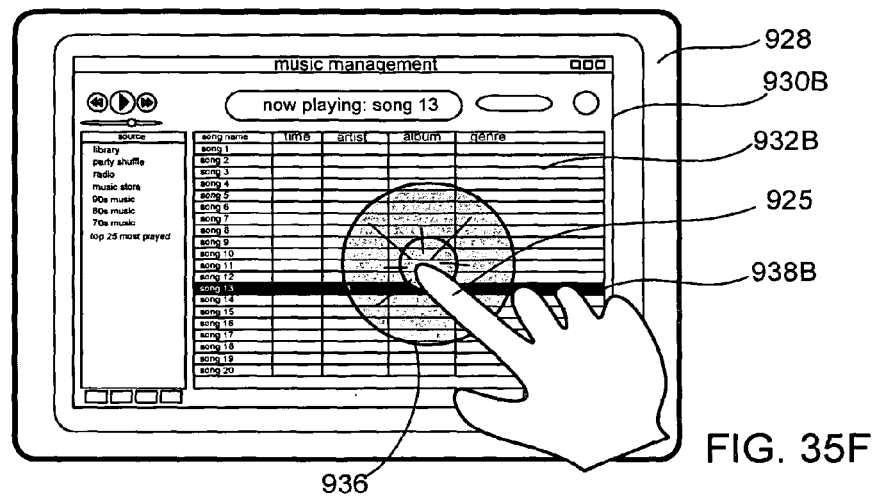

If a scrolling or select touch event is not performed, the user interface method 900 proceeds to block 916 where the virtual scroll wheel is deactivated. That is, the virtual scroll wheel is disabled and removed from the display. FIGS. 34E and 35E show the display 928 without the virtual scroll wheel 936. Although the virtual scroll wheel 936 is removed, changes made to the list of songs, i.e., the position of the selector bar 938, typically remain.

In some cases, the virtual scroll wheel may include button zones across its surface or a virtual button at its center or around its sides. The buttons and button zones may for example correspond to menu, play, seek, pause, and/or the like. In this particular embodiment, the method described above may include additional steps that occur before block 416. For example, if a scrolling touch event is not performed, the user interface method 900 may include an additional block where a determination is made as to whether or not a selection touch event (or gesture) is performed relative to the virtual scroll wheel. The selection touch event may be implemented by tapping the button or by exerting increased or decreased pressure on the button rather than swirling around the surface of the virtual scroll wheel (see FIGS. 34F and 35F). If the button is a song select or enter button, the method include another block where the song with the selector bar disposed thereover is selected. That is, when the virtual button is tapped, or otherwise selected, the song currently covered by the selector bar is played and outputted for the user's enjoyment.

Figure 36A:
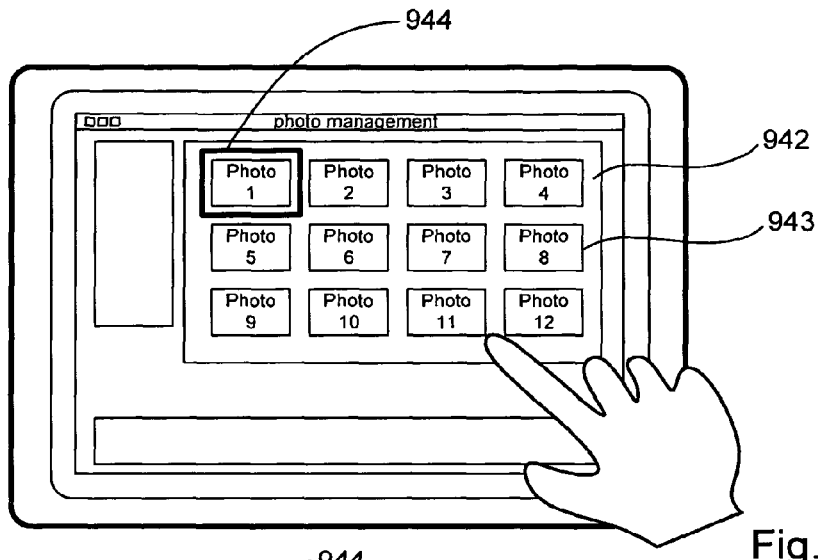
FIGS. 36A-36C illustrate a user interface sequence, in accordance with one embodiment of the present invention.
Figure 36B:
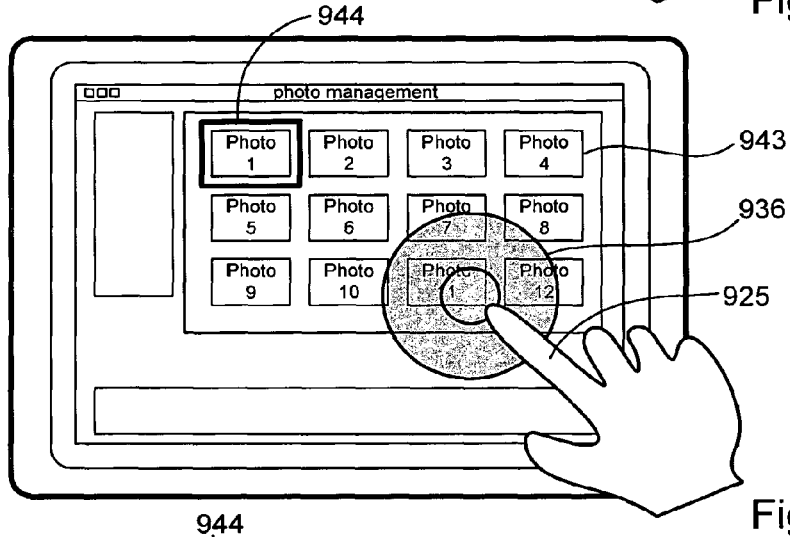
Figure 36C:
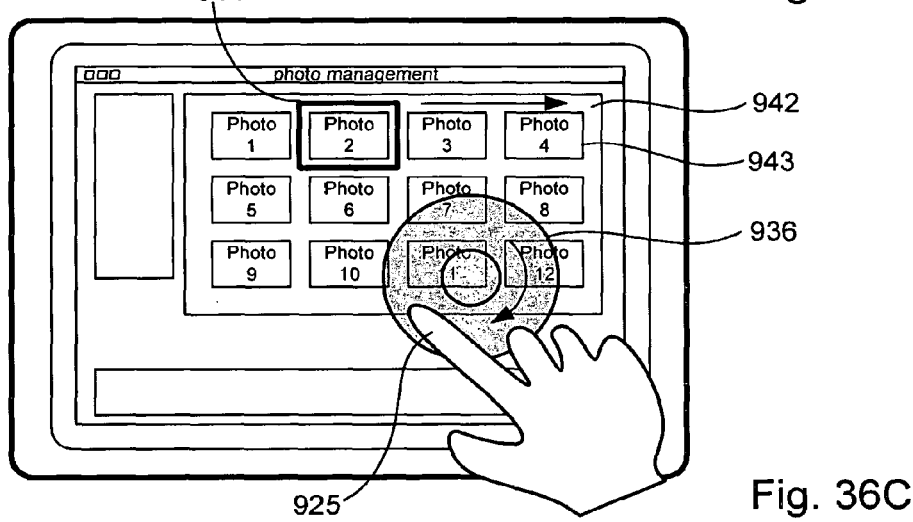

It should be noted that the methods described above are not limited to scrolling through a list of songs. Any media item as well as any group of elements can be scrolled through using the aforementioned technique. For example, in photo layout 942 as shown in FIGS. 36A-36C, the virtual scroll wheel 936 may appear when the user places their finger 925 over the photo layout 942 (or grouping), and thereafter it can be used to move a highlighter 944 through the various photos 943 in the layout 942. By way of example, the photos may be thumbnails images that make traversing through a large number of images easier.

Figure 37:
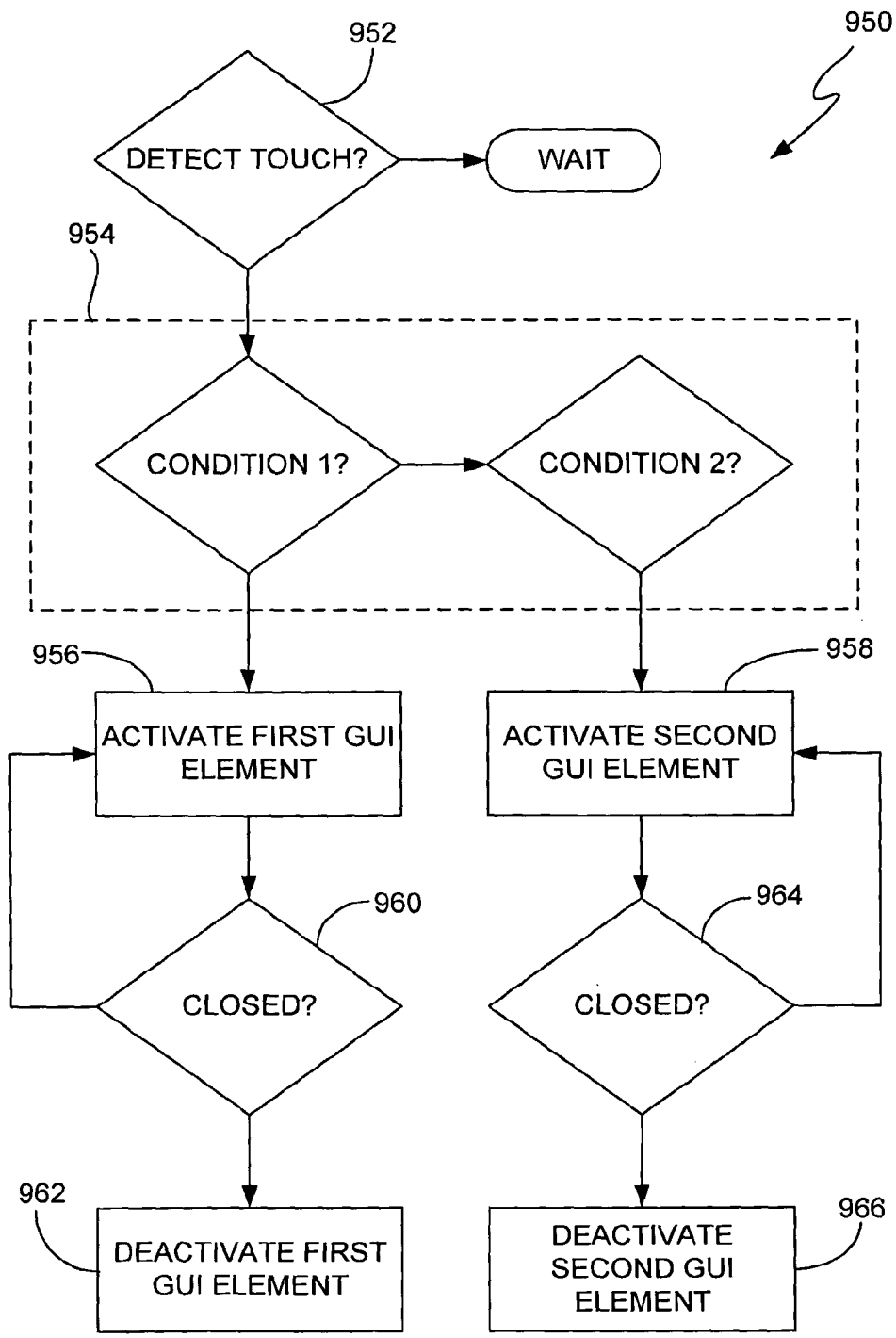
FIG. 37 is a user interface method, in accordance with one embodiment of the present invention

FIG. 37 is a method 950, in accordance with one embodiment of the present invention. The method begins at block 952 where it is determined if a touch is detected. If a touch is detected, the method proceeds to block 954 where the current operating conditions are monitored and analyzed. The conditions may for example correspond to the current application, the state of the application and/or the touch characteristics associated with the touch.

Figure 38A:
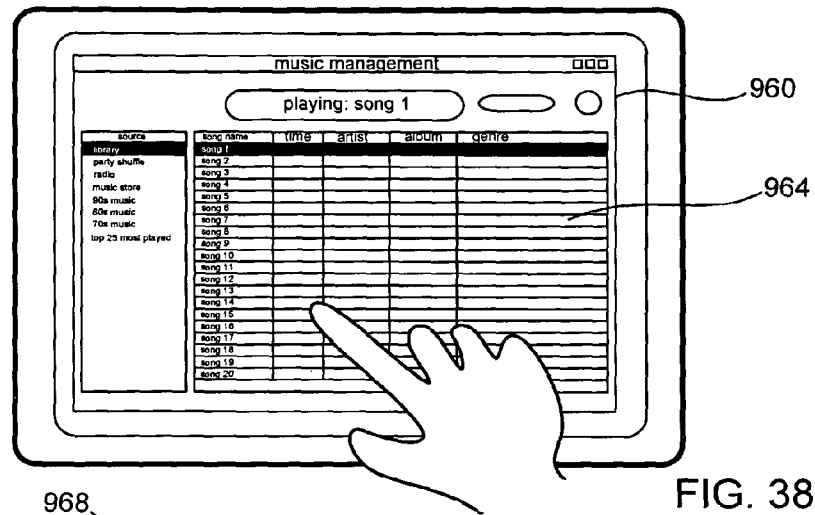
FIGS. 38A-38J illustrate a user interface sequence, in accordance with one embodiment of the present invention.
Figure 38B:
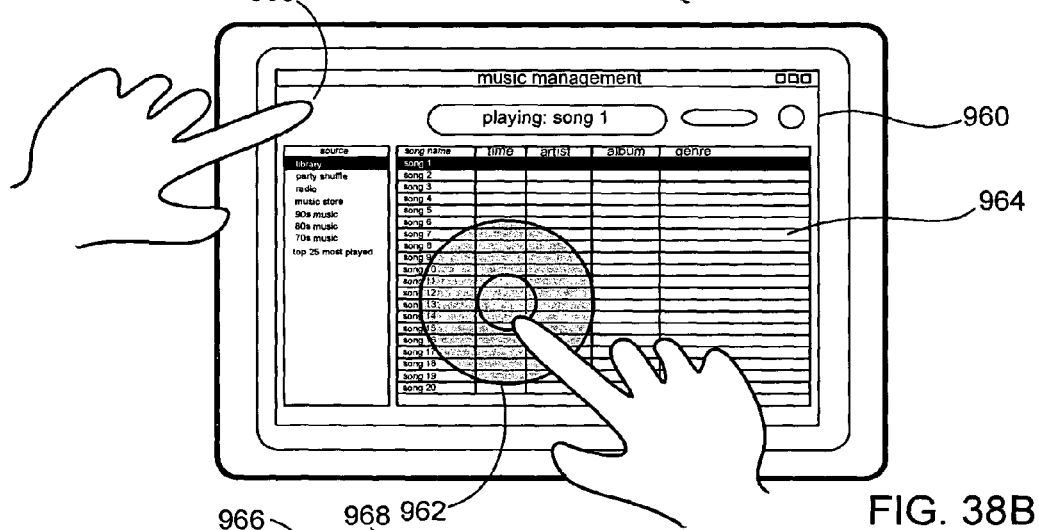

If a first set of conditions are implemented, the method proceeds to block 956 where a first GUI element is activated. For example, as shown in FIGS. 38A-B, in an active window 960 of a music management program, a scroll wheel 962 may be activated when a user touches a playlist portion 964 of the active window 960.

Figure 38C:
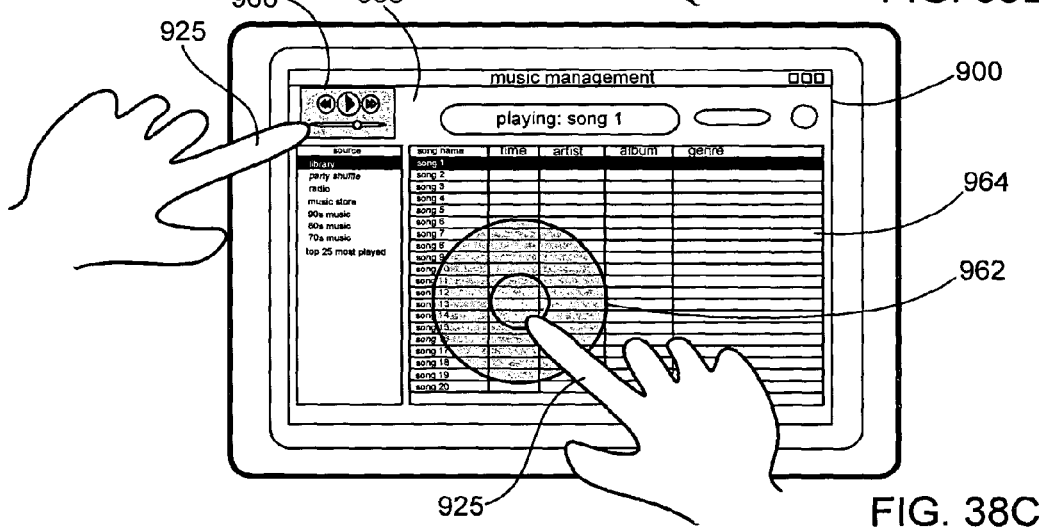

If a second set of conditions are implemented, the method proceeds to block 958 where a second GUI element is activated. For example, as shown in FIGS. 38B-C, in the active window 960 of a music management program, a music control panel 966 may be activated when a user also touches a border 968 of the active window 960. Although they work independent of one another, the first and second GUI elements may be activated at the same time if the first and second conditions occur simultaneously (FIG. 34C).

Figure 38D:
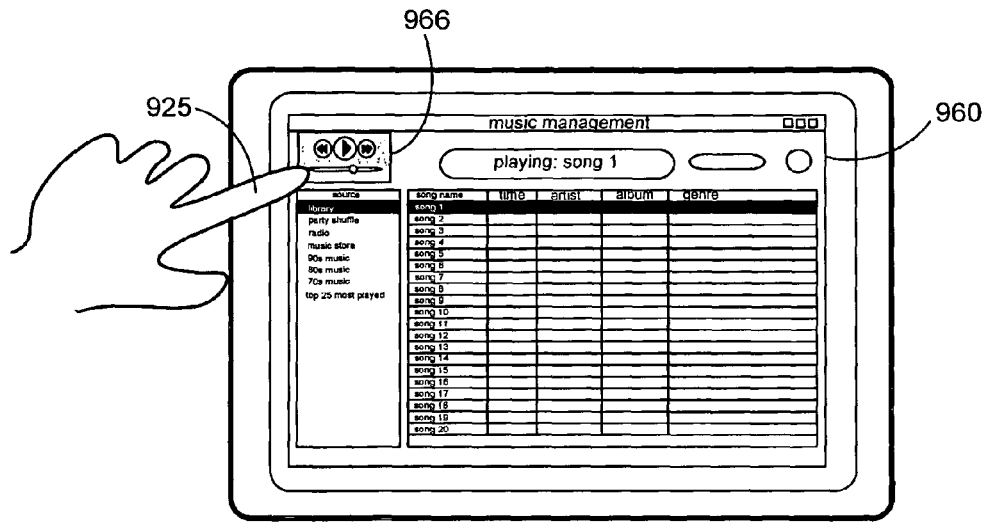

Following block 956, the method proceeds to block 960 where it is determined if the first GUI element should be deactivated. If so, the method proceeds to block 962 where the GUI element is deactivated. For example, as shown in FIG. 38D, the first GUI element (scroll wheel 962) is disabled and removed from display when the finger 925 is no longer detected over the playlist 962. If not, the method maintains block 956.

Figure 38E:
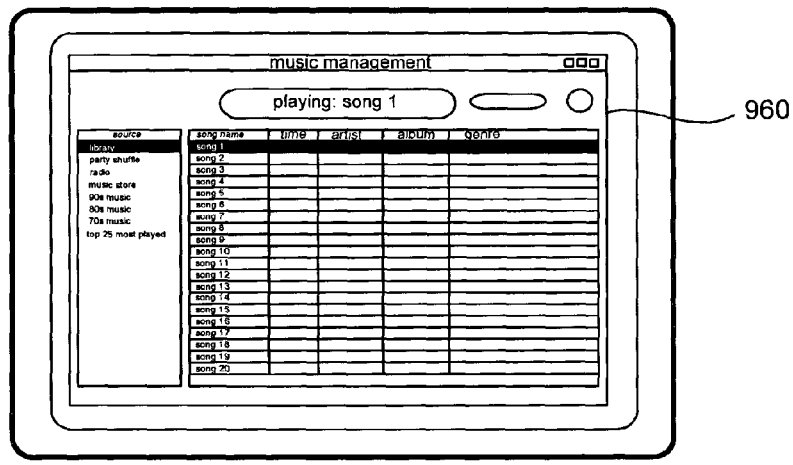

Similarly but independently, following block 958, the method proceeds to block 964 where it is determined if the second GUI element should be deactivated. If so, the method proceeds to block 966 where the GUI element is deactivated. For example, as shown in FIG. 38E, the second GUI element (control panel 966) is disabled and removed from display when the finger 925 is no longer detected over the border 968. If not, the method maintains block 958.

Figure 38F:
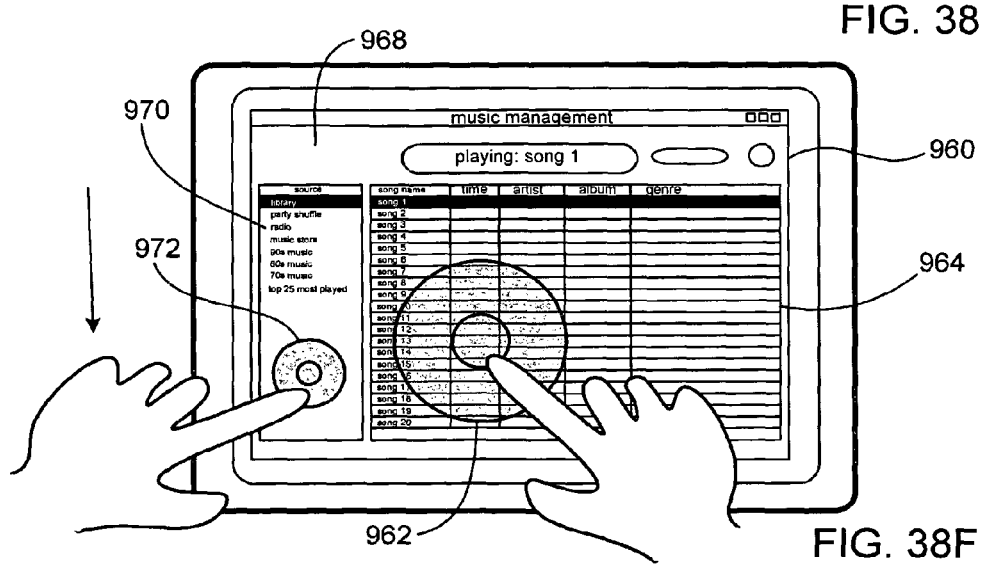

It should be noted that the method is not limited to only two GUI elements and that other GUI elements may be activated if other conditions are implemented. For example, a third GUI element may be activated when a third set of condition occurs and soon. By way of example, as shown in FIG. 38F, the user may slide their finger 925 from the border 968 to a menu portion 970 of the active window 960 thereby initiating a change from the control panel 966 to a scroll wheel 972 (e.g., while the second GUI element is being deactivated, the third GUI element is being activated).

Figure 38G:
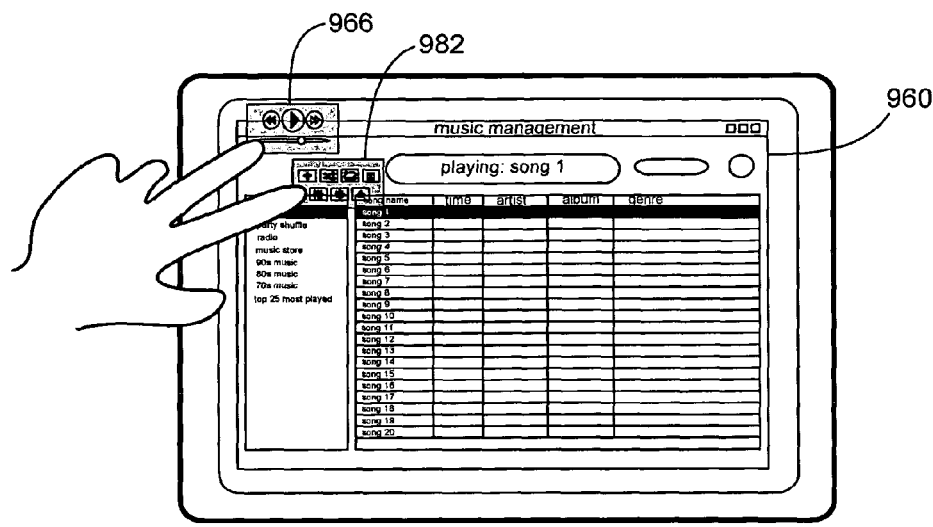

Further, as shown in FIG. 38G, the user may add another finger 925 to the current touch thereby initiating a change from the first control panel 966 to a second control panel 982. The first control panel 966 may include a first set of control options such as play, stop, seek and volume options and the second control panel 982 may include a second set of control options such as song playing order, song information, light effect options.

Figure 38H:
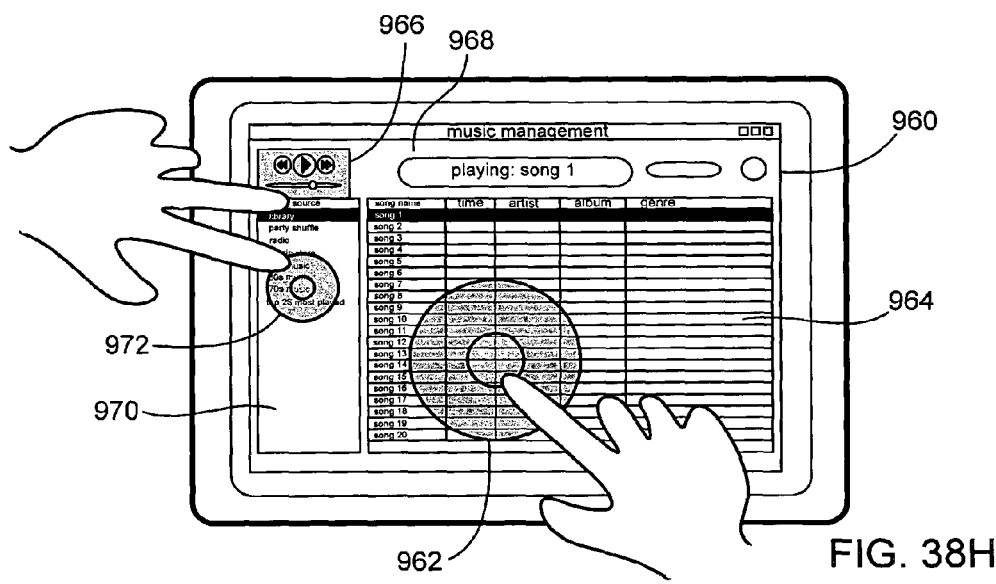

Moreover, as shown in FIG. 38H, the user may place one finger 925A over the border 968, another finger 925B over a menu portion 970, and yet another finger 925C over the playlist portion 964 thereby initiating three different GUI elements, particularly, a control panel 966, a first scroll wheel 972 for scrolling through the menu 970, and a second scroll wheel 962 for scrolling through the playlist 964.

Figure 38I:
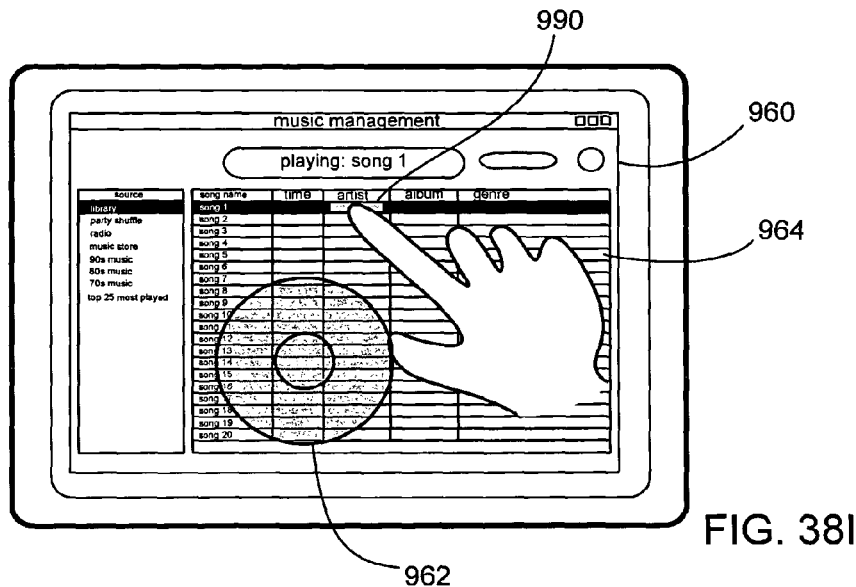
Figure 38J:
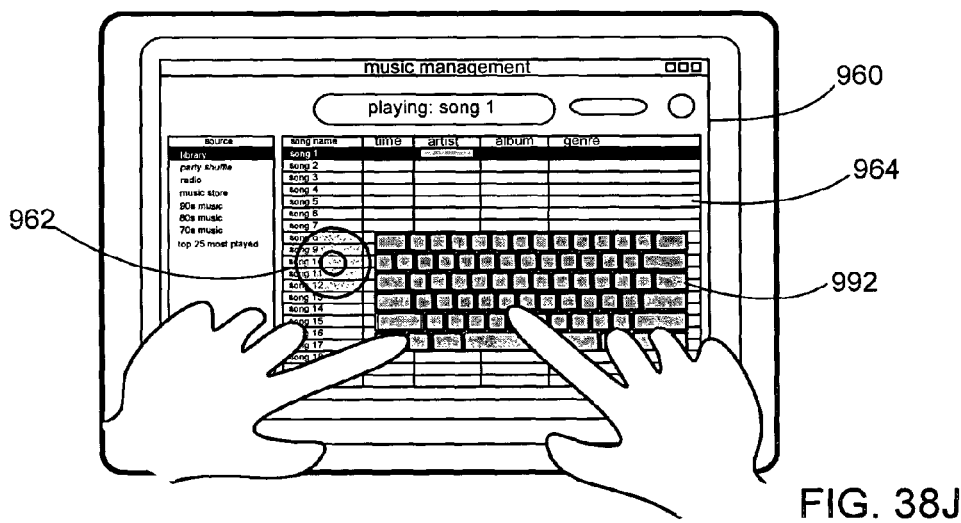

In addition, multiple GUI elements can be activated in the same portion. For example, as shown in FIGS. 38I and 38J, if the user selects a particular box 990 in the playlist 964, a keyboard 992 may be activated so that the user can enter data associated with the song (e.g., title, artist, genre, etc.). If the scroll wheel 962 is active at the same time as the keyboard 992, the scroll wheel 962 may be minimized to accommodate the keyboard 992 as shown. Once the keyboard 992 is deactivated, the scroll wheel 962 reverts back to its original size.

The various aspects, embodiments, implementations or features of the invention can be used separately or in any combination.

The invention is preferably implemented by hardware, software or a combination of hardware and software. The software can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

While this invention has been described in terms of several preferred embodiments, there are alterations, permutations, and equivalents, which fall within the scope of this invention. For example, although the invention has been primarily directed at touchscreens, it should be noted that in some cases touch pads may also be used in place of touchscreens. Other types of touch sensing devices may also be utilized. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer implemented method for initiating floating controls via a touch sensitive device, the method comprising:
    detecting a presence of an object at a first location on the touch sensitive device;
    generating a first user interface element on the touch sensitive device in the vicinity of the object in response to the detected presence of the object at the first location, the first user interface element associated with a first user interface mode;
    detecting movement of the object, without breaking contact with the touch sensitive device, to a second location on the touch sensitive device; and
    deactivating the first user interface element in the vicinity of the first location and activating a second user interface element in the vicinity of the second location in response to the change of location of the object, the second user interface element associated with a second user interface mode different from the first user interface mode;
    wherein at least one of the first user interface element or the second user interface element is configured to accept input from the object.

2. The method of claim 1, wherein the first user interface element includes one or more selectable control options.

3. The method of claim 2, further comprising:
    generating a control signal when a control option of the one or more selectable control options is selected by the object.

4. The method of claim 3, wherein the control signal modifies the functionality of the touch sensitive device.

5. The method of claim 3, wherein the control signal modifies a third user interface element.

6. The method of claim 1, wherein the object is a finger or a stylus.

7. The method of claim 1, wherein the first user interface element does not move in accordance with the movement of the object to the second location.

8. The method of claim 1, wherein the deactivating of the first user interface element and the activating of the second user interface element is in response to the change of the location of the object when the movement of the object pauses at the second location.

9. A non-transitory computer readable storage medium including instructions, which when executed by a touch sensitive device comprising one or more processors, cause the one or more processors to perform a method for initiating floating controls, the method comprising:
    detecting a presence of an object at a first location on the touch sensitive device;
    generating a first user interface element on the touch sensitive device in the vicinity of the object in response to the detected presence of the object at the first location, the first user interface element associated with a first user interface mode;
    detecting movement of the object, without breaking contact with the touch sensitive device, to a second location on the touch sensitive device; and
    deactivating the first user interface element in the vicinity of the first location and activating a second user interface element in the vicinity of the second location in response to the change of location of the object, the second user interface element associated with a second user interface mode different from the first user interface mode;
    wherein at least one of the first user interface element or the second user interface element is configured to accept input from the object.

10. The non-transitory computer readable storage medium of claim 9, wherein the first user interface element includes one or more selectable control options.

11. The non-transitory computer readable storage medium of claim 10, the method further comprising:
    generating a control signal when a control option of the one or more selectable control options is selected by the object.

12. The non-transitory computer readable storage medium of claim 11, wherein the control signal modifies the functionality of the touch sensitive device.

13. The non-transitory computer readable storage medium of claim 11, wherein the control signal modifies a third user interface element.

14. The non-transitory computer readable storage medium of claim 9, wherein the object is a finger or a stylus.

15. The non-transitory computer readable storage medium of claim 9, wherein the first user interface element does not move in accordance with the movement of the object to the second location.

16. The method of claim 9, wherein the deactivating of the first user interface element and the activating of the second user interface element is in response to the change of the location of the object when the movement of the object pauses at the second location.

17. A touch sensitive device comprising:
    one or more processors; and
    a non-transitory computer readable storage medium including instructions, which when executed by the one or more processors, cause the one or more processors to perform a method for initiating floating controls, the method comprising:

detecting a presence of an object at a first location on the touch sensitive device;

generating a first user interface element on the touch sensitive device in the vicinity of the object in response to the detected presence of the object at the first location, the first user interface element associated with a first user interface mode;

detecting movement of the object, without breaking contact with the touch sensitive device, to a second location on the touch sensitive device; and deactivating the first user interface element in the vicinity of the first location and activating a second user interface element in the vicinity of the second location in response to the change of location of the object, the second user interface element associated with a second user interface mode different from the first user interface mode;

wherein at least one of the first user interface element or the second user interface element is configured to accept input from the object.

18. The touch sensitive device of claim 17, wherein the first user interface element includes one or more selectable control options.

19. The touch sensitive device of claim 18, further comprising:

generating a control signal when a control option of the one or more selectable control options is selected by the object.

20. The touch sensitive device of claim 19, wherein the control signal modifies the functionality of the touch sensitive device.

21. The touch sensitive device of claim 19, wherein the control signal modifies a third user interface element.

22. The touch sensitive device of claim 17, wherein the object is a finger or a stylus.

23. The touch sensitive device of claim 17, wherein the first user interface element does not move in accordance with the movement of the object to the second location.

24. The touch sensitive device of claim 17, wherein the deactivating of the first user interface element and the activating of the second user interface element is in response to the change of the location of the object when the movement of the object pauses at the second location.

* * * * *